Aug. 26, 1930. H. GOLBER 1,774,367
CALCULATING MACHINE
Filed Aug. 18, 1923 39 Sheets-Sheet 11

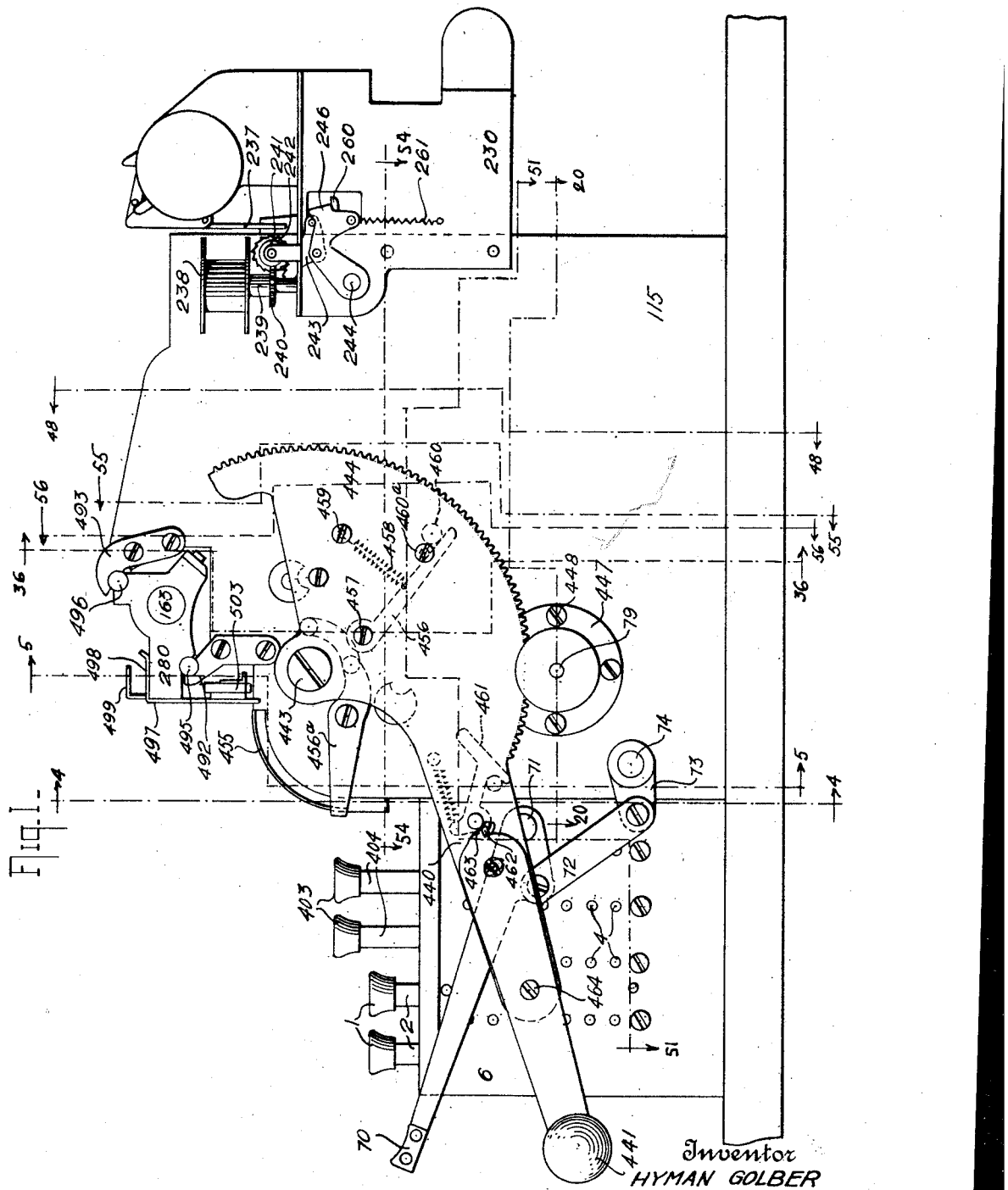

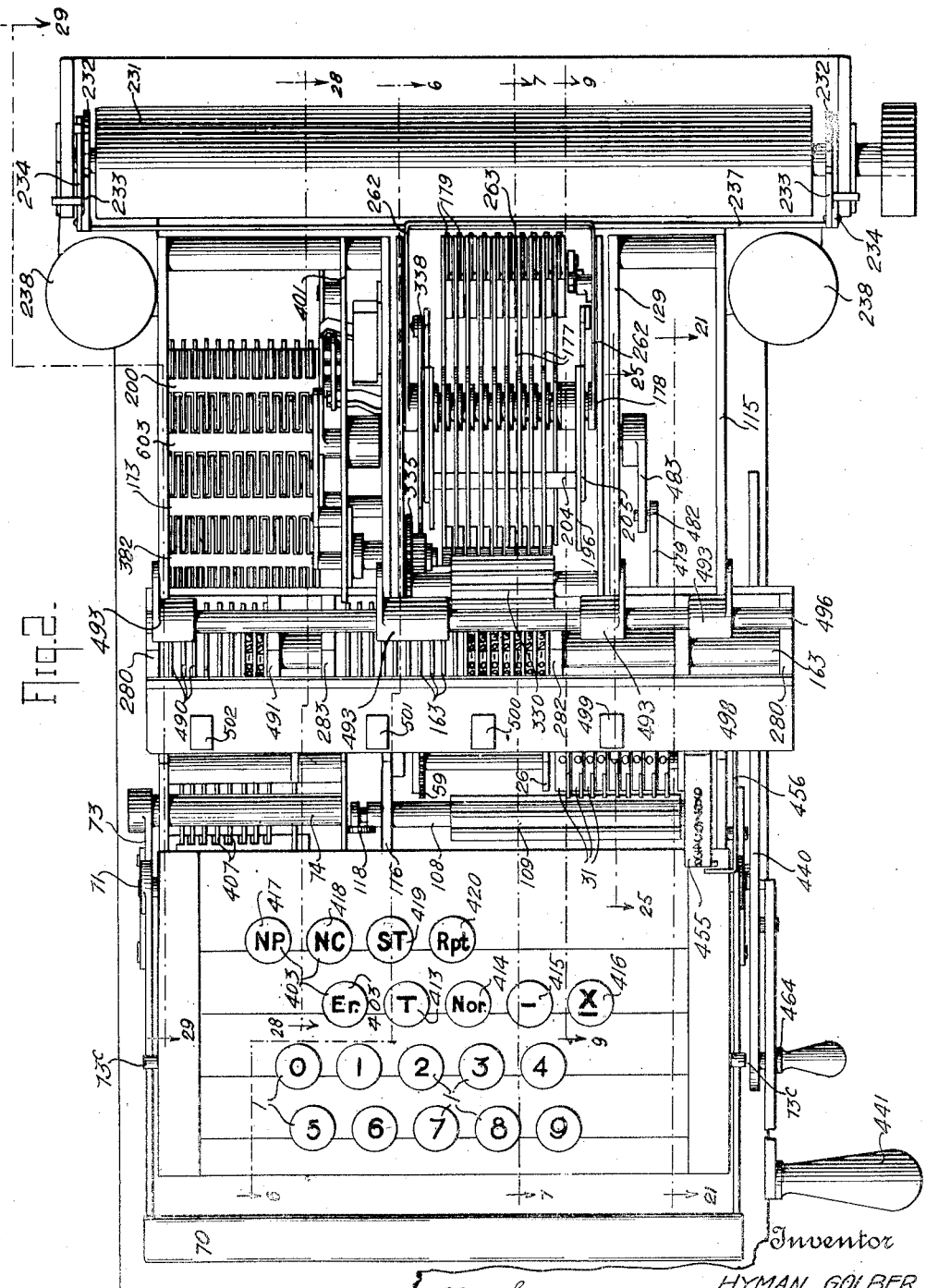

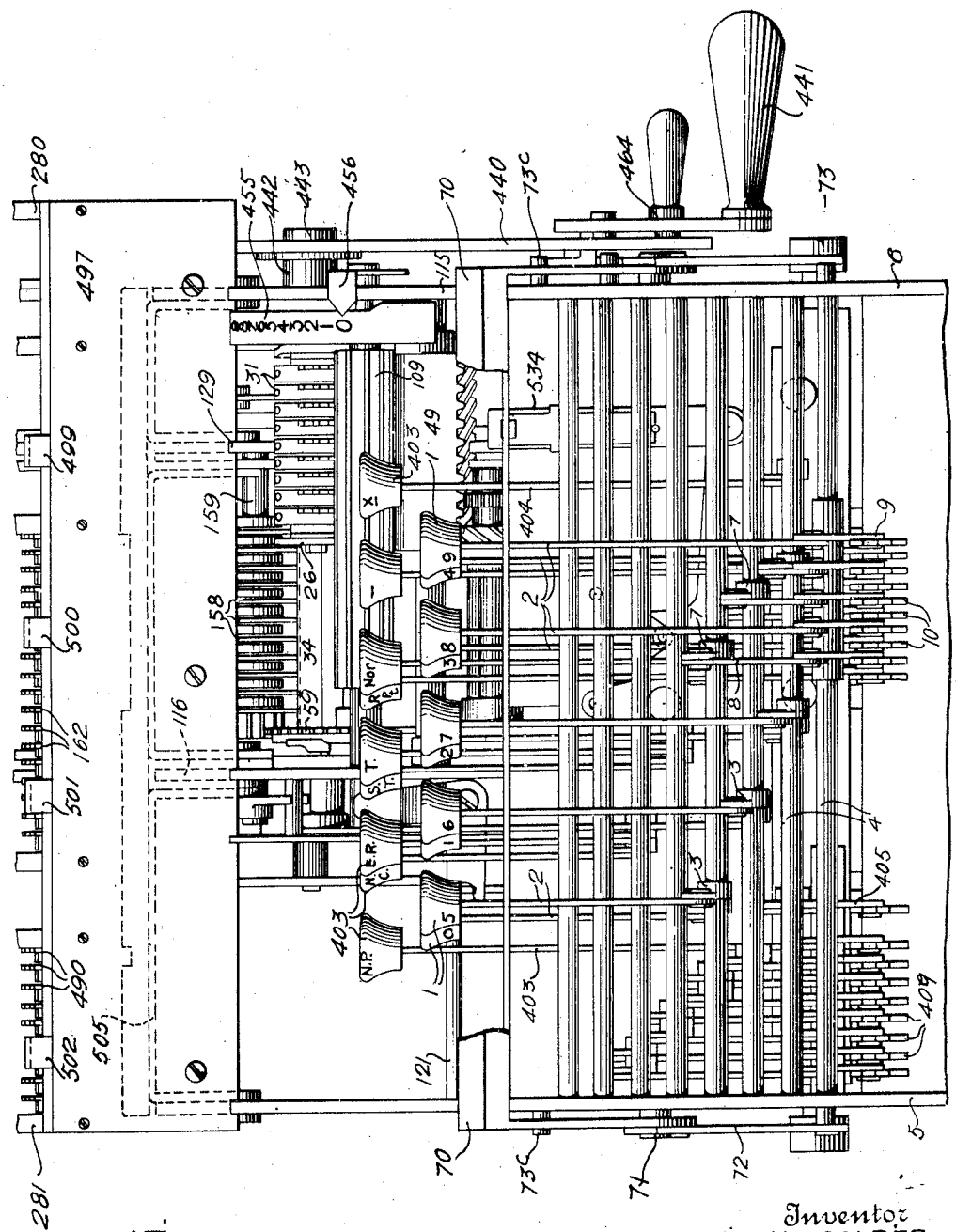

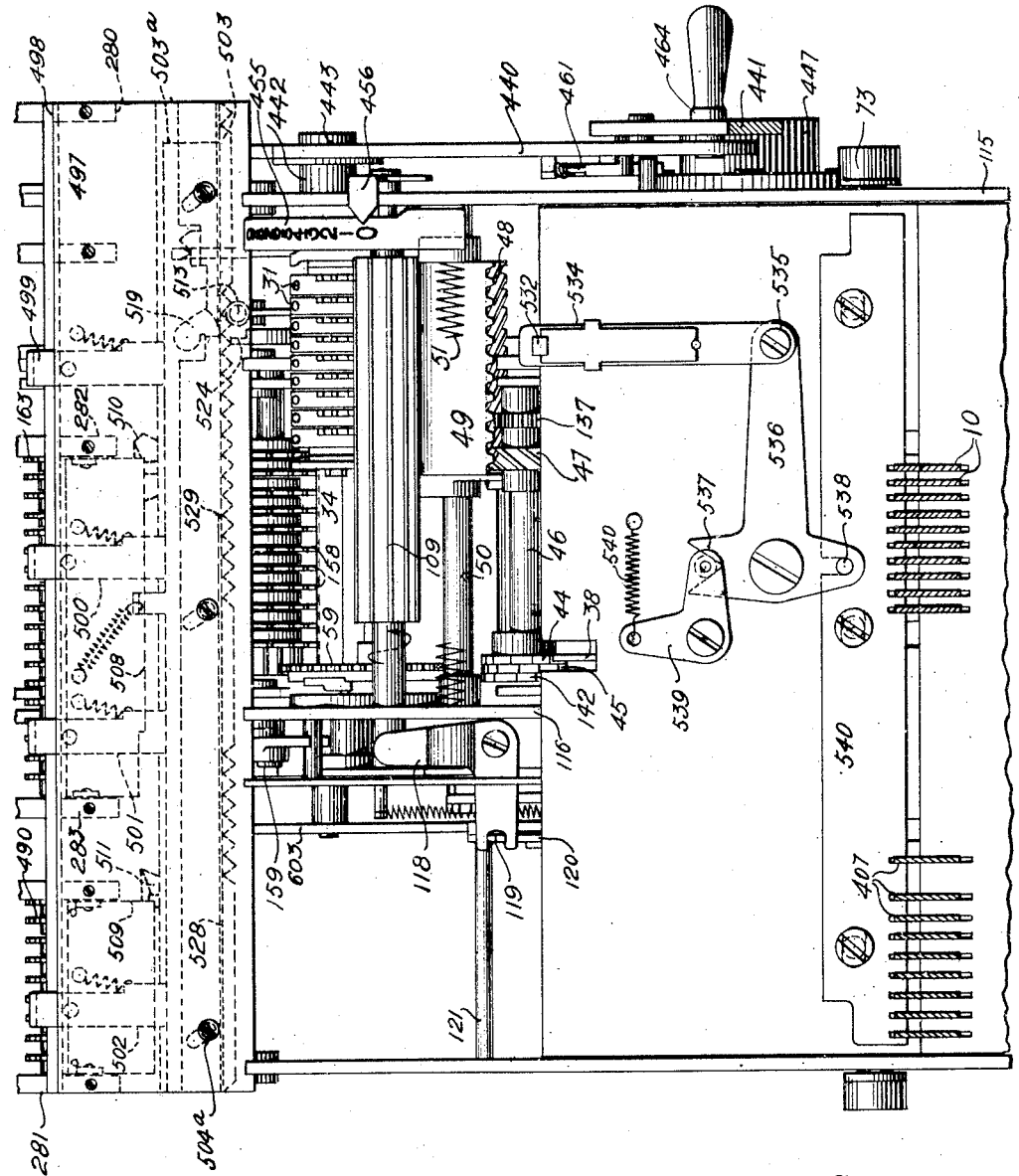

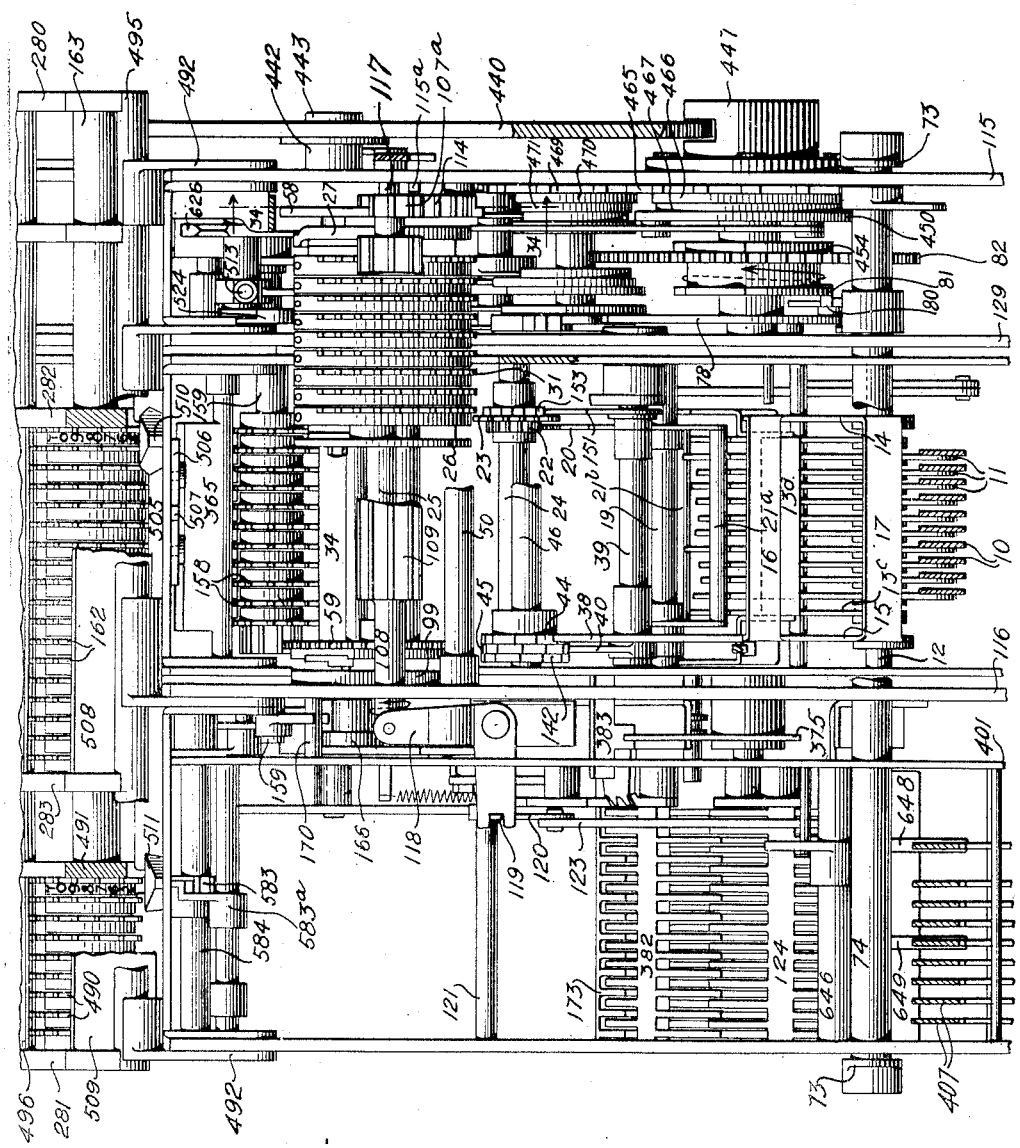

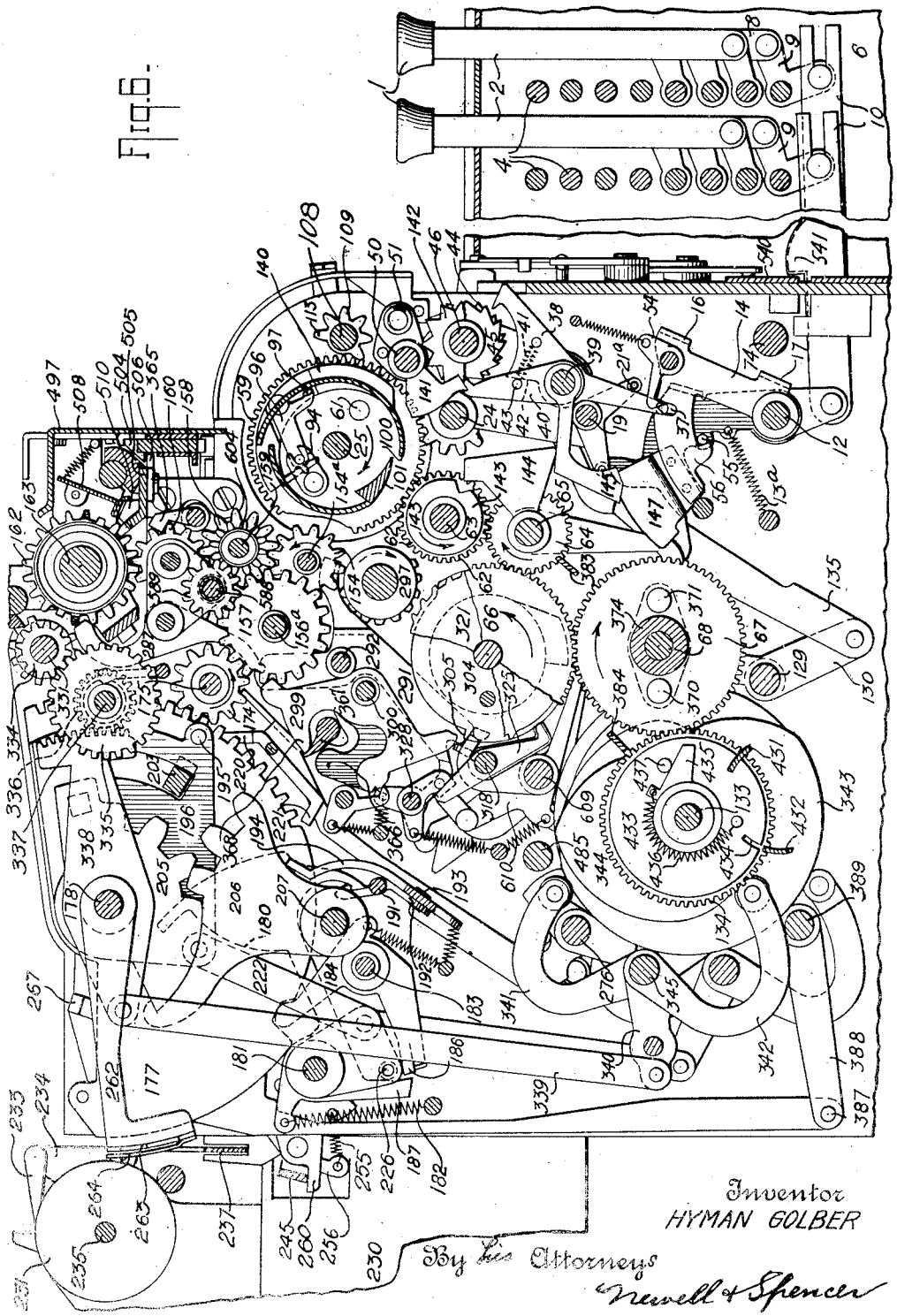

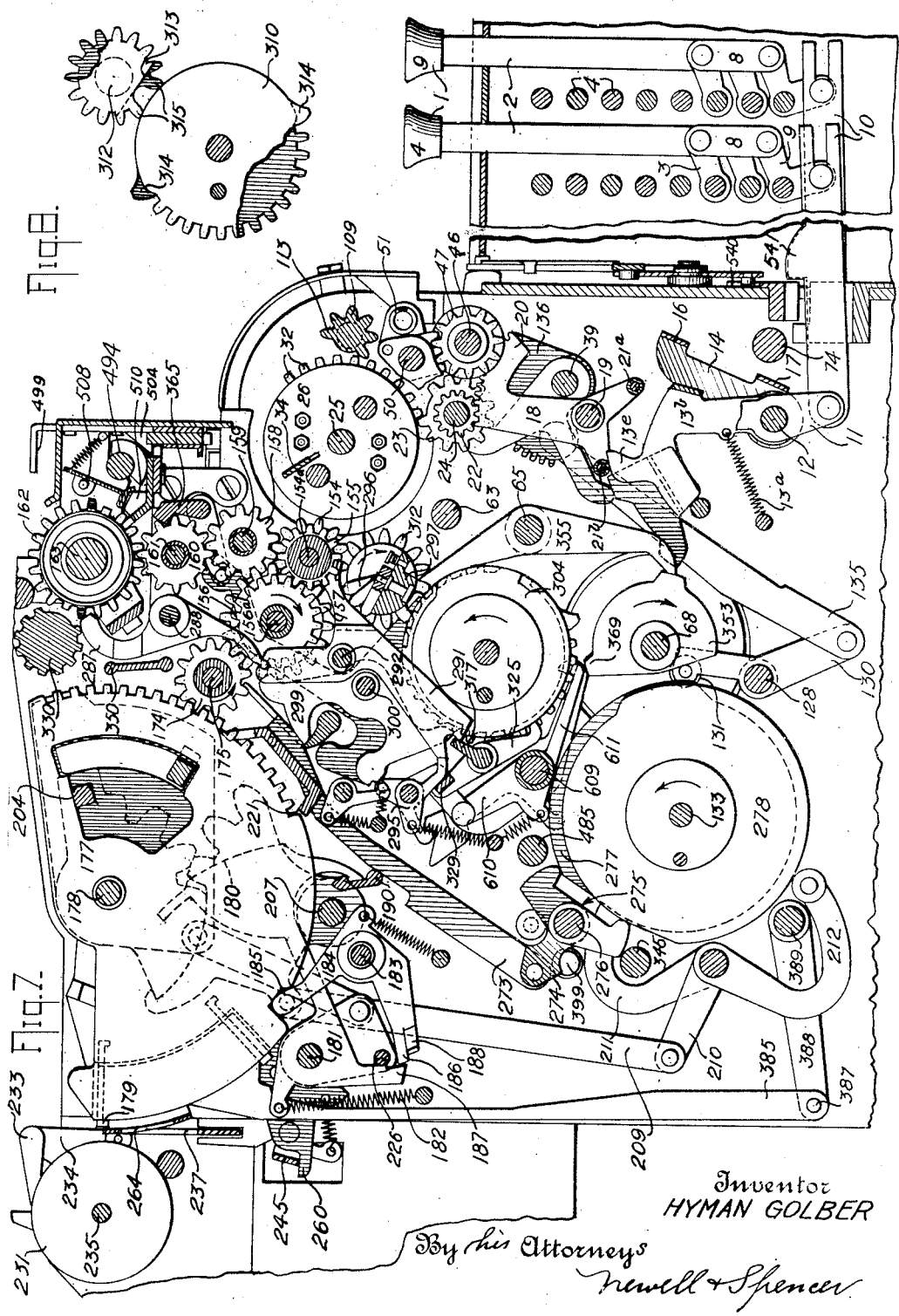

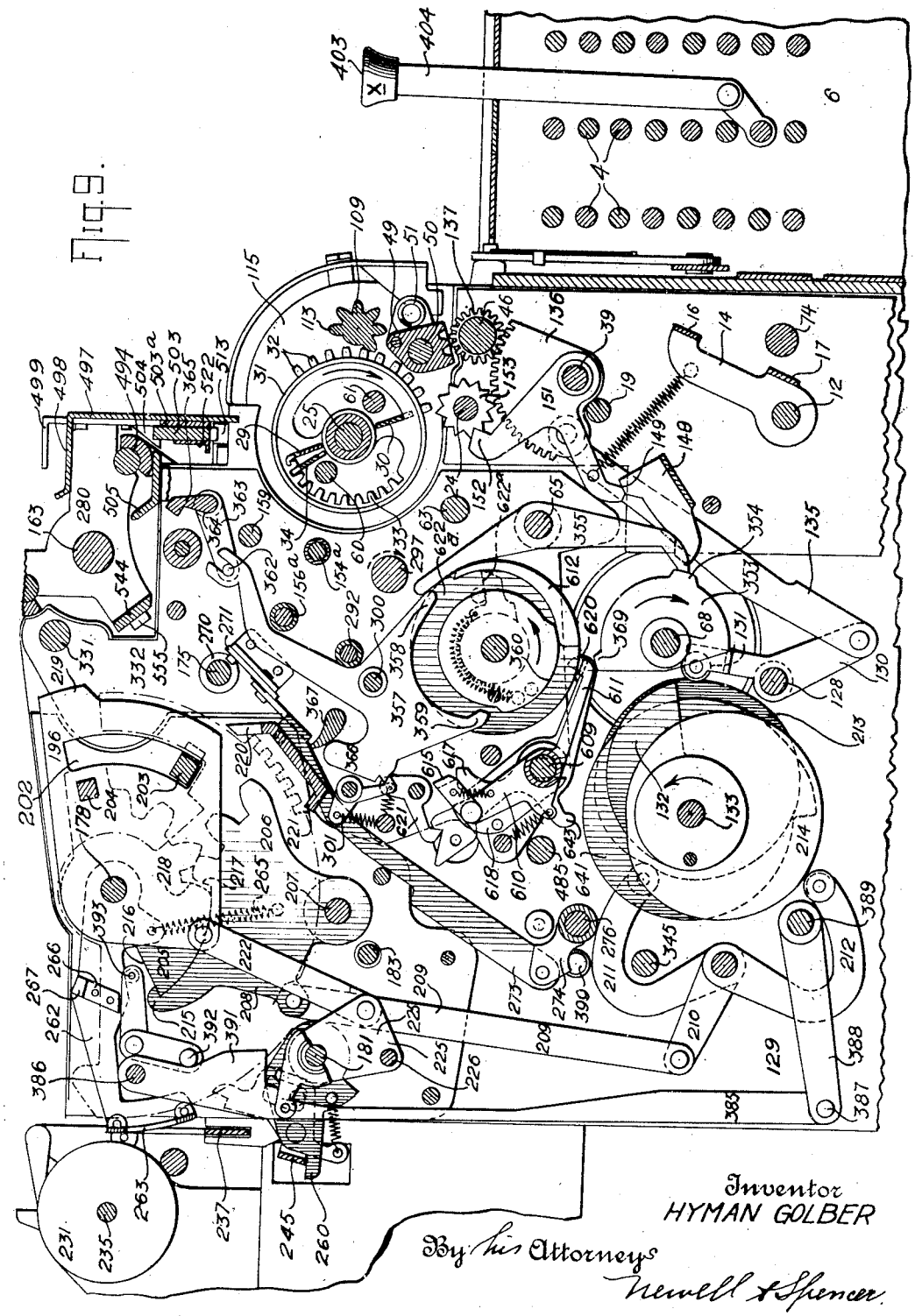

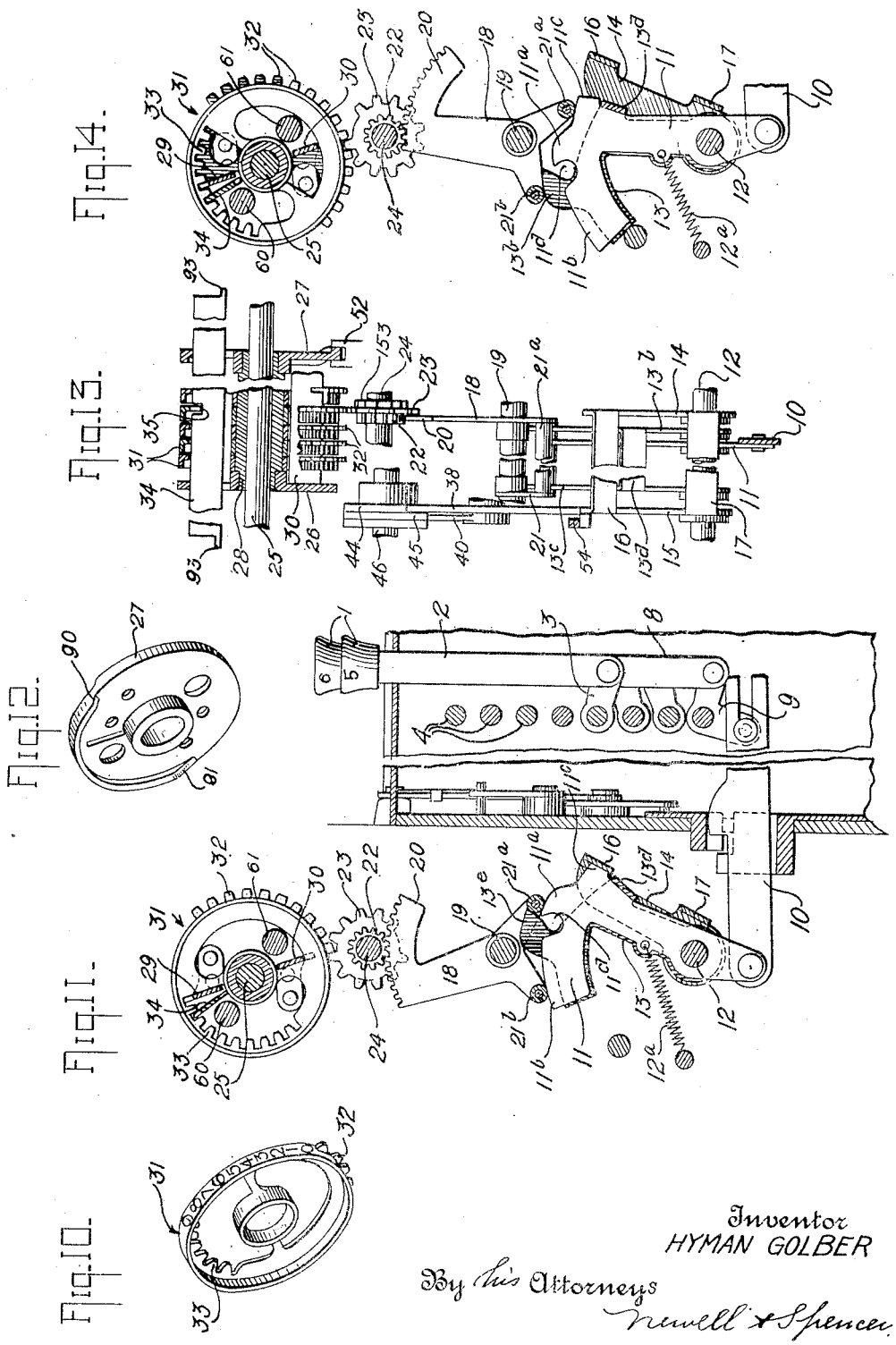

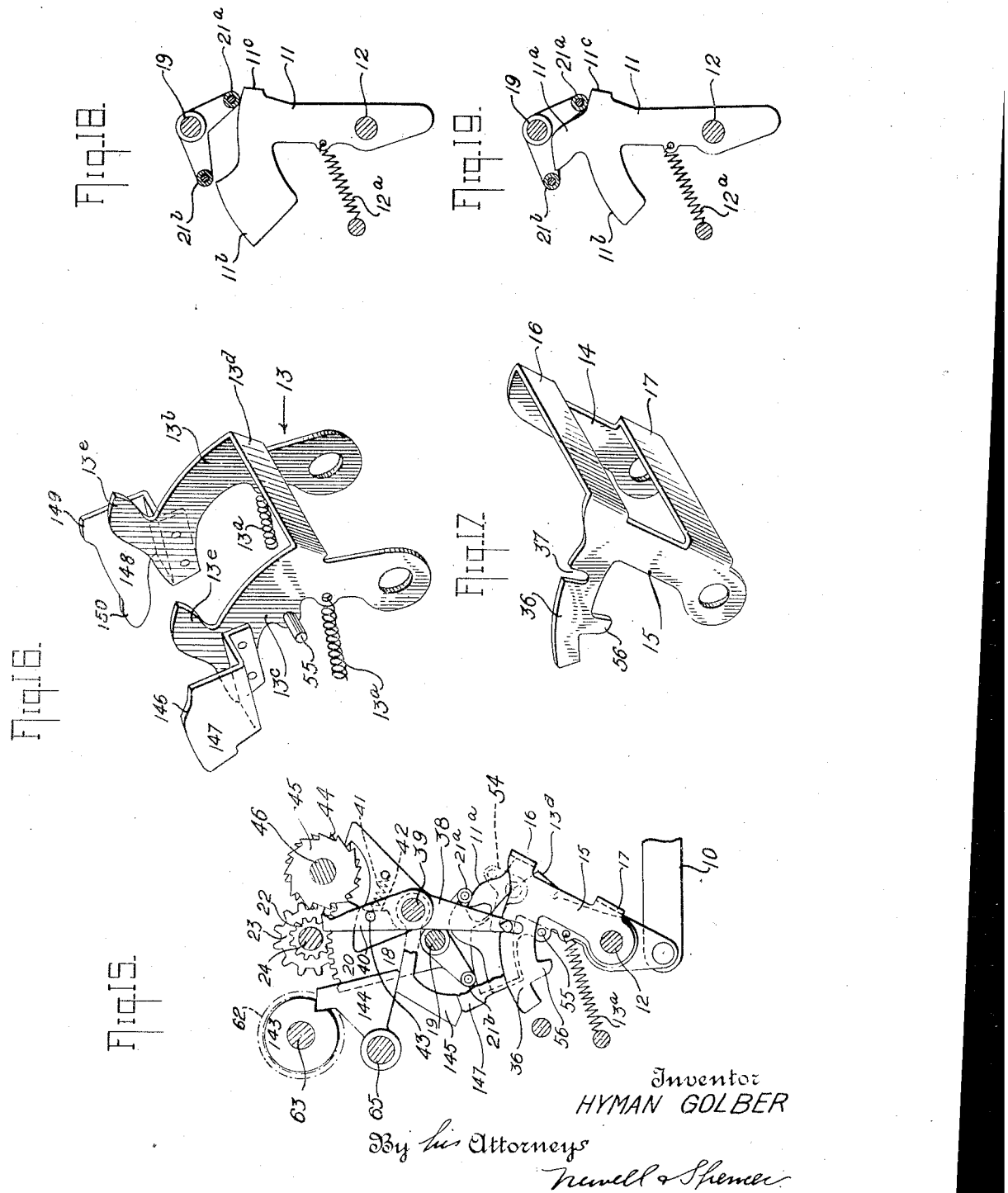

Inventor
HYMAN GOLBER
By his Attorneys
Newell & Spencer

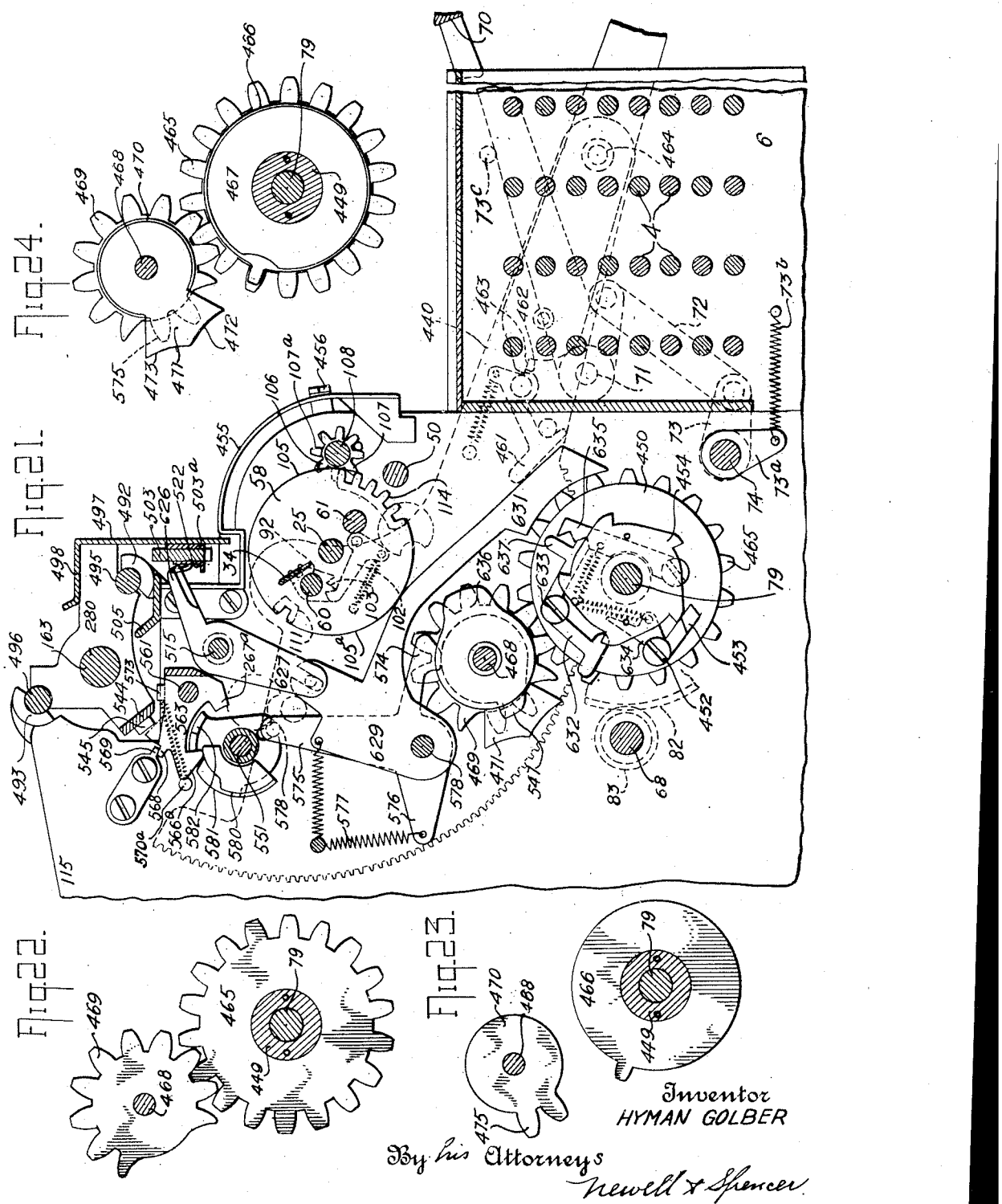

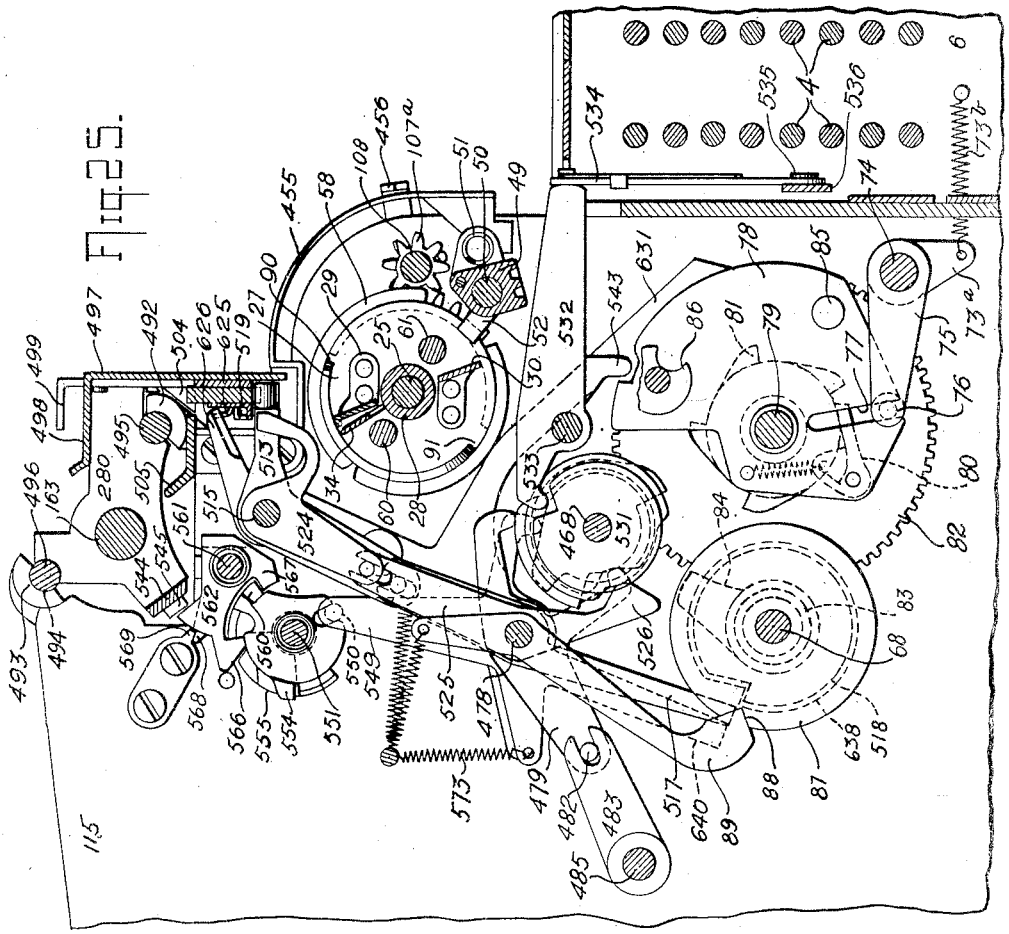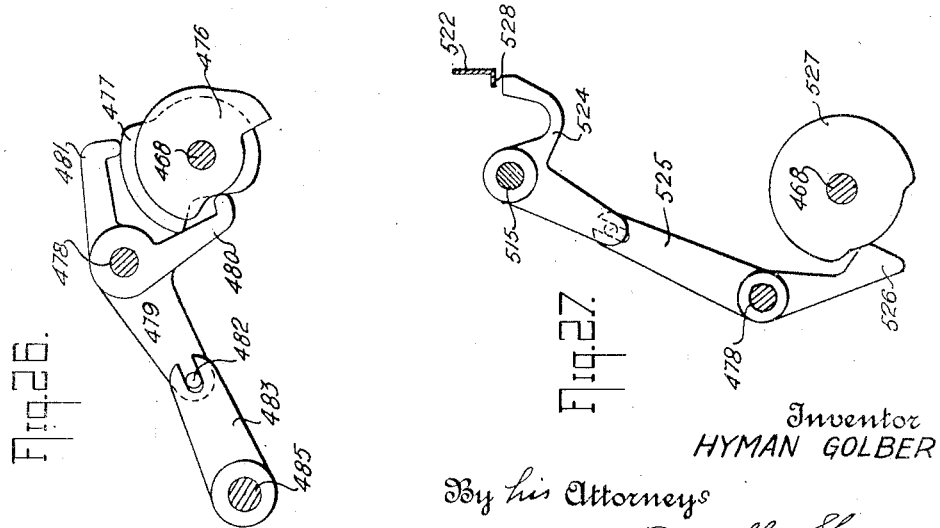

Aug. 26, 1930.　　　H. GOLBER　　　1,774,367
CALCULATING MACHINE
Filed Aug. 18, 1923　　　39 Sheets-Sheet 14

Inventor
HYMAN GOLBER
By his Attorneys
Newell & Spencer

Aug. 26, 1930.  H. GOLBER  1,774,367
CALCULATING MACHINE
Filed Aug. 18, 1923   39 Sheets-Sheet 15
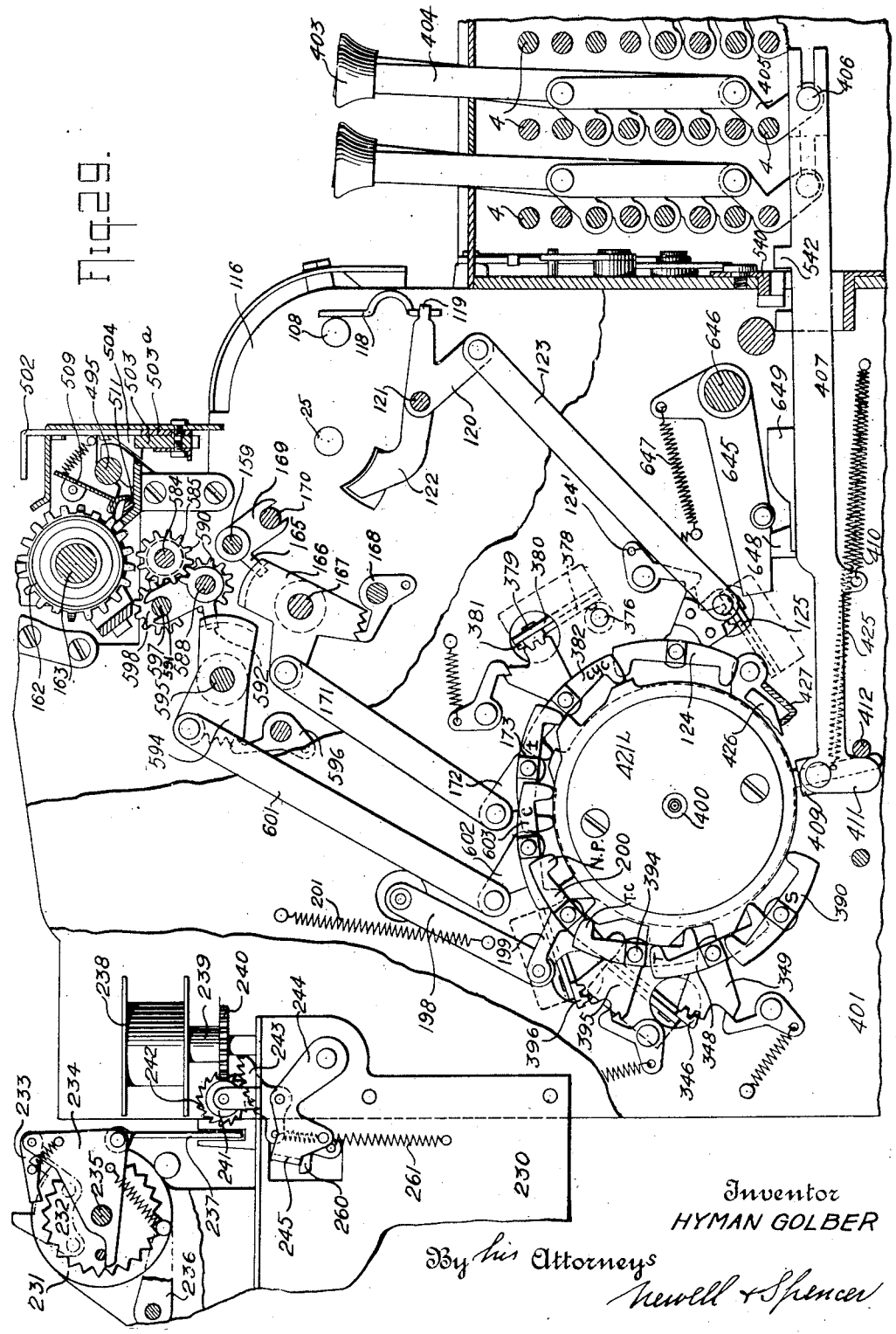
Inventor
HYMAN GOLBER
By his Attorneys
Newell & Spencer

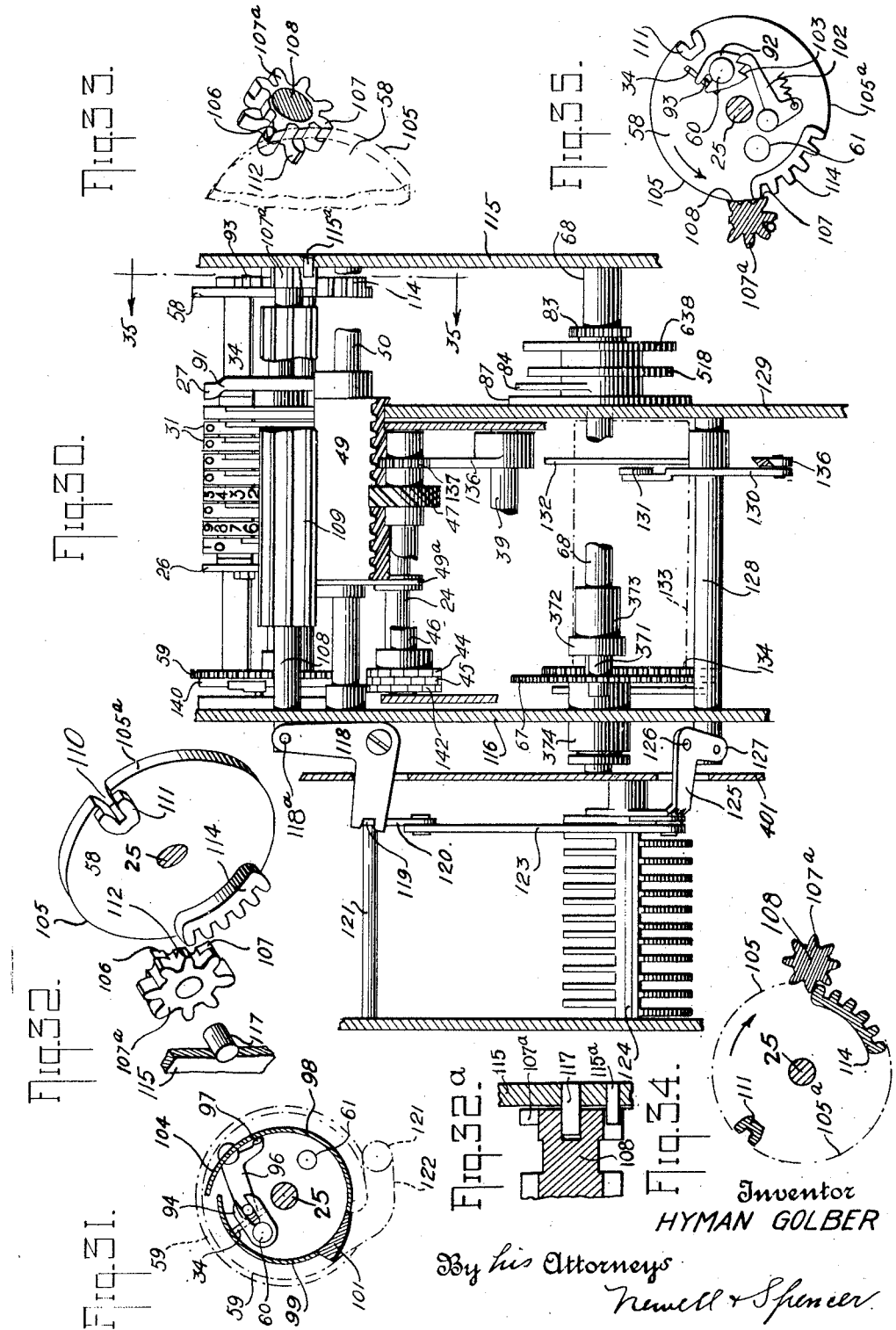

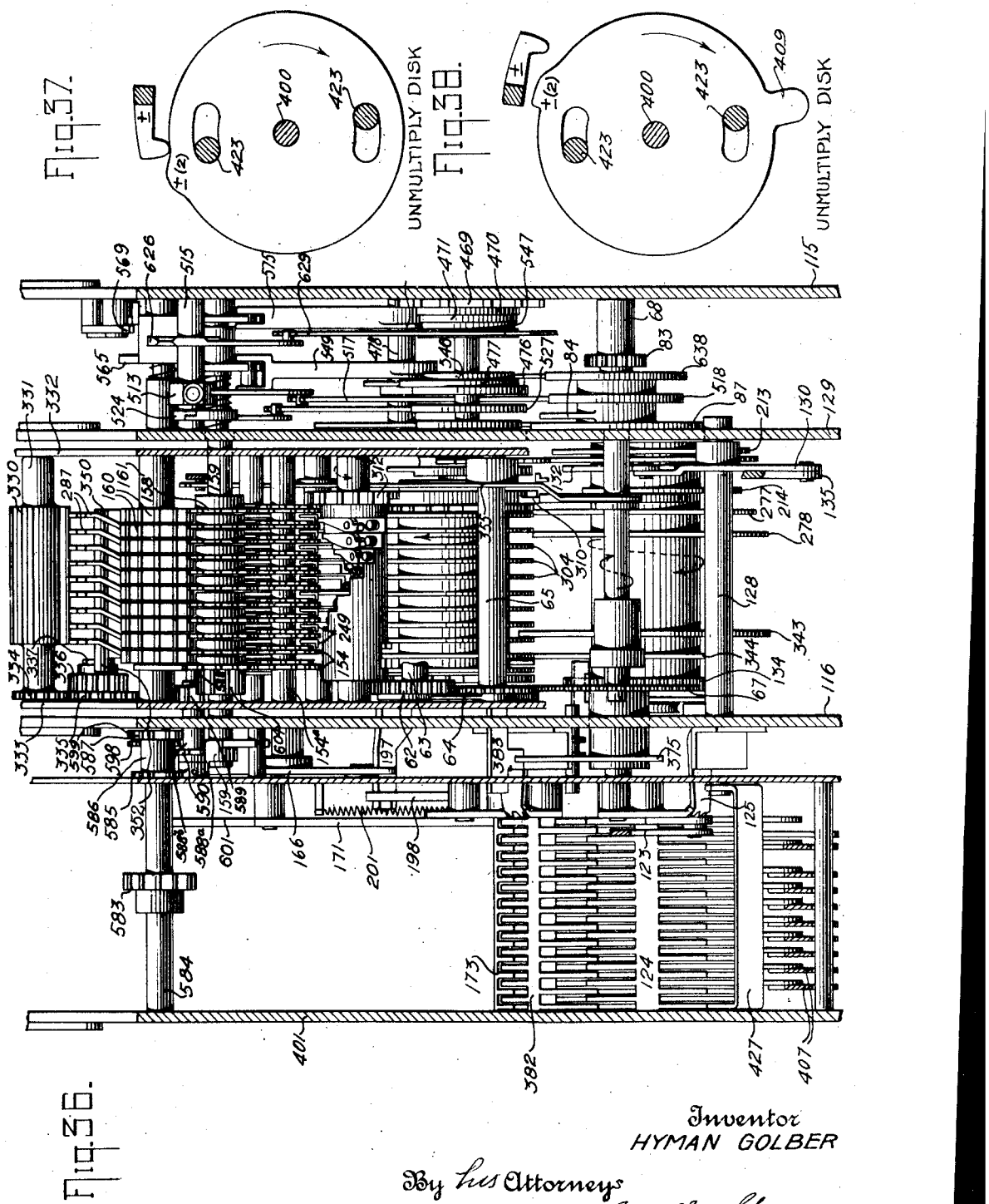

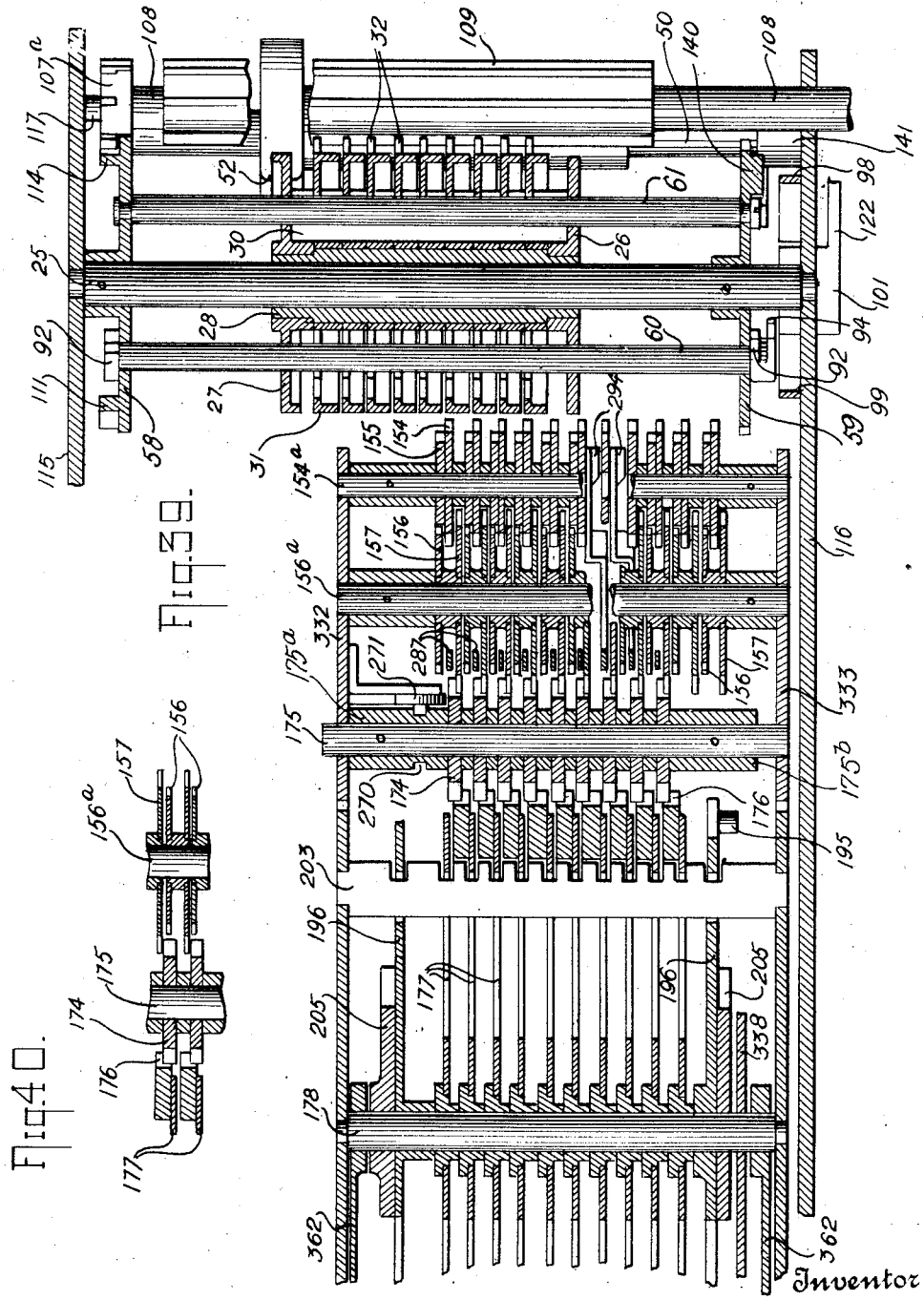

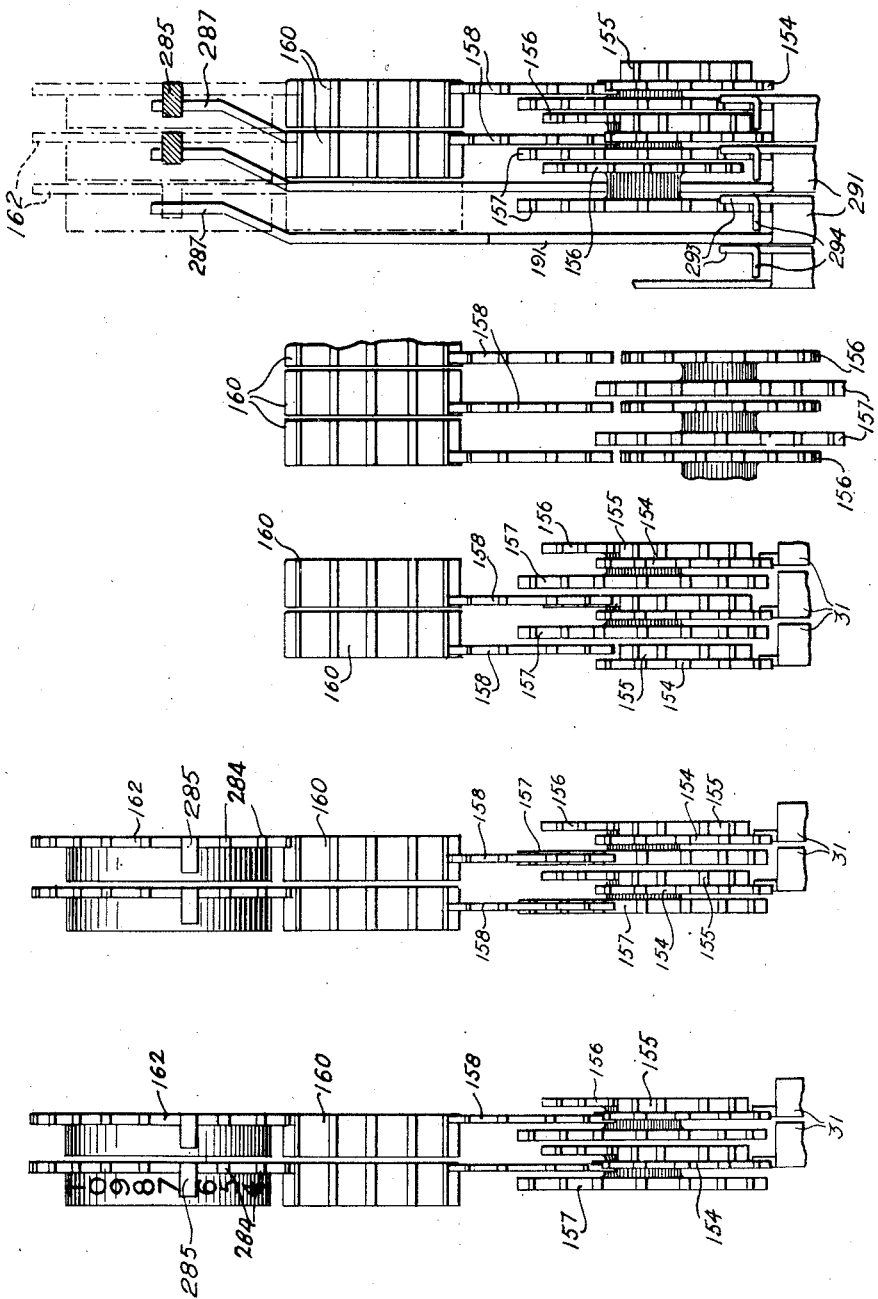

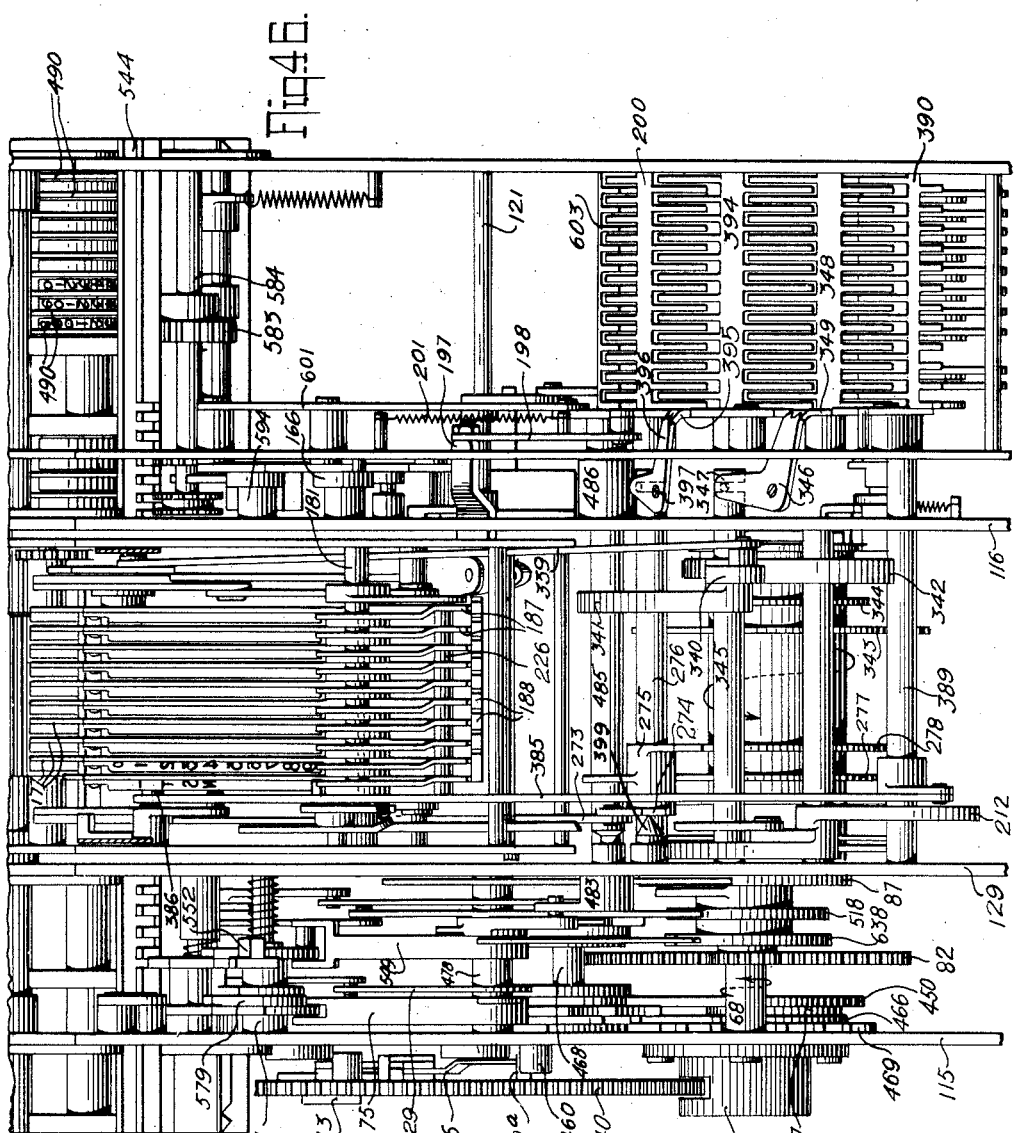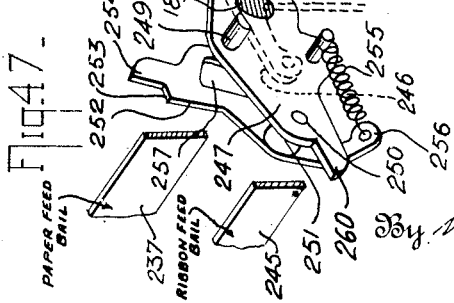

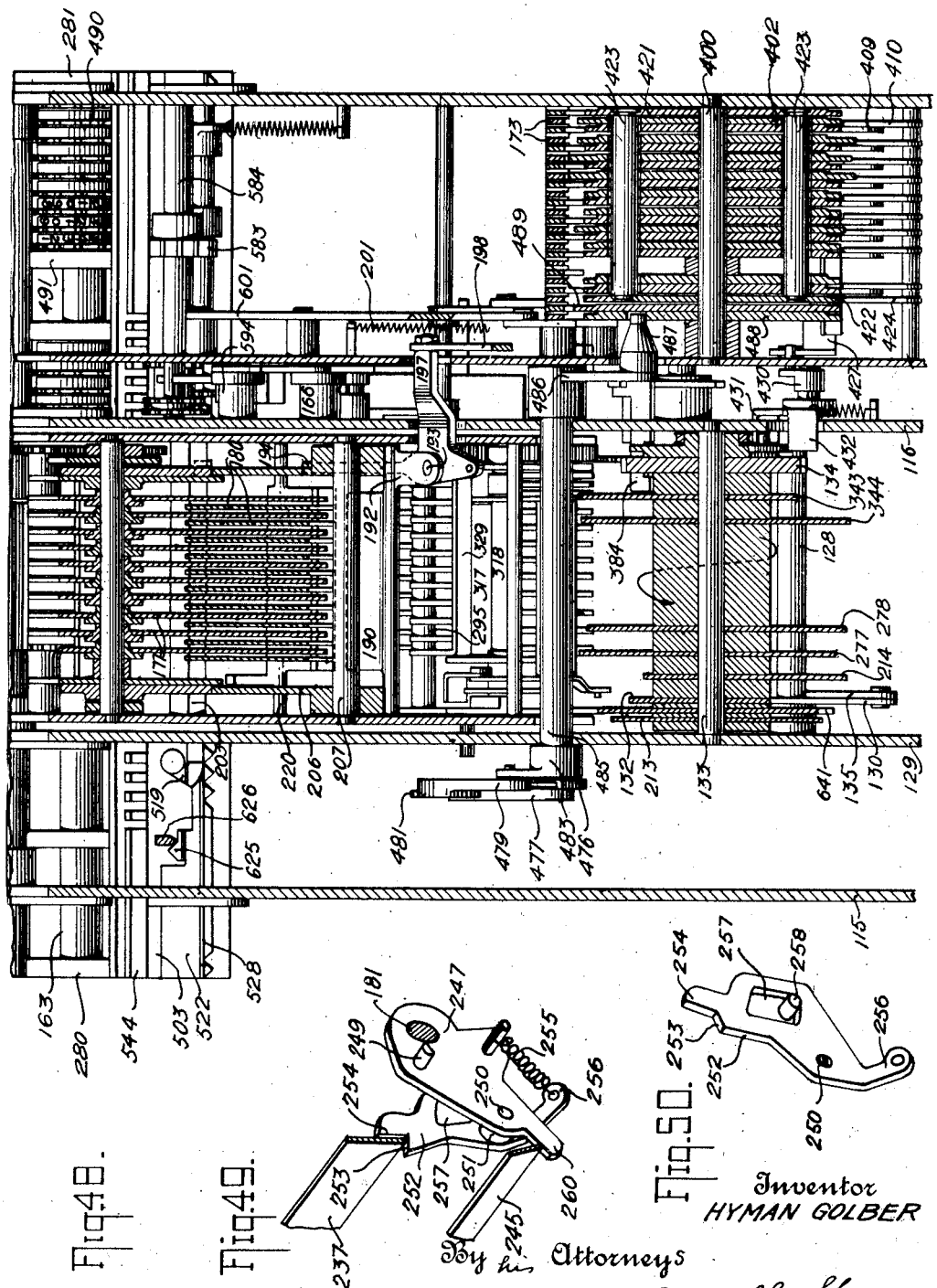

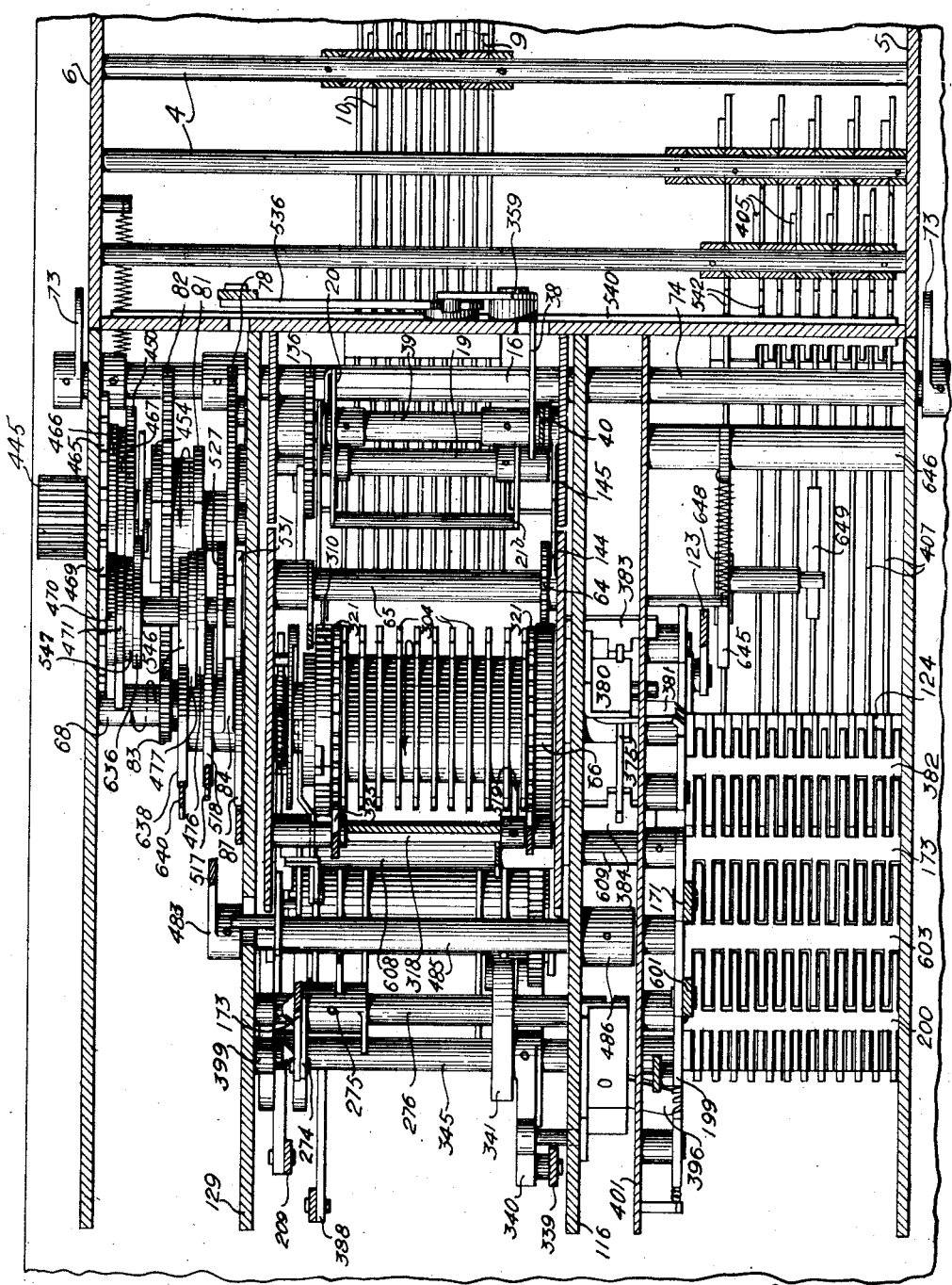

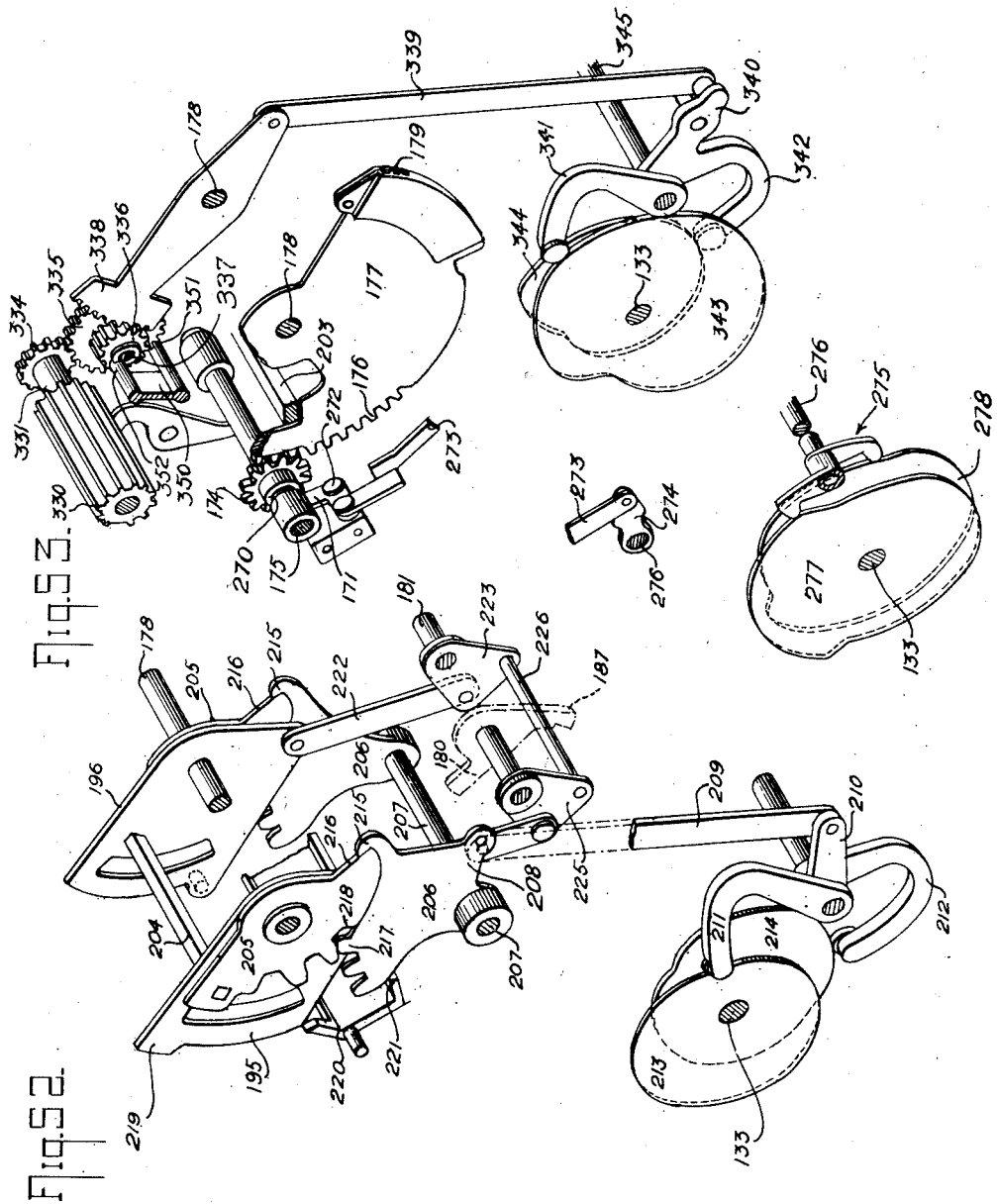

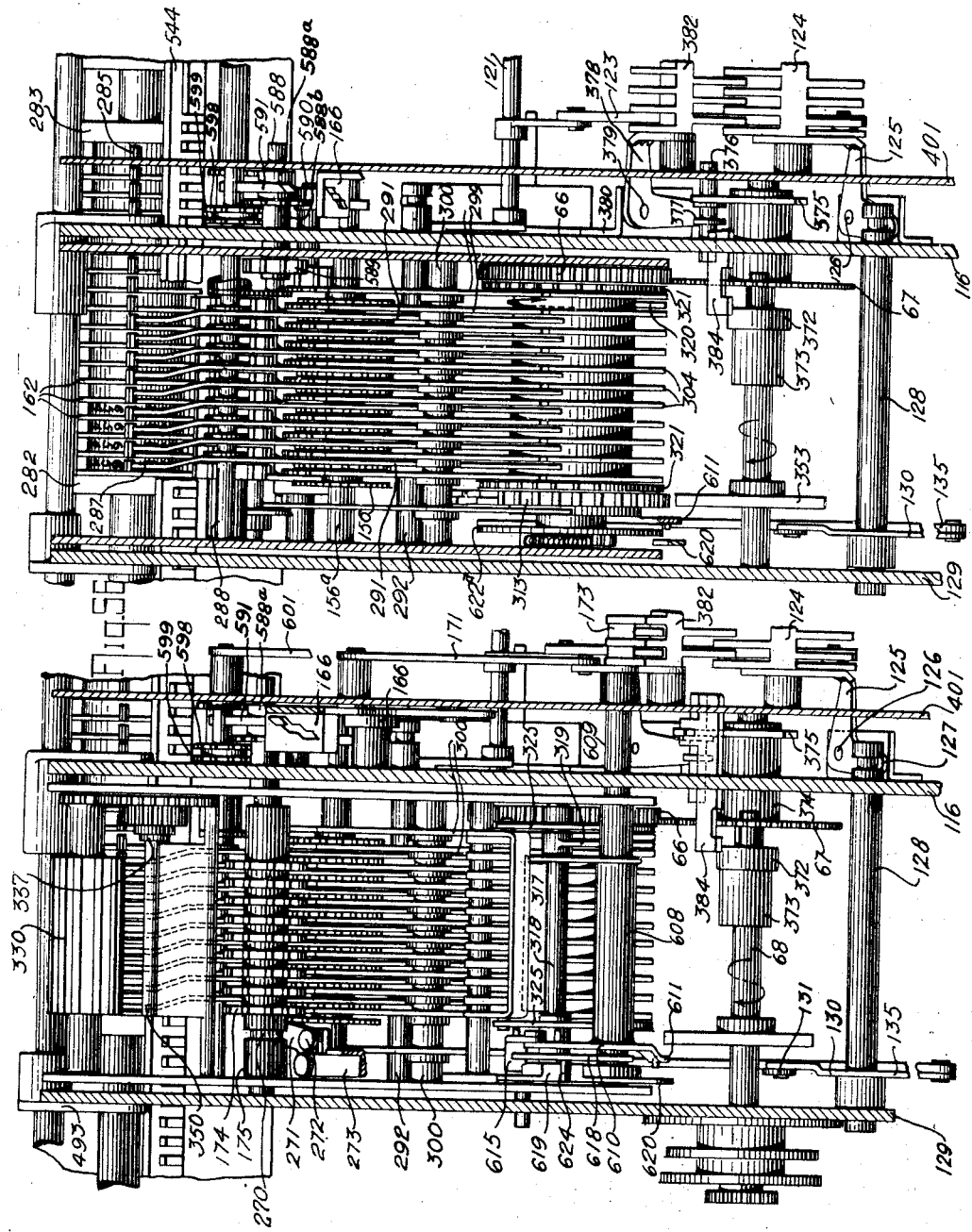

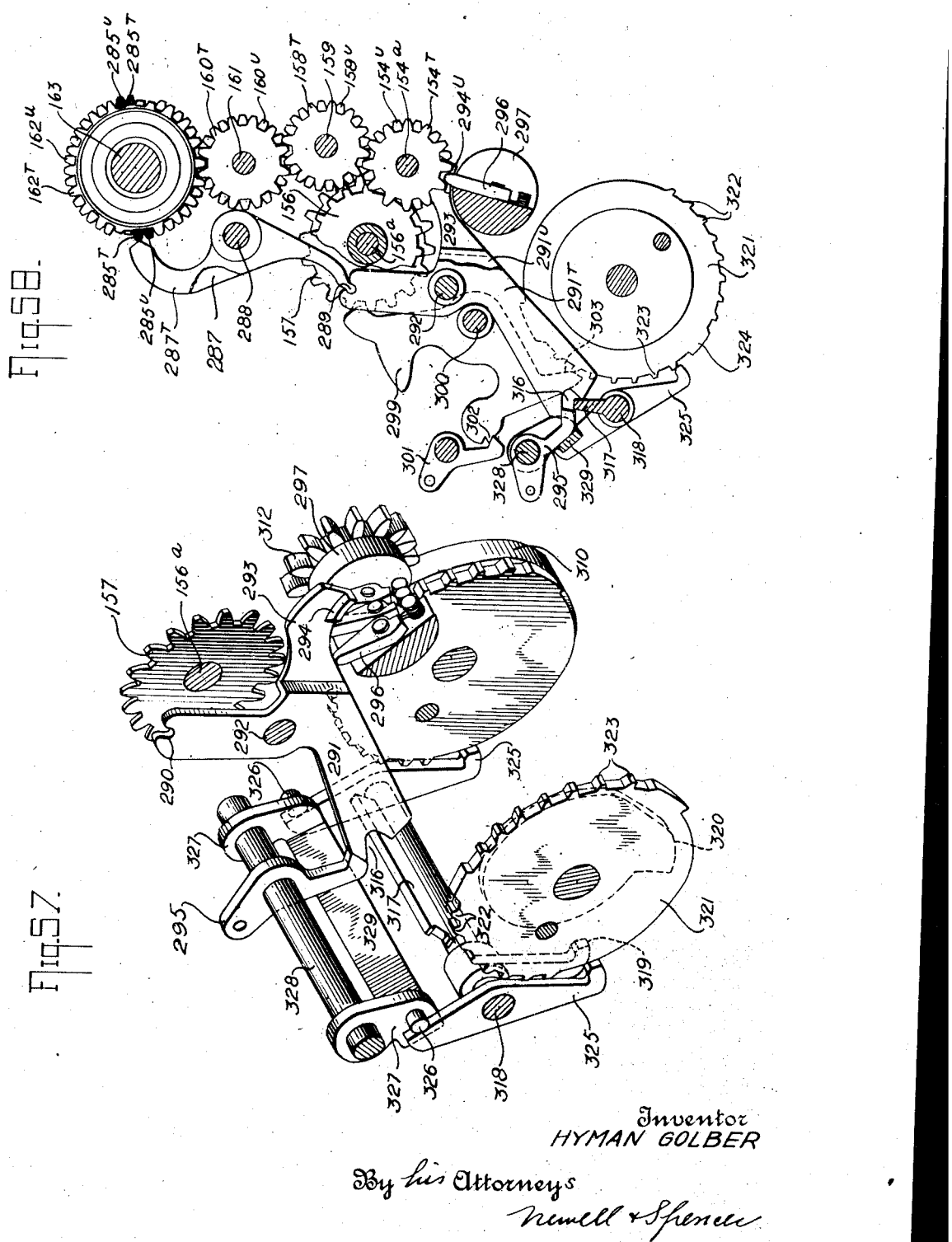
Aug. 26, 1930.  H. GOLBER  1,774,367
CALCULATING MACHINE
Filed Aug. 18, 1923   39 Sheets-Sheet 26
Inventor
HYMAN GOLBER
By his Attorneys
Newell & Spencer

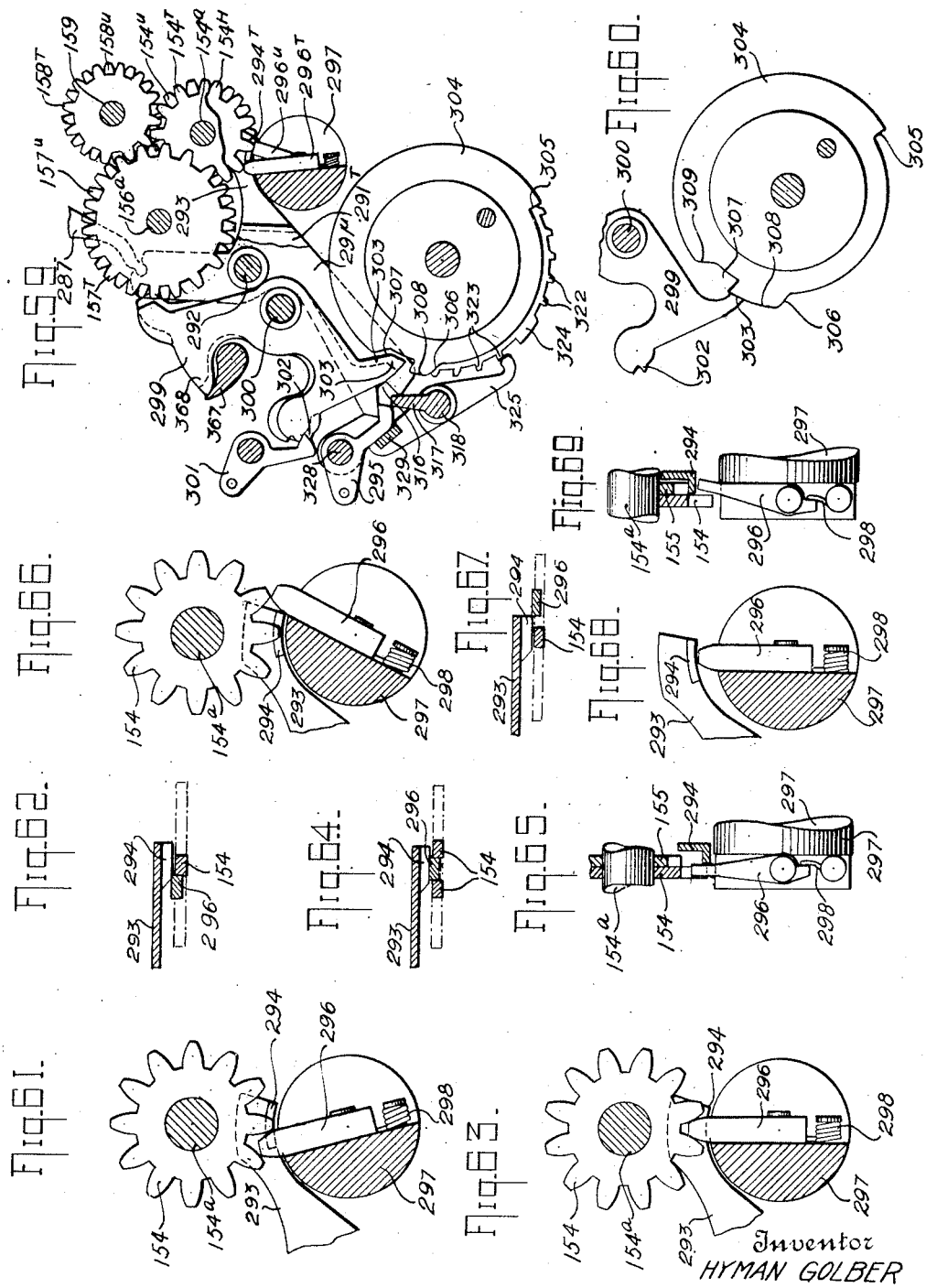

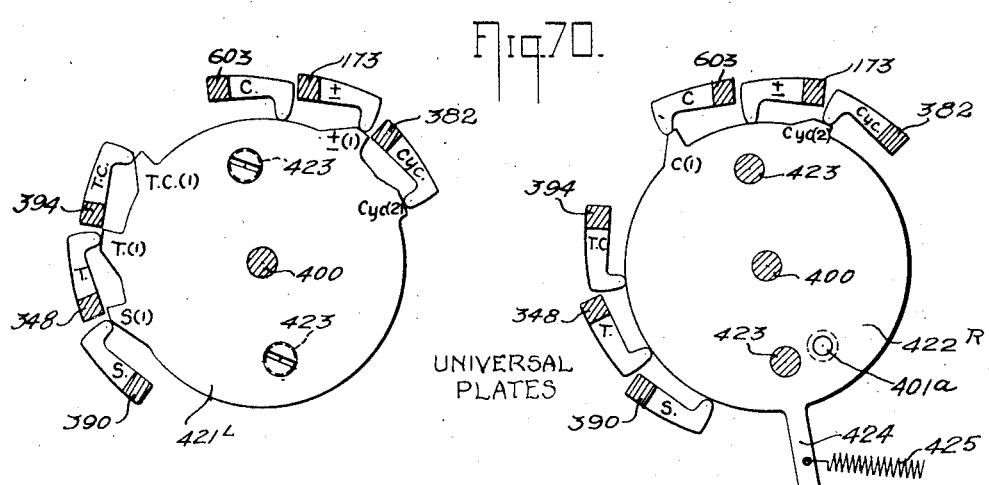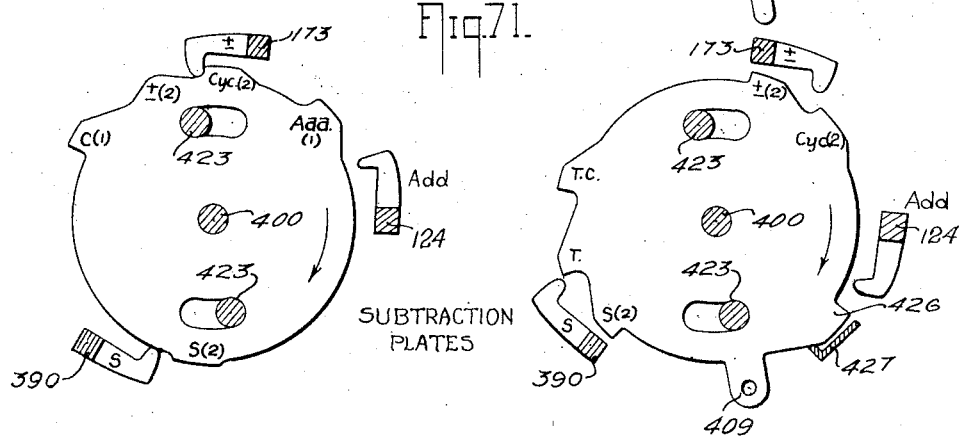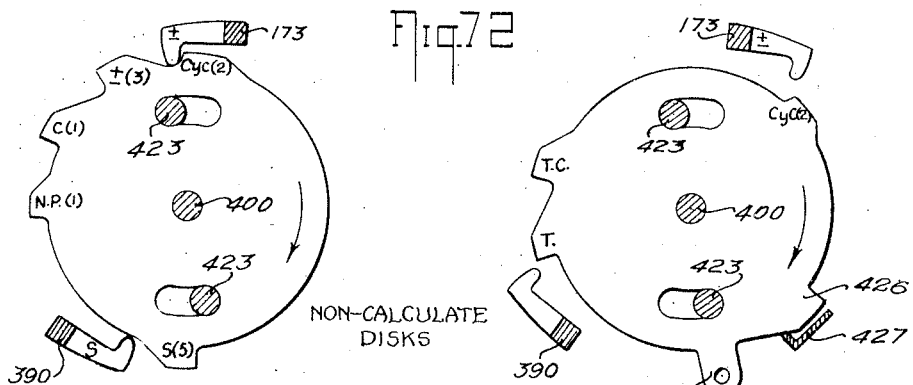

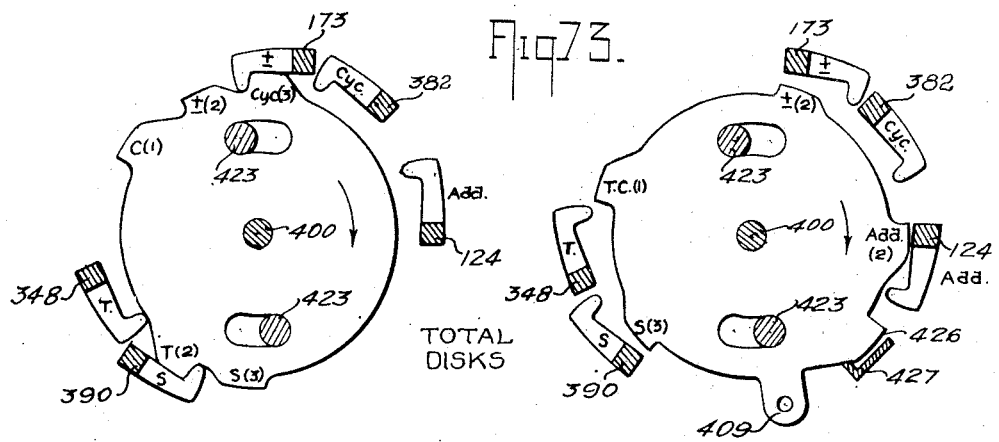
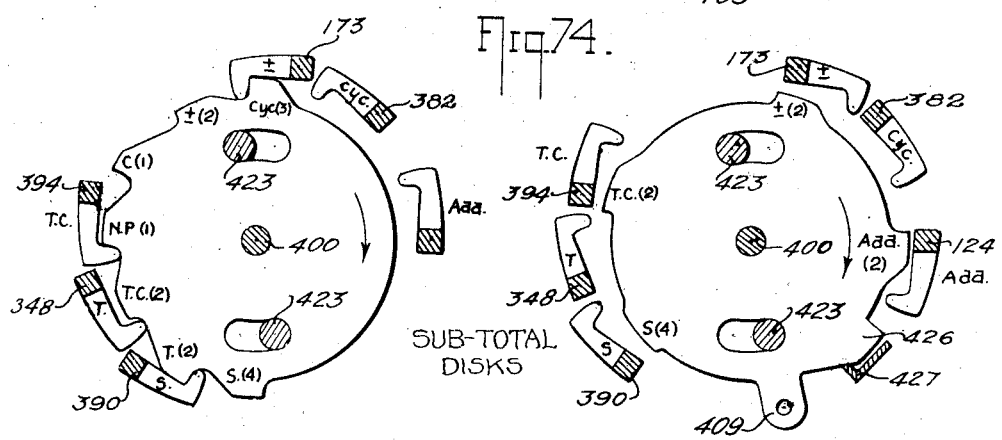
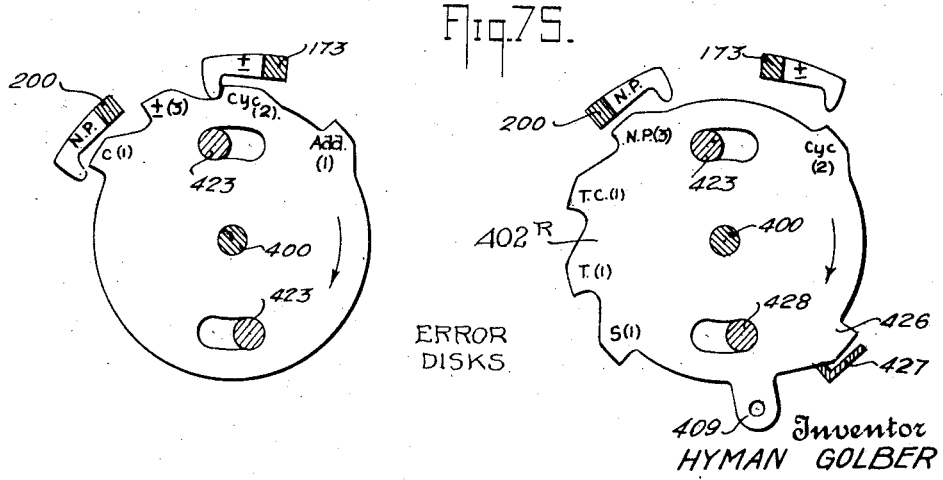

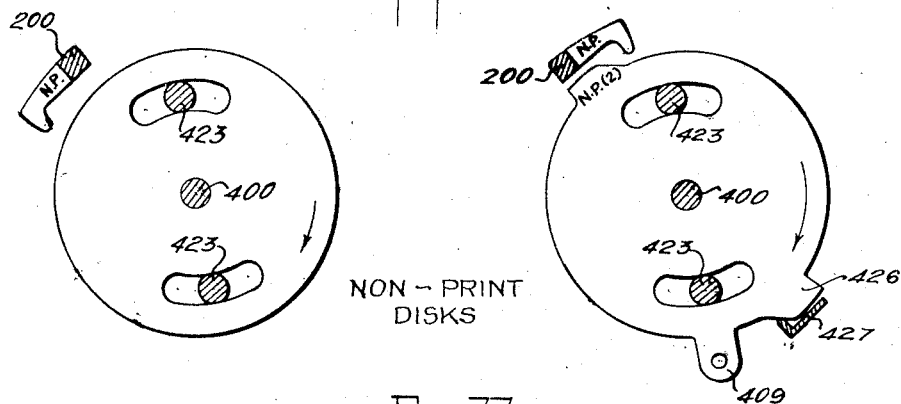
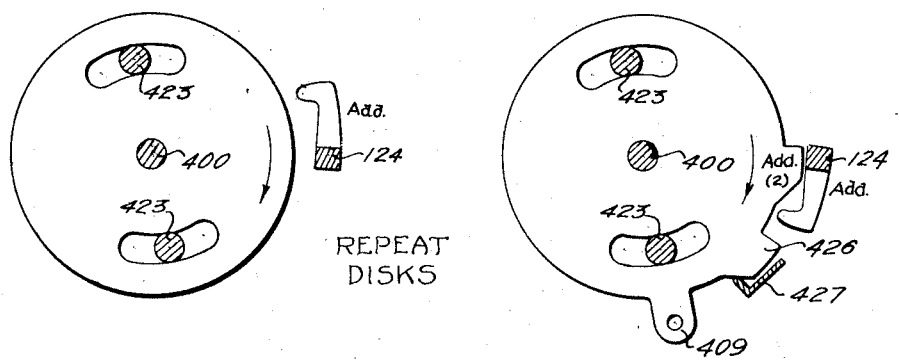
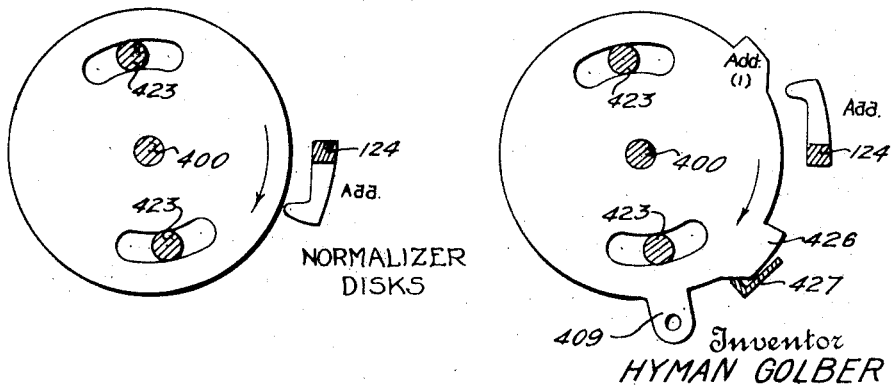

Aug. 26, 1930.  H. GOLBER  1,774,367
CALCULATING MACHINE
Filed Aug. 18, 1923  39 Sheets-Sheet 31
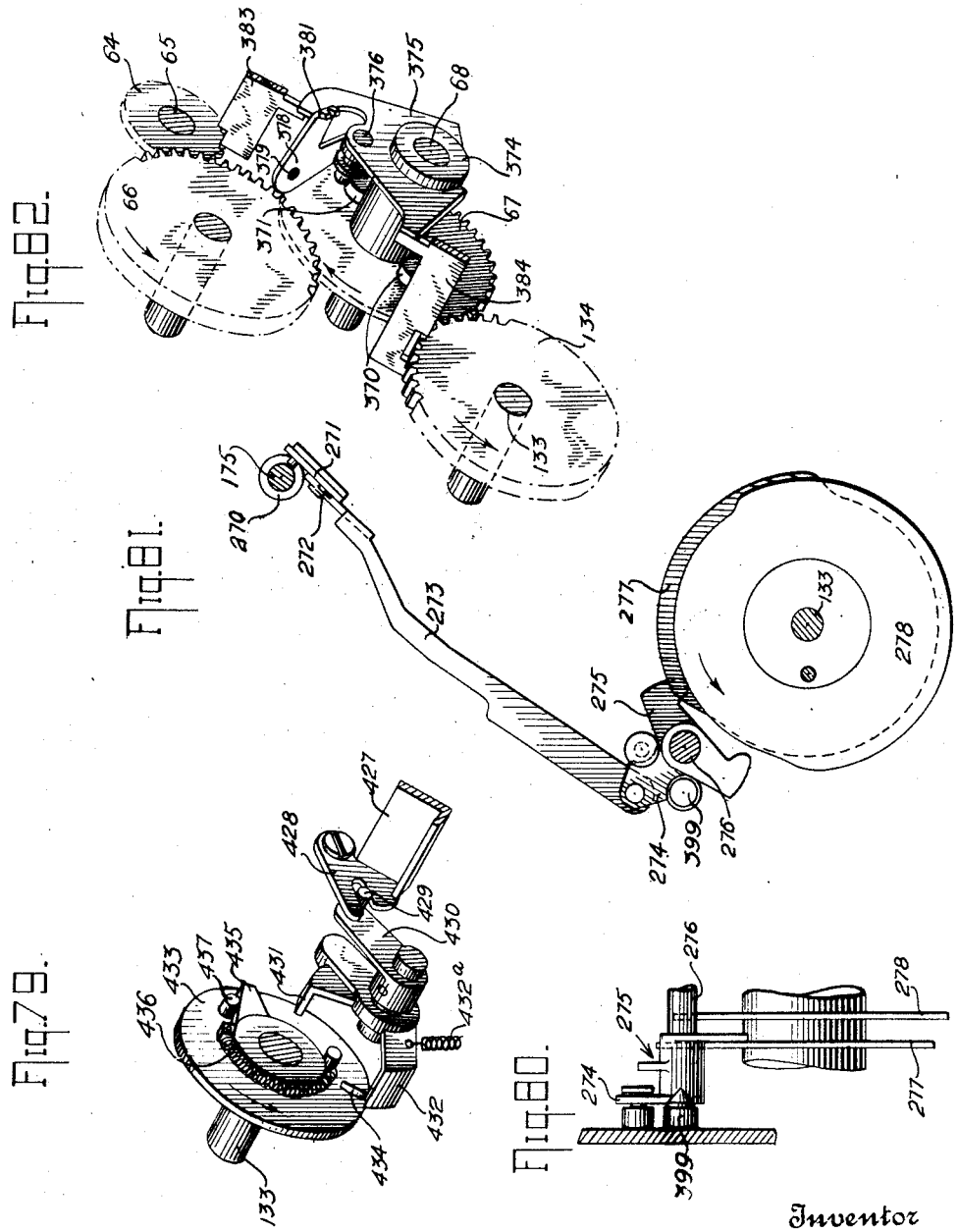
Inventor
HYMAN GOLBER
By his Attorneys
Newell & Spencer

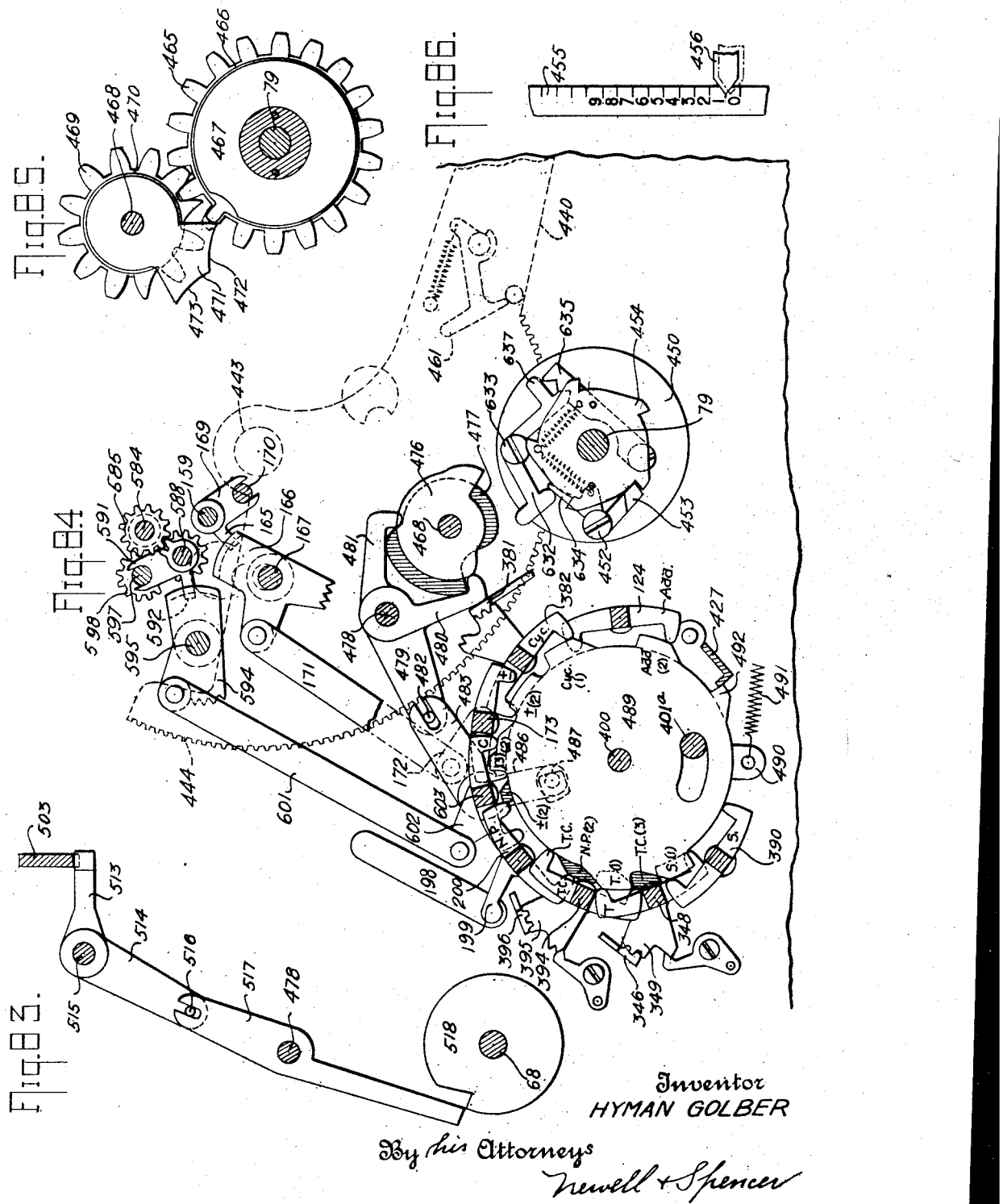

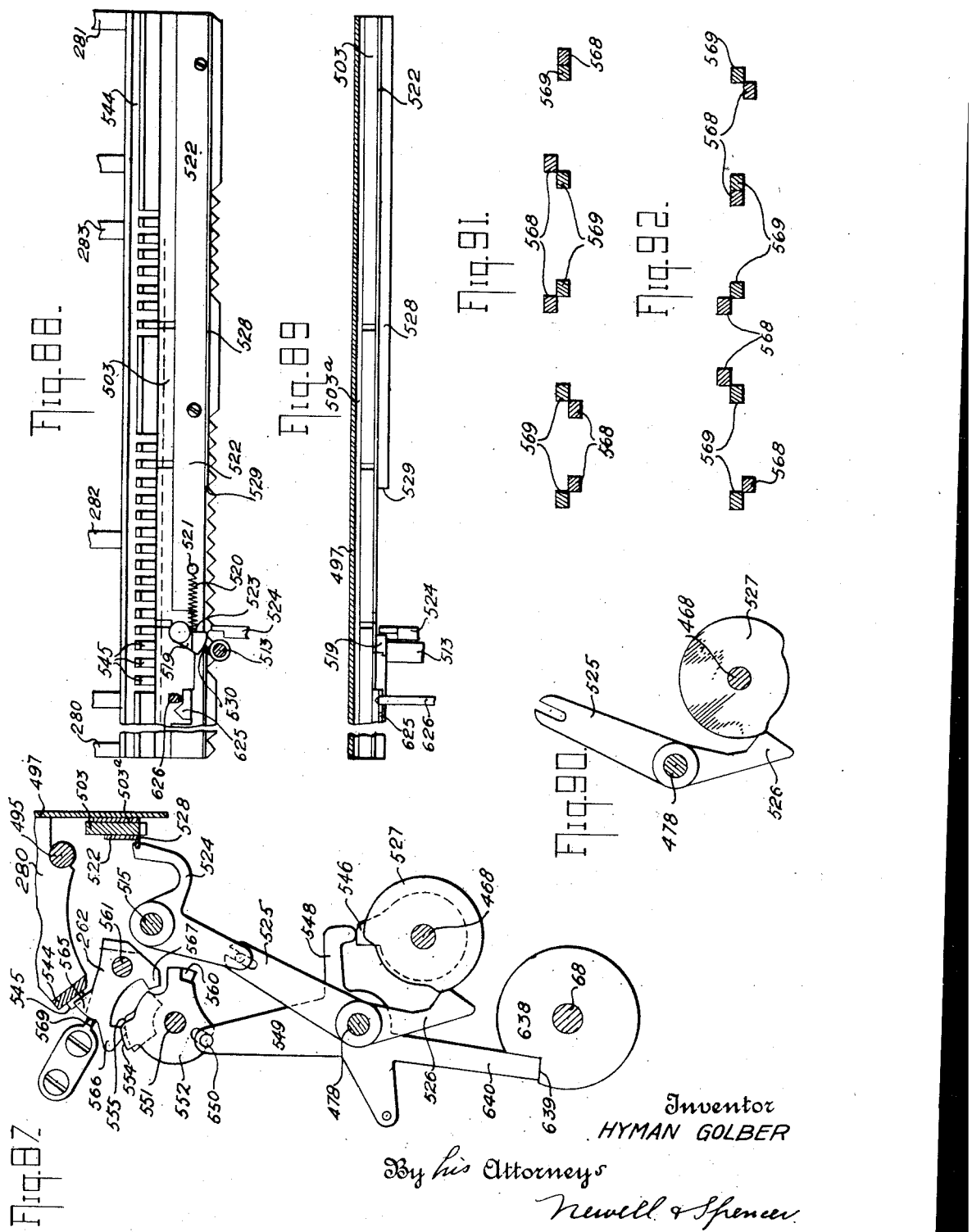

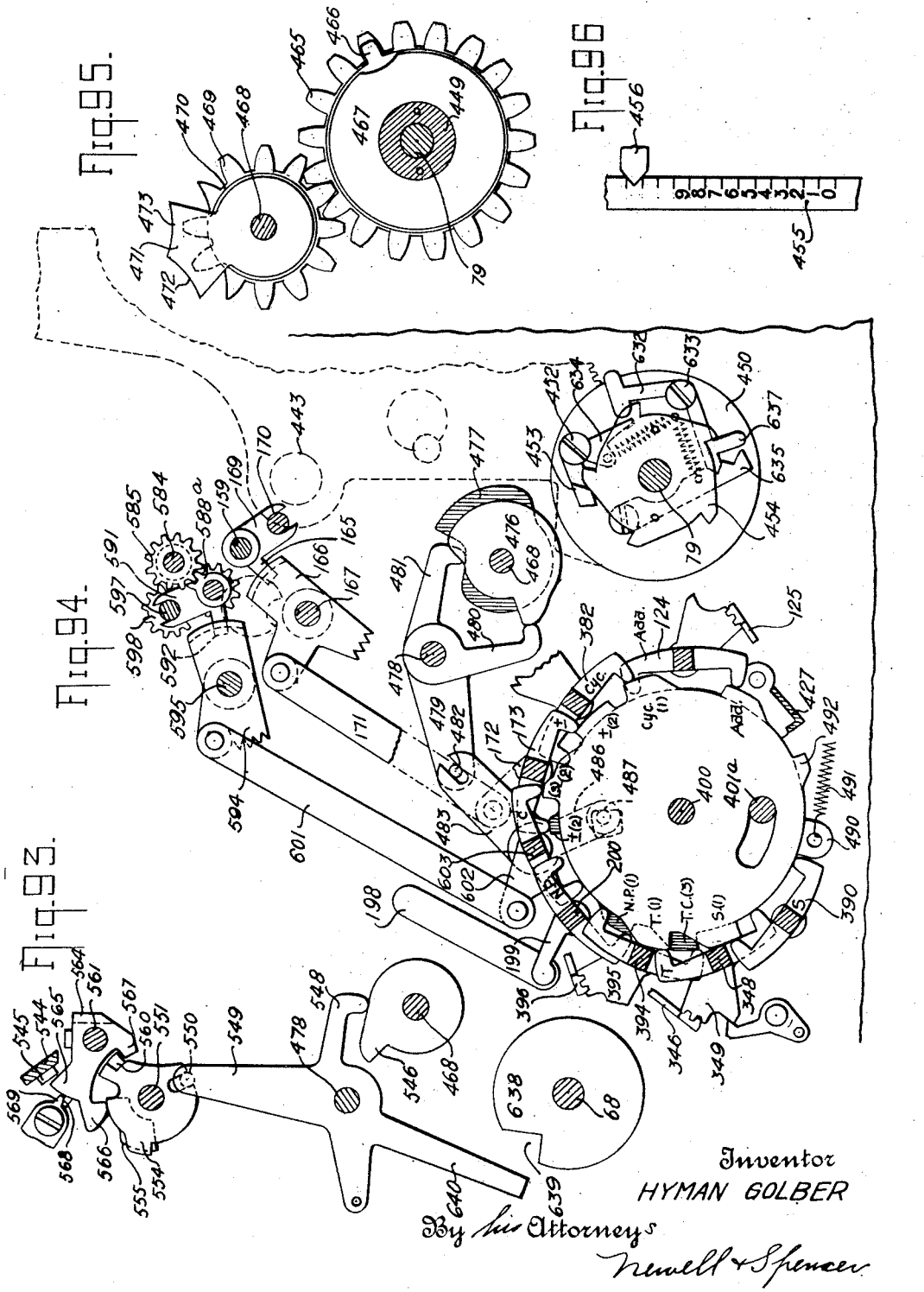

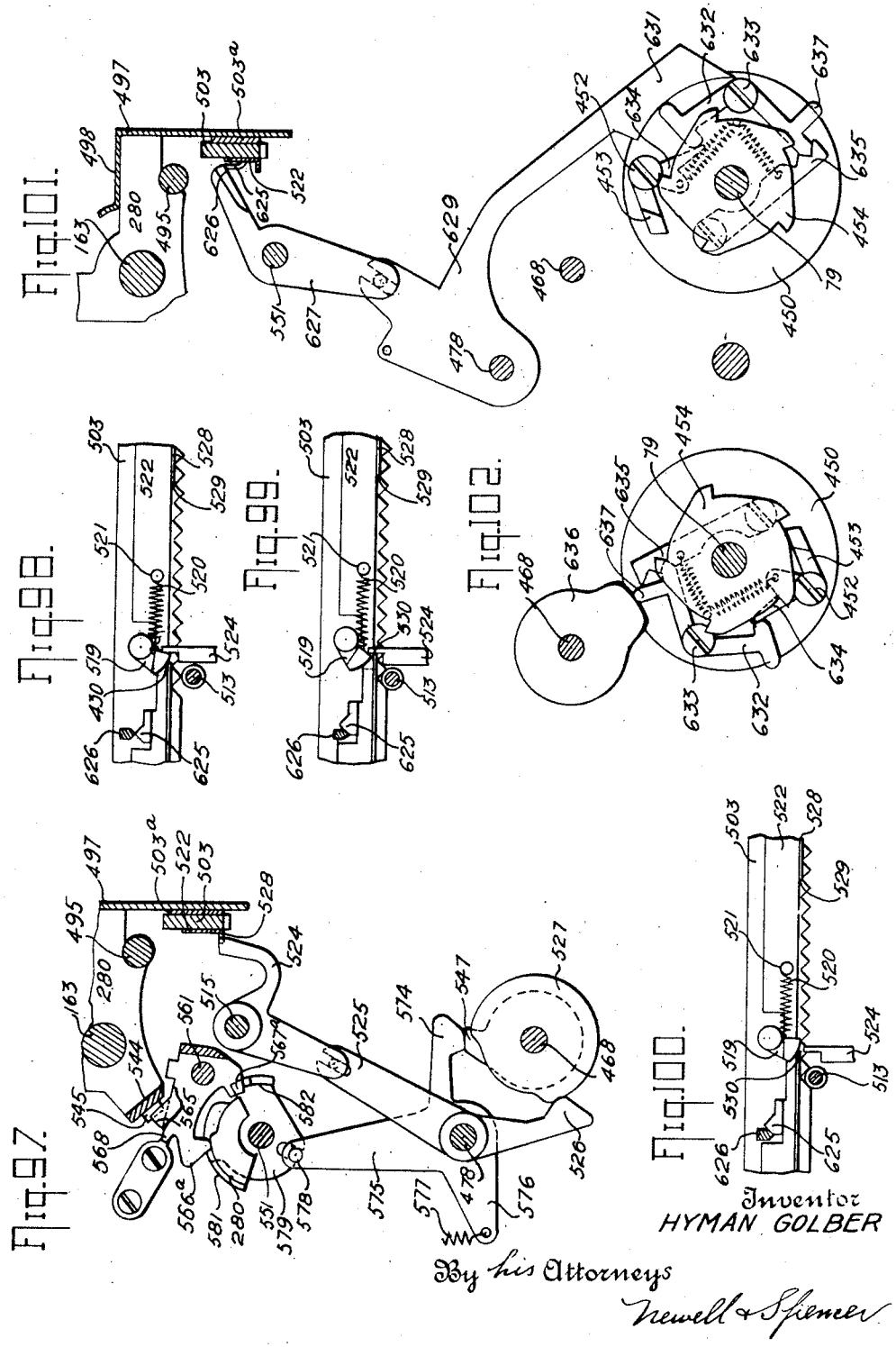

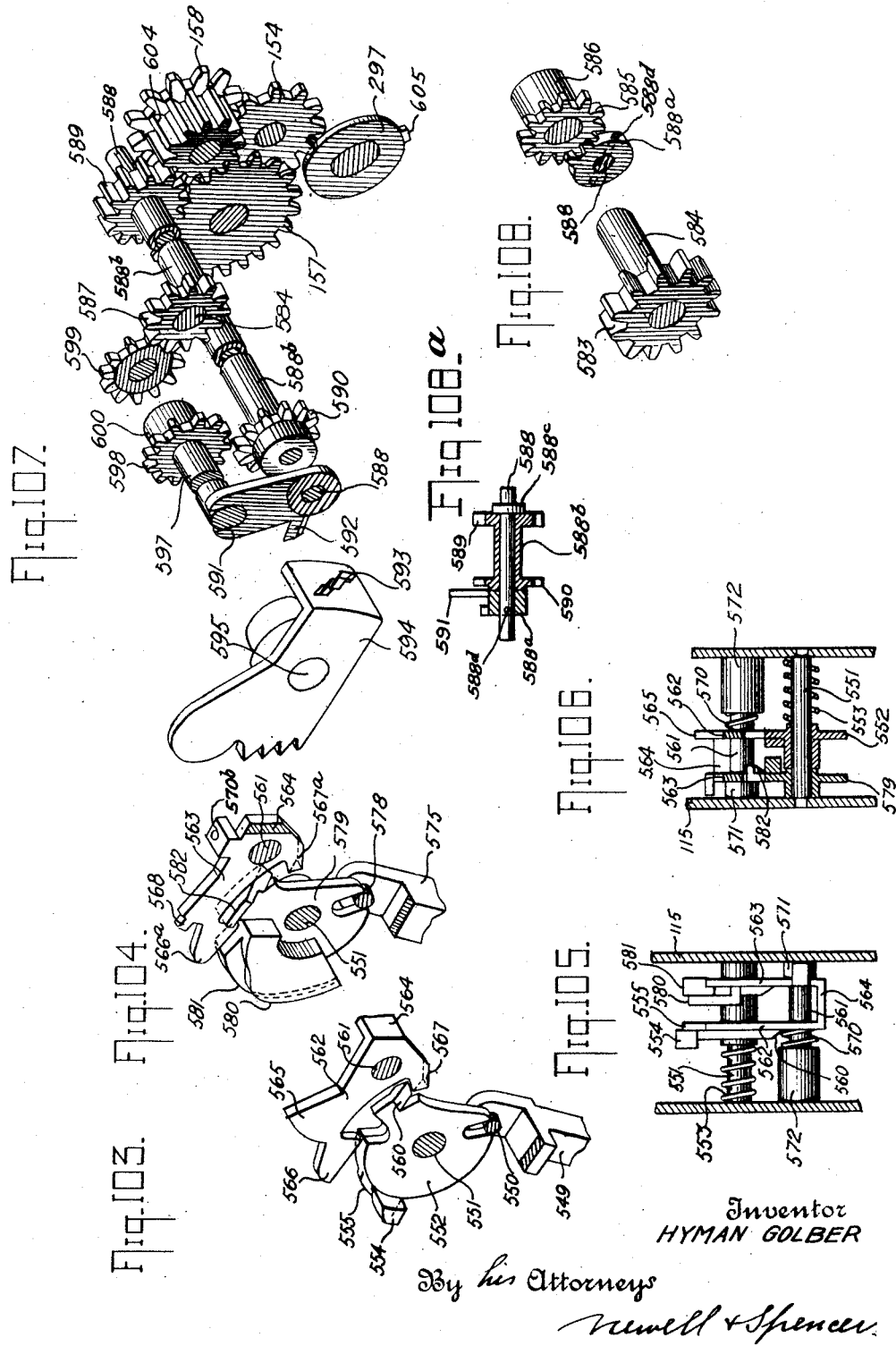

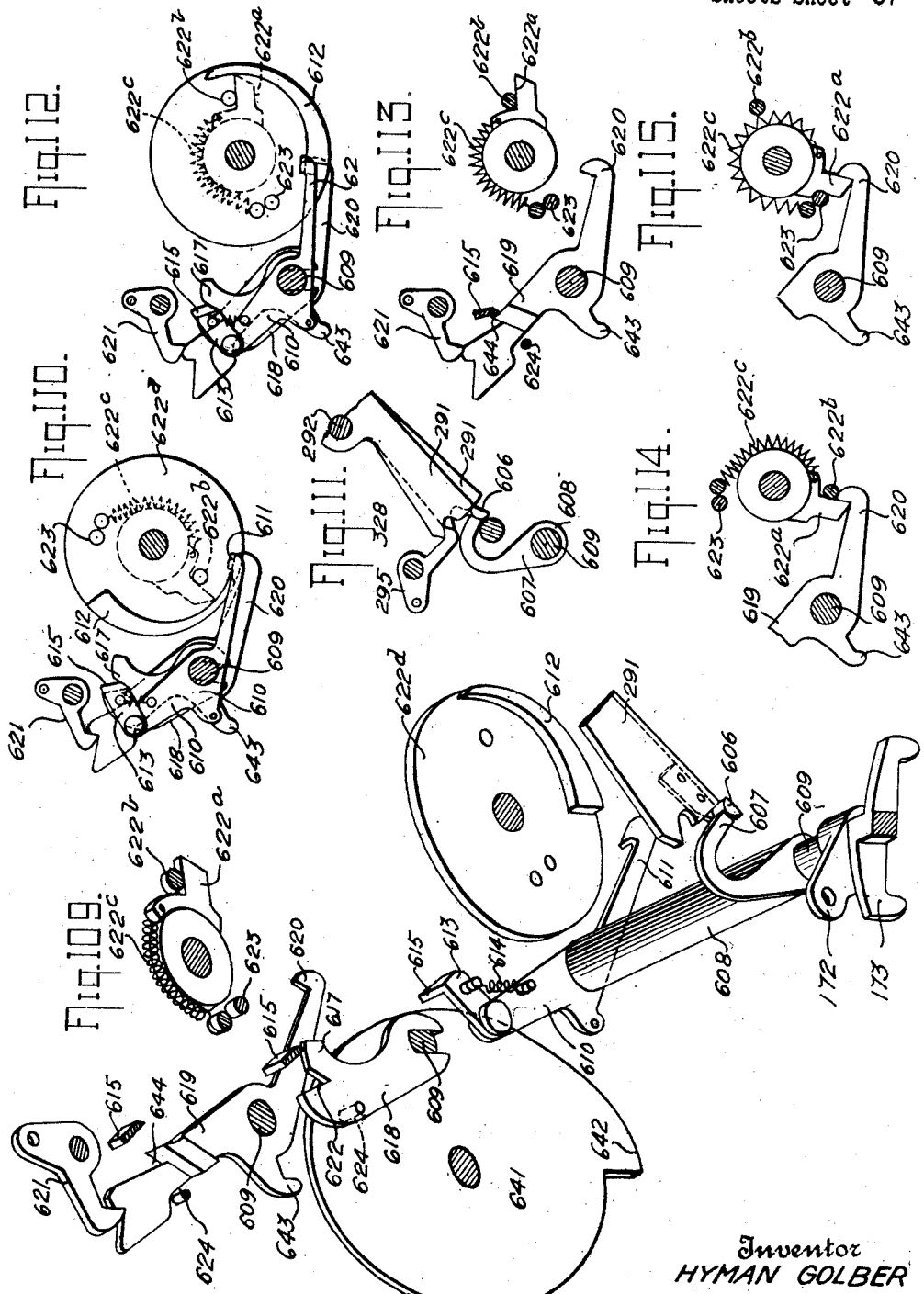

INVENTOR
HYMAN GOLBER
BY
Newell Spencer
ATTORNEY

Aug. 26, 1930.  H. GOLBER  1,774,367
CALCULATING MACHINE
Filed Aug. 18, 1923  39 Sheets-Sheet 39
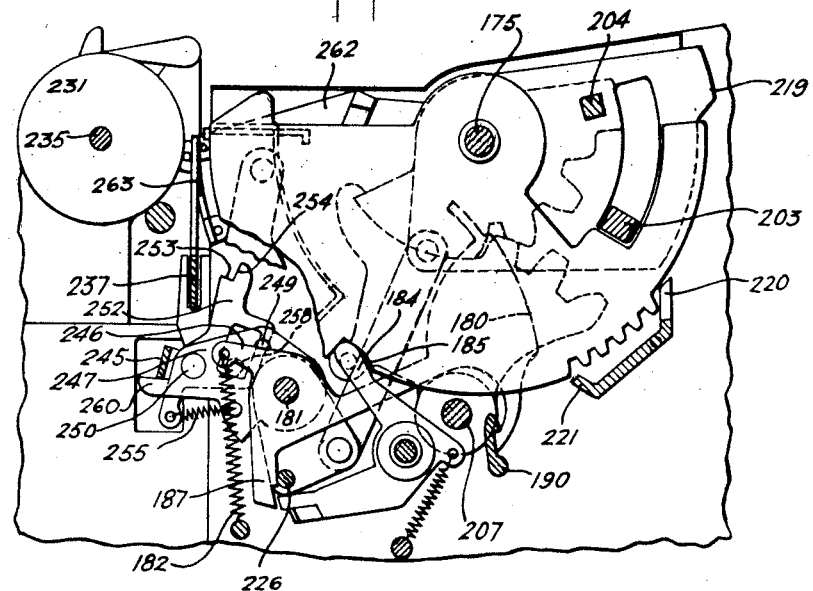
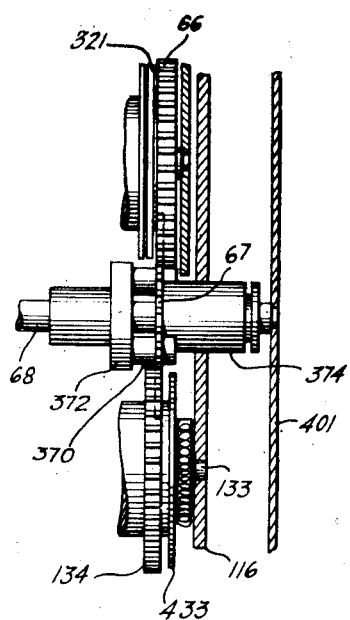
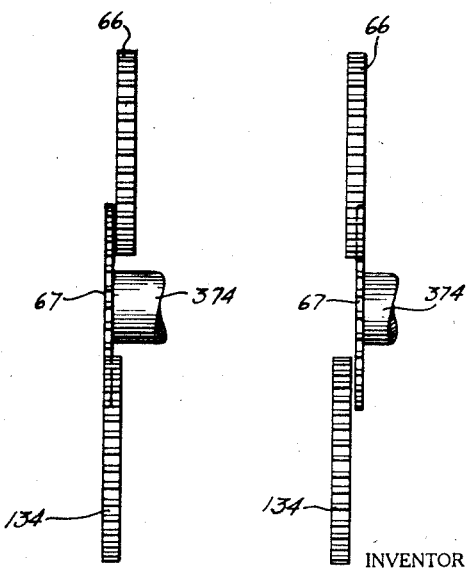
INVENTOR
HYMAN GOLBER
BY
ATTORNEY Patented Aug. 26, 1930

1,774,367

UNITED STATES PATENT OFFICE

HYMAN GOLBER, OF CHICAGO, ILLINOIS, ASSIGNOR, BY DIRECT AND MESNE ASSIGNMENTS, TO COMPLETE CALCULATOR COMPANY, OF CHICAGO, ILLINOIS, A CORPORATION OF ILLINOIS

CALCULATING MACHINE

Application filed August 18, 1923. Serial No. 657,999. REISSUED

My invention relates to calculating machines which both compute and print, and an object of my invention is to produce a structure which is compact, convenient and easy of operation, of relatively few parts, and which is capable of performing all of the usual arithmetical processes, together with totaling and sub-totaling.

A feature of the invention resides in the provision of spring means which are put under tension by the operation of any one of a series of digit keys, such spring means being controlled by each key to turn a setting-up disk an amount depending upon the digital value of the key which is depressed.

Another feature resides in the use of a universal spring urged bail moved a constant amount by each digit key, and acting to return the key and key connections to normal position and to also operate an escapement mechanism whereby the keys may act successively on the setting-up disks to set up a number.

Another feature resides in the mounting of said disks so as to be rotated as a series in the same direction as the setting-up movement, said disks having fixed teeth thereon whereby to engage a totalizer train during the rotations of the disk to transfer to the totalizer train a number set up.

Another feature resides in the provision of means whereby the said setting-up toothed disks are slipped sideways while engaged with the totalizer train at the moment the set-up has been transferred, so that the disks may continue their rotation to normal position free from said train.

Another feature of the invention relates to novel means whereby the set-up is transferred to the totalizer train in either a plus direction or a minus direction.

Another feature relates to the provision of totalizer wheels oppositely rotatable for addition and subtraction, and means to rotate said wheels to zero in a constant direction to set up a total on the printing mechanism.

Another feature relates to the provision of totalizer wheels, with printing and carrying mechanism in train therewith, together with means for setting up a number on the totalizer and printing mechanism and afterwards operating the carrying mechanism to transfer to higher orders in the totalizer wheels, with provision for disconnecting the printing mechanism from the train during the carrying operation.

Another feature relates to the provision of driving mechanism in the form of a short stroke operating bail situated immediately adjacent the front of the key-board and on a level with it.

Another feature resides in the provision of a handle separate from the operating bail for controlling the operations of multiplication and division, and for convenience called the muldiv handle.

Another feature is the provision of means whereby the muldiv handle effects preliminary setting of the parts to perform either multiplication or division, and also acts as an operating mechanism for carrying out these processes.

A further feature of the invention resides in the complete visibility of the various factors such as the set-up, total, divisor, dividend and quotient, with provisions for printing each factor.

A still further feature resides in the novel control of a number of functions of the machine through means of a series of operation disks and rockers operated thereby.

While the above are a few of the features of my improved machine, there are numerous and various other features and advantages which will become apparent from a consideration of the following detailed description and claims when considered in connection with the accompanying drawings in which Figure 1 is a side elevation of the right side of the machine;

Fig. 2 is a plan view;

Fig. 3 is a front elevation;

Fig. 4 is a front elevation taken just back of the keyboard on line 4—4 of Fig. 1;

Fig. 5 is a section taken on the line 5—5 of Fig. 1;

Fig. 6 is a longitudinal section taken on line 6—6 of Fig. 2;

Fig. 7 is a longitudinal section taken on line 7—7 of Fig. 2;

Fig. 8 is a detail view of the driving means between the carry drum and the carry spiral;

Fig. 9 is a vertical section taken on line 9—9 of Fig. 2;

Fig. 10 is a perspective of one of the addendor disks;

Fig. 11 is a fragmentary side view of the digiting and setting up mechanism with a key depressed;

Fig. 12 is a perspective of the right hand disk which forms a part of the addendor;

Fig. 13 is a fragmentary front view partially in section of the mechanism shown in Fig. 11;

Fig. 14 is a figure similar to Fig. 11 showing the digiting mechanism returned to normal position;

Fig. 15 is a fragmentary elevation of the escapement mechanism in actuated position when the key is depressed as shown in Fig. 11;

Fig. 16 is a perspective of the universal bail;

Fig. 17 is a perspective of the escapement bail;

Fig. 18 is a detail of the 0 digit plate;

Fig. 19 is a detail of the 9 digit plate;

Fig. 21 is a fragmentary vertical section taken on line 21—21 of Fig. 2;

Figs. 22 and 23 are fragmentary views of the Geneva elements;

Fig. 24 is a detail view of the assembled Geneva gears;

Fig. 25 is a fragmentary vertical section taken on line 25—25 of Fig. 2;

Fig. 26 is a detail of the cross cams shown in Fig. 25;

Fig. 27 is a detail of the zone lock lever also shown in Fig. 25;

Fig. 29 is a vertical section taken on line 29—29 of Fig. 2;

Fig. 30 is a fragmentary front view of the parts positioned for repeated addition;

Fig. 31 is a fragmentary detail of a portion of the repeat mechanism in position for repeat;

Fig. 32 is a fragmentary perspective of the connection between the addendor locking pinion and its cooperative Geneva, said pinion being in position for repeat;

Figure 32ª is a fragmentary section of a portion of the eraser bar and plate 115.

Figure 54:
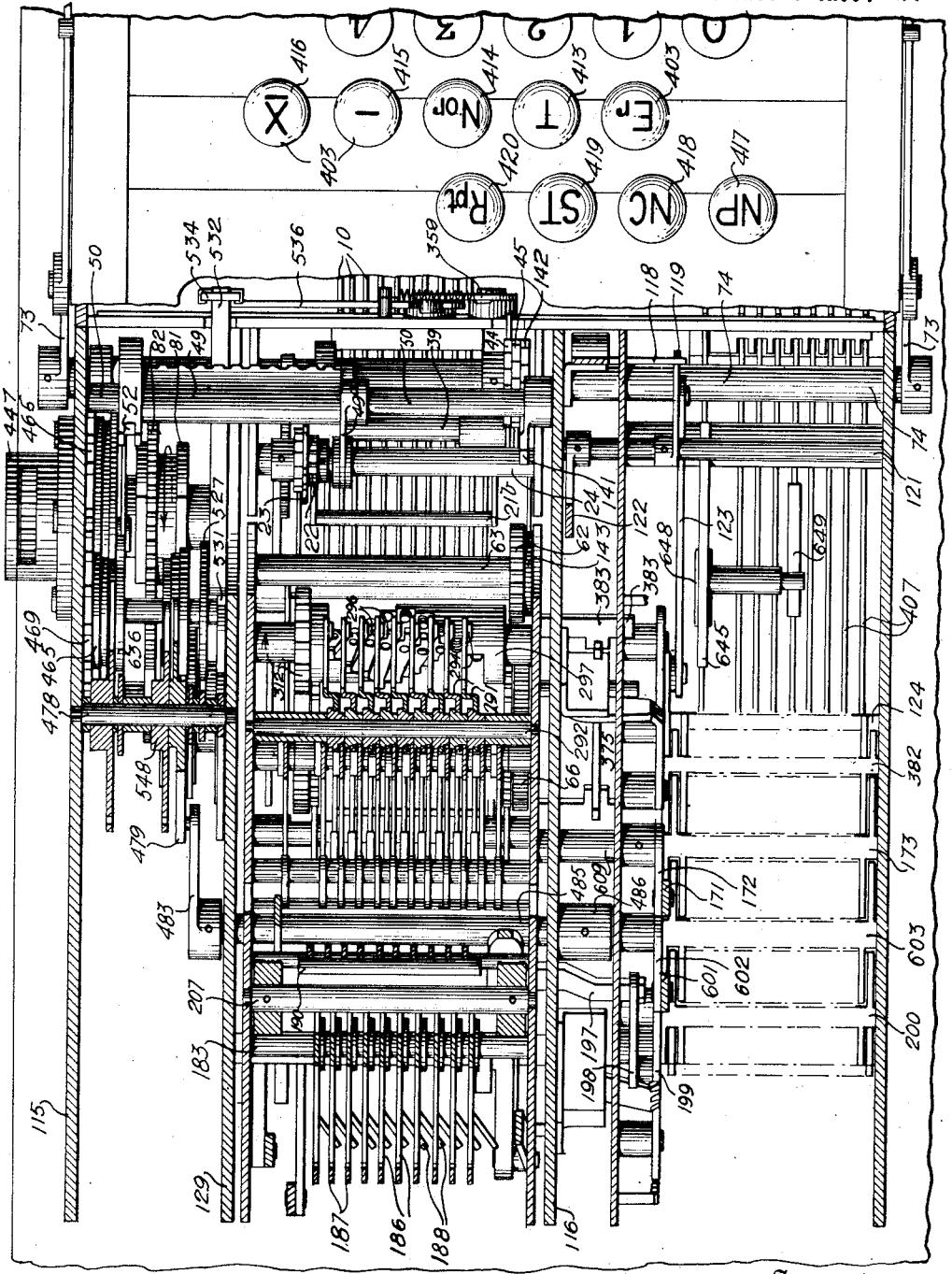

Fig. 33 is a fragmentary perspective of the locking pinion in relation to the Geneva when the machine is set to normal;

Fig. 34 is a fragmentary section taken on line 34—34 of Fig. 5, also showing the position of the pinion in respect to the setting Geneva when the machine is in position for erasing;

Fig. 35 is a section on line 35—35 of Fig. 30 showing the relation between the locking pinion and the Geneva when the machine is set to repeat;

Fig. 36 is a transverse vertical section taken on line 36—36 of Fig. 2 looking to the rear of the machine;

Fig. 37 is a detail view of the left unmultiply disk;

Fig. 38 is a detail view of the right unmultiply disk;

Fig. 39 is a substantially horizontal fragmentary section of the machine showing the train of gearing between the addendor and the printing segments;

Fig. 40 is a fragmentary detail showing the train of gearing between the addendor and the printing segments broken;

Figs. 41 to 44 are front elevational views showing the train of connections from the addendor disks to the totalizer wheels under various conditions of adjustment of the plus-minus shift gears;

Fig. 45 is a fragmentary front view disclosing the location of the carrying levers in respect to the totalizer wheels;

Fig. 46 is a rear view of the machine with the platen removed;

Fig. 47 is a detail perspective of the ribbon and platen feeding means in normal position;

Fig. 48 is a transverse vertical section taken on line 48—48 of Fig. 1 looking towards the front of the machine;

Fig. 49 is a detail perspective view of the ribbon and platen feeding mechanism when the same is in actuated position;

Fig. 50 is a fragmentary perspective of a part of the platen feeding mechanism when in normal position;

Fig. 51 is a horizontal section taken on line 51—51 of Fig. 1 looking down;

Fig. 52 is a fragmentary perspective of the type segment restoring mechanism;

Fig. 53 is a fragmentary perspective of the totalizing mechanism and also the type coupler controlling mechanism;

Fig. 54 is a horizontal section looking down upon the machine and taken on line 54—54 of Fig. 1;

Figs. 55 and 56 are fragmentary transverse vertical views taken on line 55—55 and 56—56 respectively of Fig. 2 looking towards the front of the machine;

Fig. 57 is a fragmentary perspective of the locking means for the carry levers and parts related thereto;

Figs. 58, 59 and 60 are fragmentary vertical sections of the machine disclosing the carrying mechanism in position for carrying;

Figs. 61 to 69 disclose the various positions of the carry finger during a carry operation;

Figs. 70 to 78 are details of the operation disks;

Fig. 79 is a fragmentary perspective of the special key release mechanism;

Fig. 80 is a fragmentary view showing the position of a part of the type coupler mechanism;

Fig. 81 is a fragmentary side view of Fig. 80 showing the position of the type coupler control mechanism;

Fig. 82 is a fragmentary perspective of the gear shift between the carry drum and the cam shaft;

Fig. 83 is a detail of the totalizer displace lock;

Fig. 84 is a fragmentary view of the machine showing the parts set for multiplication;

Fig. 85 is a detail view of the Geneva elements when the handle is raised to multiply by 1;

Fig. 86 is a fragmentary view of the muldiv lever indicating scale;

Fig. 87 is a fragmentary view of the machine disclosing the multiplication feed and the zone lock in actuated position;

Fig. 88 is a fragmentary rear view of the totalizer carriage;

Fig. 89 is a fragmentary top view of parts shown in Fig. 88;

Fig. 90 is a fragmentary detail view of the zone lock in actuated position;

Fig. 91 and 92 disclose the various positions of the totalizer feed lug when feeding for multiplication and division respectively;

Fig. 93 is a detail view of the multiplication feed mechanism in normal position;

Fig. 94 is a fragmentary view of the machine showing the same set for division;

Fig. 95 is a detail view of the Geneva element showing the same in position when the machine is set for division;

Fig. 96 is a fragmentary view with the muldiv lever in its extreme upper division position;

Fig. 97 is a fragmentary view of the machine disclosing the division feed mechanism;

Figs. 98, 99 and 100 show the position of the carriage in respect to the zone lock;

Fig. 101 is a fragmentary view of the muldiv pawl disconnect mechanism;

Fig. 102 is a detail view of the muldiv pawl re-connect mechanism;

Fig. 103 is a fragmentary perspective of the multiplication feed mechanism;

Fig. 104 is a fragmentary perspective of the division feed mechanism;

Fig. 105 is a fragmentary top elevation of the multiplication and division feed mechanism;

Fig. 106 is a fragmentary vertical section, looking towards the front of the machine, of the multiplication and division feed mechanism;

Figs. 107 and 108 are fragmentary perspective of the counter actuating mechanism;

Figure 108$^a$ is a detail of the shaft 588 and sleeve 588$^b$ and associated parts.

Fig. 109 is a detached perspective view of the mechanism brought into operation during over-subtraction;

Figs. 110 and 115 disclose the position of such parts during such over-subtraction.

Figure 116:
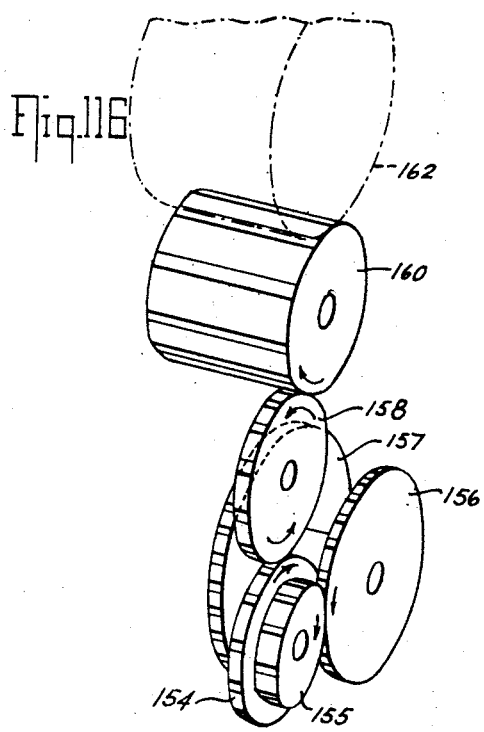
Figure 117:
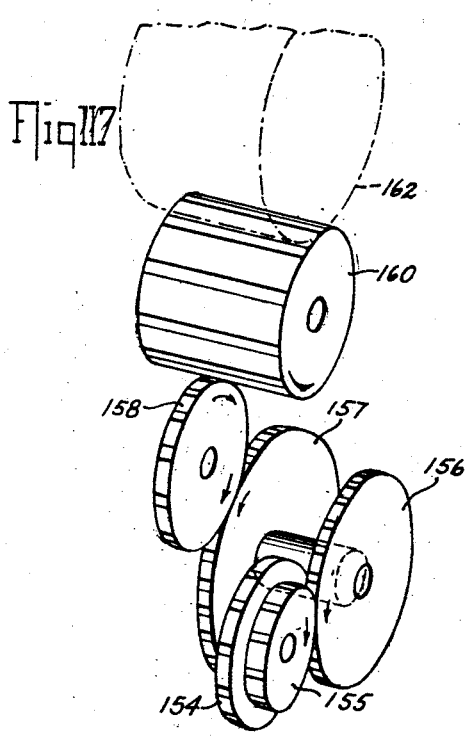
Figure 118:
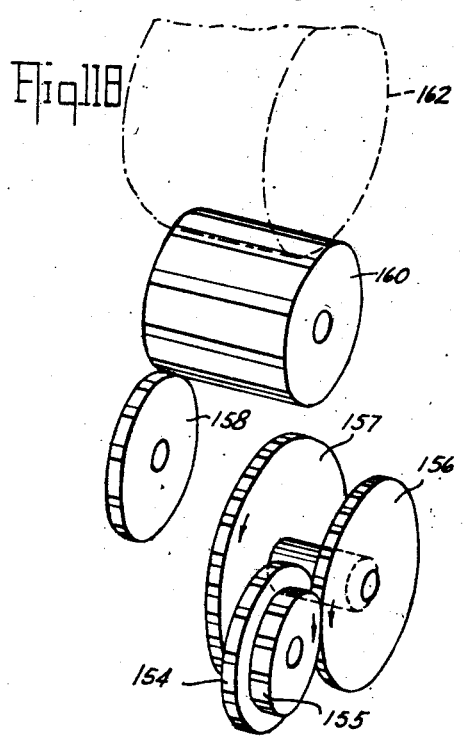
Figure 119:
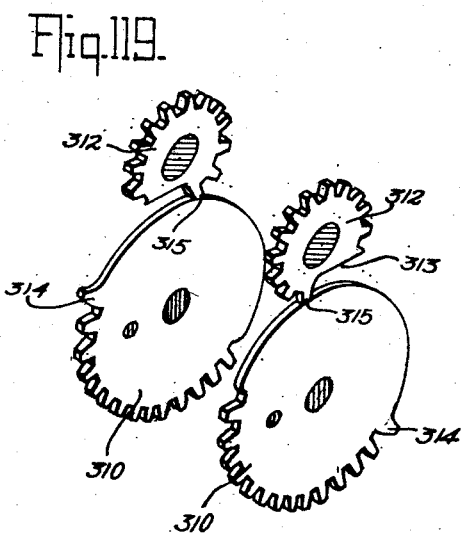

Fig. 116 is a more or less diagrammatic perspective view of the parts shown in Figure 42 with the parts set for addition;

Fig. 117 is a perspective view of the same parts set for subtraction;

Fig. 118 is a perspective view of the same parts set for non-add;

Fig. 119 is a perspective view of the parts shown in Figure 8;

Fig. 120 is a view showing those parts connected more particularly with the ribbon shift mechanism; and Figs. 121, 122 and 123 are views showing various positions of the gear 67.

The invention in its broad aspects provides a machine having ten keys upon which any number may be set up by depressing the keys in the natural order of the number. A series of toothed addendor disks, mounted in a carriage movable laterally step by step under key control and designated the addendor, receive the set up from the keys, the disks being independently rotatable under key control and are locked in set position. Depression of an operation bail situated adjacent the keyboard and at a level therewith serves to cause the addendor to be rotated as a whole in the same direction as the setting up movement to transfer the number to the totalizer wheels and to the printing mechanism through the medium of gearing constituting transfer trains. During this rotation the addendor is slipped sideways immediately after the transfer to disaline the teeth of the addendor disks and transfer trains, after which the disks are unlocked and re-positioned at normal and the addendor is also returned to its normal lateral position. The printing mechanism is in the form of reciprocatory type sectors which are positioned during the transfer of the set up to the totalizer. During return of the sectors to normal they are disconnected from the transfer trains, and during this time carrying mechanism is brought into operation, this mechanism acting to drive the totalizer wheels through a part of the transfer trains. Thus there is no interference between the carrying mechanism and the printing mechanism. Shiftable connections in the transfer train provide for reversing the direction of drive of the totalizer wheels for subtraction.

Total and sub-total keys control devices for returning the totalizer wheels to zero to set up and print the total on the type carriers, and during this operation the carrying mechanism is rendered ineffective.

The addendor disks, instead of being unlocked and reset after each item is transferred, may remain locked to transfer an item a number of times to the totalizer for ordinary repeat operations or for multiplication and division; this machine operating for multiplication on the principle of repeated addition, and for division on the principle of repeated subtraction. A single lever designated the muldiv handle is provided which serves to both set the machine for either multiplication or division and to operate it after being set.

The number to be multiplied is set up on the addendor which is then rotated a number of times corresponding to each digit of the multiplier. The muldiv handle causes this rotation, and the number of rotations depends on how high the handle is raised from normal position. An index plate reading from 0 to 9 serves as a guide for this purpose and raising of the handle from normal to 1 sets the machine for multiplication. If it is raised to 5 and then depressed, the addendor is rotated 5 times and transfers the multiplicand 5 times to the totalizer. The muldiv handle near the end of its down stroke and after the last rotation of the addendor has progressed far enough to have transferred the number to the totalizer, shifts said totalizer one denominational order to the right ready for transferring thereto of the multiplicand in the next higher order to correspond with the multiplier in tens order. A counter is moved one step for each rotation of the addendor thereby indicating the multiplier and from the counter wheels the multiplier may be printed by performing a totalizing operation with the counter wheels in engagement with the type sectors instead of the totalizer wheels.

In division the muldiv handle is moved to its extreme upper limit to set the machine, this setting resulting in changing the drive to the totalizer for subtraction. The dividend may be the result of several additions and appears on the totalizer wheels. The divisor is set up on the addendor and the muldiv handle pulled downwardly.

The totalizer is so positioned laterally that the wheel of highest denomination in the dividend is in alinement with the wheel of highest denomination in the divisor. Repeated rotation of the addendor will then result in repeatedly subtracting the divisor from the dividend and when the number has been subtracted once too many, carrying will take place in the totalizer wheel of highest order. This fact is utilized to bring devices into play which immediately shift the transfer trains back to add, and the divisor is added once to the dividend. The muldiv handle is also locked from further downward movement, this locking serving as a signal that the handle must now be lifted to its highest position. This causes the carriage to be fed one step to the left so that rotations of the addendor will now subtract in denominations one lower than previously. This process is continued until the units wheel of the totalizer is alined with the units set-up on the addendor and when the muldiv handle becomes locked on its downward movement the division has been completed. Should, however, the operative again move the handle to its extreme upper position resulting in feeding the totalizer carriage one step to the left from units place, devices controlled by the carriage, disconnect the muldiv handle from the driving mechanism of the addendor and said handle then drops free.

The counter indicates the quotient which may be printed, the remainder, if any, appearing on the totalizer from which it may also be printed.

Various shiftable devices, such as the gearing for changing from addition to subtraction, the devices for repeating the number set upon the addendor, the setting for totalizing, setting for non-print and others, are controlled by a set of rockers pivoted circumferentially about a series of operation disks which are controlled by special keys and also by the muldiv handle. By this arrangement the special keys and muldiv handle serve to set one or more rockers, depending upon what functions it is desired that the machine perform.

Various safety locks are also provided to insure accuracy of operation and proper timing.

With this preliminary sketch of some of the more prominent features of the machine its detailed construction and operation will, it is thought, be more readily understood.

For convenience of description mechanisms more or less complete in themselves are described under appropriate headings, although this method does not lend itself to complete development owing to the inter-relationship of parts in a machine of this character and especially the machine of the present invention wherein comparatively few parts are necessary, but where the functions given to these parts may be quite varied and numerous.

*Key mechanism.*—The keys are ten in number and consist of a zero key and nine digit keys, as indicated in Figures 1 and 2. Each key is composed of a finger piece 1 mounted on the top of a vertical stem 2, Fig. 3, which stem is connected at its lower end to an arm 3 fastened to a shaft 4. There are a number of these shafts which extend horizontally between two plates 5 and 6 in which they are journaled, the arms 3 being rigid on the shafts. In order that the keys may operate mechanism which is arranged closely together while the keys themselves are spaced apart for convenience in manipulation, some of the shafts, in addition to the arm 3, also have an additional arm 7, as shown in connection with the 5 key, Fig. 3, which arm 7 is similar to the arm 3 but arranged in a different plane on the shaft, and connected to this arm is a vertical link 8 which engages a bellcrank 9 loosely pivoted on the lowest shaft 4, and to the bellcrank 9 is pivoted a thrust link 10, clearly shown in Figs. 6 and 7, wherein are shown the keys for the 2 and 7 and the 4 and 9 digits respectively. The keys for the 5, 6, 7, 8 and 9 digits are arranged at the extreme front of the machine, while in the next adjacent row are the keys for the 0, 1, 2, 3 and 4 digits. These latter keys are similarly connected to bellcranks 9 on a shaft 4 situated immediately behind the frontmost shaft 4. In the case of the 9 key its stem 2 connects directly to the bellcrank 9, as shown in Fig. 3. It is, of course, understood that the links 8 are longer or shorter, depending upon the key to which they are connected. This arrangement results in permitting the thrust links 10 to be arranged closely adjacent one another in the lower portion of the machine and when any digit key is depressed its corresponding link 10 is thrust rearwardly. Each link 10 is pivoted at its rearward end, Figs. 6, 7 and 11, to the lower end of a digit piece 11, there being one digit piece for each key, including the zero key, all of which digit pieces being pivoted on a shaft 12 for independent movement. A spring $12^a$ is connected to each digit piece and serves to maintain it and the key connections, in normal position.

The digit pieces serve to differentially position a master wheel, which is driven by spring means on return of any key to normal, each key serving to put the spring means under tension.

The construction of the digit pieces will be understood by reference to Figs. 11 and 14 wherein is shown the digit piece for the 5 key, and Figs. 18 and 19 in which the digit pieces for the zero key and 9 key appear. Depression of a key results in moving a digit piece to the position shown in Fig. 11, each digit piece, except the zero, having a forward cam surface $11^a$ and a rear locking surface $11^b$, together with an escapement bail operating nose $11^c$.

Also mounted upon the shaft 12 is a universal bail 13 held in normal position by two springs, one of which is shown at $13^a$, Fig. 7, and both of which are shown in Fig. 16. These springs are stronger than the springs $12^a$ although they act in conjunction with them, the purpose of the springs $13^a$ being to furnish the power by which the master wheel 23 is rotated. The bail 13 is composed of side frames $13^b$ and $13^c$, Figs. 5 and 16, connected by a plate $13^d$ which extends in front of all of the digit pieces and is adapted to be engaged by them whereby the universal bail is rocked on the shaft against the tension of its springs. Each digit piece 11 is moved a constant distance by its key and therefore the universal bail is moved a constant distance and when the key is released the power of the springs $13^a$ act through the universal bail and cause it to be restored to normal position and cause its connecting plate $13^d$ to engage and restore to normal any displaced digit piece. The power of the springs $12^a$ also assist in this operation, but they are not relied upon and need be only of sufficient strength to maintain the parts in normal position.

There is also pivoted on the shaft 12 an escapement bail comprising a framing composed of side plates 14 and 15 and connecting portions 16 and 17, as shown in Figs. 5, and 17. The connections from this bail will be described in connection with the escapement mechanism.

Cooperating with each digit piece, to be moved thereby, is a master sector frame loosely mounted on the shaft 19. This frame consists of a right frame piece 18 at the end of which is formed the master sector 20, and a left frame piece 21 pivoted on the shaft 19 and acting to give rigidity to the frame. The side frame members of the master sector have extending between them a front bar $21^a$ and a rear bar $21^b$. When a digit piece other than zero is rocked its cam portion $11^a$ engages the bar $21^a$ to thereby rock the master sector from normal position to any one of nine different positions depending upon the value of the key depressed. At the same time the locking portion $11^b$ comes under and is adapted to be engaged by the rear bar $21^b$ to lock the master sector against overthrow.

The height of the cam portion 11 and of the locking portion $11^b$ is different for each digit piece. For the zero key there is no cam portion $11^a$ because the master wheel is not positioned by the zero key. It is, however, essential that the master wheel be prevented from any movement at this time and therefore the locking portion $11^b$ of the zero digit piece is of such height that immediately upon the digit piece starting to move forwardly, said locking portion comes under the rear bar $21^b$ of the master frame to prevent any movement thereof. Since the master frame is moved to its greatest extent by the nine key, the digit piece corresponding thereto has its cam portion $11^a$ higher than that of any of the corresponding cam portions of the other digit pieces, and this results in moving the front bar $21^a$ the greatest distance when the nine key is depressed, the rear bar $21^b$ at this time engaging the locking surface $11^b$.

As any key is released the springs $13^a$ return the universal bail and this in turn restores any digit piece. This universal bail is also provided with projections $13^e$, one on each of its side frames $13^b$, $13^c$, Figure 16, adapted to cooperate with the bar 21ᵇ to thereby restore the master sector to normal position.

In order to permit the bar 21ᵇ to move under control of any actuated digit piece without interference with those digit pieces which remain in normal position proper clearance is provided. In those digit pieces representing keys from 2 to 8 inclusive, such clearance takes the form of a notch or cut out portion 11ᵈ, Figs. 11 and 14, between the rear of the cam portion 11ᵃ and the beginning of the locking portion 11ᵇ.

The master sector rack 20 engages a pinion 22 which has rigidly connected therewith a master wheel 23, both pinion and wheel being loosely mounted on the shaft 24 between collars secured to the shaft, as indicated in Fig. 5.

From the mechanism thus far described, it will be apparent that depression of any key will result in the operation of a digit piece which in turn will engage the universal bail, put the springs 13ᵃ under tension, and position the master sector and the master wheel a distance corresponding to the digital value of the key depressed. When the key is released the springs 13ᵃ return the universal bail and consequently the digit piece, which has been moved, and also the key connections, to normal position, resulting in returning the master wheel to normal, and it is during this return to normal that the master wheel sets up the digit corresponding to the depressed key.

*Addendor.*—The mechanism upon which the number is set up, is for convenience, termed the addendor, and includes a number of independently rotatable disks with which the master wheel may engage seriatim to rotate them an amount depending upon the digit key depressed. This addendor is in the form of a carriage slidable upon a shaft 25, Figs. 5 and 13, and comprises a left end plate 26 and a right end plate 27 connected by a sleeve 28. There is also an upper web 29 and a lower web 30 connecting the two side plates, these webs being notched for the purpose of guiding a series of addendor disks 31 supported for rotation on the sleeve 28. Each addendor disk has a series of ten exterior teeth 32 extending approximately a third of the way about its periphery, with which the master wheel engages, and also a series of interior locking notches 33, likewise ten in number, the disks having their web portions cut away forming segmental slots permitting their free movement under control of the master wheel through a sufficient angular distance to permit the set-up of a number. Flanges on the disks provide space for index numerals from 0 to 9, as shown in Fig. 10.

With the parts in normal position, the master wheel 23 occupies a position to the left of the leftmost disk of the series, as shown in Fig. 5. Upon the depression of a key, as indicated in Figs. 11 and 13, the addendor makes a partial step so that the first addendor disk to the left is positioned in the plane of the master wheel. As the key returns to normal position the teeth of the master wheel engage the exterior teeth 32 of the addendor disk in alignment therewith, and turn said disk a number of teeth corresponding to the distance the master wheel has been positioned by the key. As the key reaches its normal position the addendor completes its full step of movement to the left and the master wheel is freed from the disk which it has just turned. The above cycle of operations is repeated upon the depression of each key, the addendor making successive movements to the left. In Fig. 13 the parts are shown as they would appear with a key in depressed position, the addendor having made its partial stepping movement and in said figure the master wheel is shown in alignment with the fourth addendor disk, indicating that there have been four key depressions.

Normally, all the addendor disks are locked by a locking bar 34 engaging the internal locking notches of all of the disks. In order, however, to permit the master wheel to rotate the particular addendor disk with which it is in alignment, said locking bar has a notch 35 cut therein, as indicated in Fig. 13, which notch is in such position that when the addendor makes its partial step to the left the addendor disk which is at that time aligned with the master wheel is unlocked and may be rotated. When, however, the addendor completes its step of movement to the left, said addendor disk is again locked in the position to which it has been moved.

*Escapement mechanism.*—The stepping movement of the addendor is brought about through the medium of the escapement bail already referred to, and said bail, as shown in Fig. 17, has extending from the left side frame 15 thereof an arm 36 having therein a notch 37 which receives the projecting end of an escapement dog 38 pivoted on the shaft 39. Also pivoted on the shaft 39 is a second escapement dog 40, a spring 41 connecting the two dogs and a surface 42 on the dog 38 engaging a pin 43 on the other dog. The escapement dogs 38 and 40 are adapted to engage escapement ratchets 44 and 45 respectively, said ratchets being secured to an escapement shaft 46 which also carries rigid therewith a spiral gear 47 engaging spiral teeth 48 on a block 49 slidably mounted on a shaft 50 and urged to the left by a spring 51, the right end of which is connected to the block 49 and the left end connected to a frame piece. Through means of the spiral teeth on the block 48 and gear 47, the spring tends to cause the escapement shaft 46 to rotate, such rotation however being normally prevented by the dog 40 engaging the teeth of the escapement wheel 45. Upon the depression of any digit key and the moving forward of the digit piece connected thereto the bail engaging nose 11ᶜ of the digit piece encounters the bar 16 of the escapement bail and rocks said bail together with the dog 38 from the position shown in Fig. 6 to the position shown in Fig. 15, and at the same time the surface 42 engages the pin 43 on the dog 40 and disengages this dog from the wheel 45 and permits the escapement shaft to rotate until a tooth of the wheel 44 encounters said dog. This permits a partial step of movement of the shaft 46 and consequent partial step of movement of the block 49. This block has formed at its right hand end, seen in Figs. 13 and 54, a notched or forked portion 52 which acts as a yoke to embrace the edge of the right addendor plate to thereby move the addendor in accordance with the stepping movement of the block.

To guide the block 49 so that it slides smoothly on its shaft, it is provided with an arm 49ᵃ, Fig. 54, embracing the master wheel shaft 24. With the escapement mechanism in the position shown in Fig. 15, the relation of the master wheel to an addendor disk is shown in Fig. 13, the addendor having made its first partial step of movement. The escapement dogs are held in the position shown in Fig. 15 by a spring urged detent 54, Fig. 6, which engages one side or the other of a triangular shaped lug on the lower end of the rigid escapement dog 38, the position shown in Fig. 6 being the normal position, and that shown in Fig. 15 being the actuated position. The half space movement of the addendor brought about by the mechanism just described occurs at the end of the down stroke of any digit key. Upon the release of the key and return of the universal bail a pin 55 projecting from the left wall thereof, Figs. 16 and 6, encounters a downwardly projecting portion 56 on the escapement bail and restores the same to normal position. This movement disengages the rigid dog from the escapement wheel 44 and permits the loose dog to be pulled into position by the spring 41, to encounter the advancing tooth on the wheel 45 so that as the key returns to normal position the escapement mechanism completes its movement and the addendor disk, which was in alinement with the master wheel, is freed therefrom and the master wheel is now positioned between two adjacent addendor disks.

*Addendor rotating and disk resetting mechanism.*—The shaft 25, upon which the addendor slides has secured to its right end a disk 58 and to its left end a disk 59, the former a mutilated gear for a purpose which will be later described, the latter disk being provided with teeth on its periphery for rotating the addendor. Also extending between the disks 58 and 59 are two rods 60 and 61, the rod 61 being rigidly fastened at its ends to each disk respectively, while the rod 60 is pivoted for oscillating movement in the walls of the disks (see Figs. 5, 6, 9 and 39). The rods 60 and 61 pass through openings in the addendor plates 26 and 27, Figure 39, and also through segmental slots in the addendor disks, Figure 14 and therefore do not interfere with their turning under control of the master wheel to an extent necessary to set up any number, said rods thus serving to drive the addendor when the disk 59 is driven.

After the number corresponding to the depressed digit keys has been set up on the addendor, as already described, the addendor as a whole is given a complete rotation in the same direction as the setting-up movement of the disks, to transfer the number, to a totalizer and to printing mechanism. This rotation is brought about by means of the left disk 59 whose toothed periphery is in engagement with an idler pinion 62, Figure 6, on a shaft 63 which, in turn, meshes with a second idler 64 on a shaft 65. The idler 64 meshes with a gear 66 on the carry drum (see Fig. 6) which, in turn, meshes with the gear 67 connected to the cycler shaft 68, which shaft is driven at each operation of the machine either by the operation bail 70 shown in Figs. 1, 2, 3 and 21, or by mechanism which is brought into operation during multiplication and division. In ordinary addition and subtraction operations, however, the shaft 68 and the gear 67 are given a single rotation by the operation bail 70. This bail is connected to two side arms pivoted at 71 in the side walls of the keyboard of the machine, as shown in Fig. 1, and in dotted lines in Fig. 21 and extends across the front of the keyboard for convenient manipulation by the same hand of the operative used in setting the keys. Connected to each side arm is a link 72 pivoted to an arm 73 projecting from a shaft 74, which shaft runs entirely through the machine from side to side, there being an arm 73 at either side of the machine. The normal position of the bail at the keyboard level is determined by a stop 73ᶜ, one on either side of the machine, engaged by the side arms of the bail. In order to hold the bail in normal position against the stops 73ᶜ, the shaft 74 is provided at the right side with an arm 73ᵃ to which is connected a spring 73ᵇ, Figs. 21 and 25. Within the framing of the machine at the right side thereof an arm 75 is secured to the shaft 74, this arm carrying at its outer end, Fig. 25, a roller stud 76 engaging a slot 77 in a disk 78 loosely mounted on a shaft 79. Pivoted to this disk is a pawl 80 which is in engagement with a five-toothed ratchet 81 secured to a toothed wheel 82 which is in engagement with a pinion 83 secured to the cycler shaft 68. The ratio of gear teeth between the gear 82 and pinion 83 is about 5 to 1, so that a one-fifth rotation of the gear 82 will cause the cycler shaft, and consequently the cycler gear 67, to make one complete rotation. In order to prevent overthrow of the parts driven by the operation bail, there is secured to the shaft 68 an arm 84, Fig. 25, which is adapted to come in contact with the periphery of the disk 78 when said disk has made one-fifth rotation. In addition to this, a pin 85, on the disk, comes in contact with a notch in a stop member 86 secured just inside the framing of the machine.

Operation of the bail 70, therefore, through the mechanism just described, oscillates the disc 78 which, in turn, rotates the toothed wheel 82 through one-fifth of a rotation. The pinion 83 is thereby turned a complete rotation and with it the shaft 68 and the cycler gear 67. The gear ratio between this cycler gear and the gear 59 is such as to give to the latter a complete rotary movement and results in turning the addendor a complete rotation, and during a portion of this time the setting up discs are locked by the locking bar 34.

In order to detain the cycler shaft 68 in normal position, there is secured thereto a disk 87 having a notch 88 therein with which engages a spring-pressed detent 89, Fig. 25.

The external teeth 32 of each addendor disk during the rotation of the addendor are adapted to cooperate with teeth on wheels 154, Figure 39, forming a part of a train of gearing connected with the totalizer.

Assuming that the number 1905 has been set up on the addendor disks, then the addendor will have been moved to the left a half step beyond the position shown in Fig. 13 after the 5 key has returned to normal and all of the addendor disks will be locked by the bar 34. The disk at the extreme left in said figure will have been turned one step of movement; the next adjacent disk to the right will have been turned nine steps; the third disk will not have been turned at all, and the fourth disk will have been turned five steps. When the addendor as a whole is rotated, the disk which has been turned nine steps will be the first to encounter the gear train. The disk which has been turned five steps will be the next to engage, and the disk which has been turned one step the last to engage. The gearing will, therefore, begin to rotate by contact with the disk which has been turned nine steps earlier than that which is engaged by the disk which has been turned only one step, but both finish their complete turning of the totalizer gearing simultaneously. When, however, the gearing which is turned by the nine disk has been rotated nine steps, the whole addendor is shifted sideways to the right sufficiently to bring its disks between the wheels 154 of the transmitting gearing and thereafter further driving action by the addendor ceases although it continues its movement in the same direction of rotation until normal position is reached.

This sidewise slipping of the addendor is brought about by a cam-offset 90, Fig. 12, formed in the right wall 27 which, when it comes into contact with the notch in the portion 52 of the block 49, causes the addendor to shift sidewise. The remaining teeth of the addendor then pass freely between the wheels of the transmitting gears during the remaining portion of the rotation of the addendor, but no further driving action occurs. After all of the teeth have passed the field of the transmitting gears, a second cam portion 91 in the periphery of the disk 27 acts to move the addendor back again.

During rotation of the addendor to transfer the number to the totalizer, and just after the addendor is slipped sideways, the addendor disks are all released from the locking bar 34 and are reset to normal position. The mechanism whereby this is accomplished is constructed as follows:

It has already been described that the addendor slides upon the shaft 25 and also upon the rods 60 and 61 and the rod 60 has been described as being pivoted in the end plates 58 and 59. This rod carries an arm near each end thereof, as shown at 92, Fig. 39, which arms are notched, Figure 21, and engage reduced portions 93, Figure 13, at either end of the locking bar 34 so that said bar 34 is thereby supported for movement into and out of locking position in respect of the notches 33, Figures 13 and 14, in the addendor disks. The discs 58 and 59 are suitably slotted to permit this movement of the locking bar. Another arm 94, Figures 6, 31 and 39, integral with arm 92, is connected by a pin and slot with a lever 96 pivoted on the outside of the disk 59. This lever is in the form of a bellcrank, the other arm of which has a lug 97 projecting laterally and which is adapted to be guided by cam tracks 98 and 99 secured to the adjacent frame plate. With the parts as viewed in Figs. 6 and 31 the lug 97 follows the inside of the cam track 98 until it reaches the point 100, Fig. 6, at which point it encounters the surface 101 of a switch device which causes the lug to move from the inside of the cam 98 to the outside of the cam 99 and in so doing rocks the locking plate inwardly to disengage it from the locking teeth of the addendor disks. In order to detain the plate in this position, a spring-urged detent 102, Figs. 21 and 35, is provided, which engages one or the other of two notches in the arm 92. The lug 97 follows the outside of the cam 99 until near the completion of the rotation of the addendor, when it is again moved to the inside of the cam 97 by the upper end 104 of the cam 98, and at which time the addendor disks have been restored to normal position, and are again locked by the bar 34.

While the addendor disks are unlocked they are gathered up and alined, and for this purpose the right disk 58, Figs. 21, 32 to 35, is provided with a Geneva locking surface 105 which normally engages the inner faces of teeth 106 and 107 of a locking pinion 107ᵃ. This pinion is an eight toothed pinion with two of its alternate teeth removed in one plane while possessing its full complement of eight teeth in an adjacent plane. The surface 105 acts normally in the plane of the mutilated portion of the pinion and holds it from rotation together with a shaft 108, Figures 32, 33 and 35, to which the pinion is secured and to which is also secured a toothed eraser bar 109. As the addendor rotates in the direction of the arrow in each of Figures 32 and 35, a cutout portion 110, Figure 32, in the periphery of the disk 58 comes opposite the tooth 106, and at the same time a driving portion 111 of said disk which is in the plane of the full toothed portion of the pinion, engages a tooth 112 thereof and rotates the pinion to present its second mutilated portion to the Geneva surface 105ᵃ, Figures 32, 34 and 35, of the disk 58. The eraser bar 109 has one of its teeth omitted and is normally positioned as indicated in Figs. 6 and 9 with its mutilated portion opposite the teeth of the addendor disks so that it offers no opposition to their free turning. When, however, the driving portion 111 of the disc 58 rotates the shaft 108 one step, the upper tooth 113 of the toothed eraser bar is positioned in the path of the advancing teeth of the addendor discs, which at this time have been unlocked, and said tooth 113 then acts as a stop for the discs which are gathered up and aligned by the web portions 29 and 30 of the addendor coming into contact with the radial wall of each addendor disc. When the discs are all thus aligned the addendor has been rotated to a position such that the lowermost tooth of the toothed portion 114 carried by the disc 58, Figure 34, is just about to engage the pinion 107. Further rotation of the disc 58 to the position shown in Figure 34 causes the toothed portion 114 to engage the teeth of pinion 107 to thereby rotate it and the shaft 108, together with the eraser bar 109. The addendor discs are thus kept positively under control by the eraser bar acting in unison with the web portions 29 and 30 during the last portion of the return of the discs to normal, at which time they are again locked by the bar 34.

*Repeat mechanism.*—For operations, such as addition and subtraction, in which a single number is set upon the addendor by depression of the keys and transferred to the gear trains leading to the totalizer, the addendor disks are re-set as above described, upon each operation of the operation bail 70.

In case, however, it is desired to repeat a number, either in ordinary addition or for the purposes of multiplication and division, means are provided whereby the eraser bar 109 and the mechanism for unlocking the bar 34 are rendered ineffective. The shaft 108 is slidable in the frame plates 115 and 116, the plate 115 having a stud 117, Figs. 5 and 32, said stud engaging a depression centrally located in the right hand end of the shaft 108 and forming a pivot therefor. (Figures 32 and 32ᵃ.) Normally the shaft is in the position shown in Fig. 5, and when shifted to the right to the position shown in Fig. 30, the mutilated portion of the pinion 107ᵃ is positioned in the plane of the toothed portions 111 and 114 of the disk 58 so that rotation of said disk has no effect to rotate the shaft 108. To hold the shaft from accidental turning at this time a pin 115ᵃ, Figures 30 and 35, extends inwardly from the frame member 115 and engages between teeth on the locking pinion 107ᵃ. Control of the shaft 108, is effected by means of a bell crank lever 118 having a pin 118ᵃ, Figure 30, which pin engages a slot encircling the shaft at its left hand end, which for this purpose projects to the left of the frame plate 116. The bell crank is pivoted in the frame of the machine and its horizontal projecting arm is forked for engagement with the end 119 of a second bell crank 120 secured to a shaft 121, as shown in Figs. 28, 29, 30 and 54. Rocking of the bell crank 118 will, therefore, move the toothed eraser bar 109 to position either to erase the number set up on the addendor disks, or to repeat the number.

When a number is repeated, it is of course essential to keep the addendor disks locked. Therefore, means are provided to render the locking bar shifting mechanism ineffective at this time. For this purpose, the shaft 121 also has secured to it a switch operating arm 122, Figs. 28, 29, 30 and 31. This arm extends rearwardly and carries at its end the switch block 101, already referred to, which is generally triangular in shape, its upper and lower surfaces, however, being formed of arcs. When this block is in the position shown in Fig. 6 its lower arc-shaped surface engages the lateral projection 97 of the lever 96, and moves the locking bar 34 to unlocking position. When, however, the bellcrank 118 is rocked for repeat operations, the switch block 101 is shifted to the position shown in Fig. 31 wherein its upper arc-shaped surface closes the gap between the end 100 of the cam 98 and the beginning of the cam 99 so as to form a continuous surface for guiding the projection 97. Under this condition of adjustment, the locking bar is not moved to unlock the pinions, and continuous rotation of the addendor will result in continuously transferring the set-up thereon to the gearing connected to the totalizer.

For moving the addendor repeat mechanism to its two positions, a link 123 is connected to the bellcrank 120, said link at its lower end engaging an arm connected to a rocker 124, Figs. 29 and 30. This rocker is under control of a repeat key and other devices of the machine, whose construction and operation will be described later. For the present, it is sufficient to state that the rocker may occupy two positions, one in which the addendor is set for ordinary operations, and in the other position it is set for repeat operations. Also connected to the rocker 124, Fig. 30, is a bellcrank 125 pivoted at 126 to the machine framing, the other arm 127 having engagement with a shaft 128 which is capable of limited movement in the frame plate 116 and also in another frame plate 129. This shaft has rigidly mounted thereon a lever 130, Figs. 6, 7, 9 and 30, which lever has at its upper end a roller 131 adapted to be engaged by a cam 132 on a cam shaft 133.

In normal calculating and printing operations, the gear 67 engages the gear 66 on the carry drum as well as the gear 134 on the cam shaft, thereby driving both the shafts 133 and 68. This is necessary because the carry drum must be driven to actuate the carry mechanism while the cam shaft controls the printing, the resetting of the addendor, etc.

During totaling and sub-totaling, however, no carrying is necessary and provision is therefore made for shifting the gear 67 so that while it maintains engagement with the gear 134 on the cam shaft to control the printing, it is disconnected from the carry shaft gear 66.

In multiplication and division carrying is necessary but it is not necessary nor is it desirable to print the partial products. Therefore, the gear 67 may also be so positioned that it engages the gear 66 but is disconnected from the gear 134.

The means employed to bring about these several relationships will be explained more fully when the total printing mechanism and multiplying mechanism are described.

The purpose of the cam 132, Figure 9, is to re-set the addendor to normal position at the right side of the machine after it has been positioned for setting up a number by the escapement mechanism, and to do this, a link 135 is connected to the lever 130, Figs. 6, 7 and 9, which at its upper end is pivoted to a segment 136 on the shaft 39 carrying the escapement dogs. A pinion 137, rigid with the escapement shaft 46, engages the segment. The parts are shown in normal position in Fig. 9 and movement of the escapement shaft causes the sector 136 to rotate and the roller 131 to move towards the shaft 133, it being permitted this movement by the position of the came 132 at this time. When, however, the bail 70 is operated and the cam shaft 133 rotated, the cam 132 towards the end of the cycle of operation of the cam shaft, engages the roller 131, thereby causing rotation of the escapement shaft in the opposite direction to which it is rotated under control of the escapement dogs, and this movement is transmitted through the spiral teeth of the gear 47 and the spiral teeth on the block 48, and acts to move the addendor to its normal position at the right. This movement occurs at the same time that the roller 109 is rotated to bring the addendor disks to normal.

When the machine is at normal, the shaft 128 is in the position shown in Fig. 36 with the roller 131 in alinement with the cam 132, but when the rocker 124 is moved to repeat position and the shaft 128 shifted to the position shown in Fig. 30, the roller 131 is moved out of alinement with the cam so that at this time, even though the cam shaft 133 is rotated, the addendor is not reset to normal position, but remains in the position to which it has been moved under control of the escapement mechanism, so that the numbers set up are repeatedly carried into the totalizer in their proper denominational order.

*Locking mechanism for the addendor, escapement and master wheel*

During rotation of the addendor to transfer a number to the transmitting gearing, it is necessary that the addendor remain in the lateral position to which it has been moved by the escapement, and means are provided to lock it in this position. For this purpose, the addendor plate 59 carries a cam 140, Fig. 6, which immediately after the addendor starts to rotate, overlies a pawl 141 loosely mounted on the shaft 50 and locks said pawl into the teeth of a star wheel 142 rigid with the escapement shaft, this star wheel being mounted adjacent the escapement wheels, as shown in Fig. 4. The cam 140 is of an extent sufficient to thus lock the escapement shaft only during the time that the addendor is transferring the set-up to the transmitting train, but it ceases its locking function as soon as a number has been transferred because after that time the escapement shaft must be permitted to rotate in order to reset the addendor to its normal position at the right of the machine.

To prevent any movement of the escapement mechanism under control of the keys during a cycle of operation of the machine, there is provided a disk 143 connected to the idler 62, said disk having a notch in which a pawl 144 may seat when the machine is at normal. As soon as the cycler shaft begins to turn, resulting in rotation of the idler 62, the disk presents its periphery to the nose of the pawl 144 and prevents its movement. The pawl is loosely pivoted on the shaft 65 and has a portion which engages over a lever 145 loosely pivoted on the escapement dog shaft 39, said lever having a portion which engages in a depression in a locking plate 147 carried by the universal bail, Figs. 6 and 16. With the pawl 144 held from movement, the locking bail is likewise held from movement and none of the numeral keys can be depressed.

In order to lock the master wheel, except as moved under control of the numeral keys, the right hand plate of the universal bail carries a second locking plate 148 which has a forward projection 149 and a rearward projection 150. Normally the forward projection 149 engages the end of a locking bellcrank lever 151 pivoted loosely on the shaft 39, as shown in Figs. 7 and 9. The upper end of this lever has a locking nose 152 which engages a star wheel 153 on the master wheel shaft 22, said star wheel being rigid with the master wheel. Just at the beginning of a key depression and as the universal bail starts to move forward, the locking portion 149 releases the bellcrank 151 and permits the master wheel to turn to position under control of a key. As soon, however, as the wheel has been positioned, the rear locking surface 150 engages the locking pawl and again locks the master wheel.

*Transmitting mechanism.* — The external teeth 32 of the addendor disks not only serve as means for positioning the disks by the master wheel, but also serve to transmit the set-up to the totalizer and to printing mechanism, during rotation of the addendor.

Mounted adjacent the addendor and to the rear of the same is a set of plus gears each composed of a large gear 154 and a small gear 155, Figures 7, 116, 117 and 118, rigidly secured together so that they turn as one piece, and all loosely mounted on a shaft 154ª. Meshing with the gears 155 are small gears 156 of the minus gears, and connected with the gear 156 by a sleeve is a larger gear 157, the two gears 156 and 157 also rotating as one piece, and the gears 155 and 156 being constantly in mesh. As the addendor rotates, the teeth 32 of its disks engage the large gears of the plus gears which are always turned in the same direction by the addendor, the minus gears turning in the reverse direction.

In order that the rotation of the addendor in a constant direction may be transmitted to the totalizer mechanism in either a plus direction or in a minus direction, or not transmitted at all, there are provided a series of plus-minus shift gears 158, one of which gears being shown in each of Figures 116, 117 and 118, which gears are adapted to mesh with the large gears 154 of the plus-minus gears, as shown in Figure 116, or with the large gears 157 of the minus gears, as shown in Figure 117, or with neither of these gears, as shown in Figure 118. These various positions of the gears are also shown in Figures 41, 42 and 43, but the relative position of the parts will probably be better understood by reference to Figures 116 to 118. The gears 158 are narrow and are adapted to engage plus-minus fixed gears 160 mounted on a shaft 161, the width of the gears 160 being such that the gears 158 remain in mesh with them in either of the three adjacent positions which the plus-minus shift gears 158 may occupy. In Figures 116 to 118, which are more or less diagrammatic, these gears 160 are shown very wide merely for the purpose of illustrating the principle involved.

The gears 158 are designated plus-minus shift gears because when they are in mesh with the gears 157 they are driven in one direction, while when they are in mesh with the gears 154 they are driven in the opposite direction. The gears 160 may also be driven in one directon or the other, but since they are not shiftable laterally, they are designated plus-minus fixed gears merely for the purpose of readily distinguishing them from other gear trains.

Meshing with the plus-minus fixed gears are the gear wheels 162 of the totalizer. These wheels are mounted on a shaft 163 supported in a carriage which is capable of lateral movement so that different groups of totalizer gears may be brought into cooperative relationship with the plus-minus fixed gears. This lateral movement of the carriage is useful in totaling operations and in multiplication and division.

The shaft 159, Figure 29, carrying the plus-shift gears is moved to its three different positions under control of mechanism constructed as follows: Projecting from said shaft near its left hand end is an arm 165 which engages a stepped cam piece 166 rockable on the shaft 167 and held in the positions to which it is moved by a spring actuated detent 168. The stepped construction of the cam piece 166 is identical with that of the cam piece 594 shown in perspective in Figure 107. In order to guide the shaft, an arm 169 engages a rod 170. The cam piece 166 has connected therewith a link 171 which at its lower end is pivoted to an arm 172 of a plus-minus rocker 173. This rocker, as well as the rocker 124, controlling the repeat mechanism, is mounted about the periphery of a series of operation disks whose construction and manner of functioning is described in detail under the heading "Operation disks, universal plates and rockers," they being under control of various special keys and also of the multiplying and dividing mechanism. Shifting of the rocker 173 to the position shown in Fig. 29 results in positioning the shaft 159 so that the plus-minus shift gears are set for addition, this being the normal position of the shaft. As will be later described, the subtraction key sets the shaft for subtraction, while other special keys, such as the non-calculate key, set it to neutral.

*Printing mechanism.*—Rotation of the addendor not only serves to set up a number on the totalizer wheels 162, but also to set up the number on a series of type carriers, from which the number may be printed. For this purpose, a set of type couplers 174 in the form of gears, are provided and these are loosely mounted on a shaft 175, Fig. 6, and mesh with the minus gears 157, and also with gear teeth 176, Figures 39 and 53, formed on type sectors 177 loosely mounted on a shaft 178. Slidably mounted for radial movement on the type sectors are a series of type 179, two of which are shown in Fig. 7. Each numeral printing sector carries ten of these type, the zero being at the top, followed by the digits 1 to 9, and when the type sector is in normal position the zero type is in position to print, as is usual in machines having printing mechanism of this sort. A series of type hammers 180 are loosely pivoted on a shaft 181 and are urged to printing position, each by a spring 182. The hammers, however, are normally latched both by individual latches and a common latching bail. The individual latches are pivoted on a shaft 183 and each latch is of bellcrank formation, its upper arm 184 adapted normally to seat in a notch 185 in a type sector. The other arm of the bellcrank has a portion 186 which engages a tail 187 of its associated type hammer, said latch also having a tongue 188 projecting laterally under the portion 186 of the latch of higher order. This construction is for the purpose of printing ciphers to the right of a significant digit. When any sector of higher order is moved, the upper arm of the bellcrank formed on the latch, is moved out of the notch 185, and the latch moves to release the hammer associated therewith and moves all other latches of lower order to likewise release their associated hammers. However, all of the hammers are still held from movement by a latching bail 190, Fig. 7, which is released after all of the type sectors have been positioned. The latching bail is pivoted at 191 and has a downwardly extending portion 192, Fig. 6, to which is pivoted at 193, a trip arm 194, said trip arm being movable in a lateral plane about the pivot 193 and when in normal position being in the path of a pin 195 carried by one of the side arms 196 of the sector return supporting bail. After the type sectors have been positioned, the pin 195 strikes the trip arm 194 and rocks the latch plate 190 about its pivot 191 to release all of the type hammers, which immediately move forward under spring action to drive the type to print.

Since it may be desired at times to prevent any printing, means are provided for rocking the trip arm 194 about the pivot 193 to a position out of the path of the pin 195 so that under this adjustment of the parts no printing takes place. The trip arm 194 is in the form of a bellcrank having a laterally extending arm 197 to which is connected a link 198, Figs. 28, 29 and 48, connected to an arm 199 secured to a non-print rocker 200 which rocker, like the rockers 173 and 124, is mounted adjacent the peripheries of the operation disks, to be later described. A spring 201 connected to the arm 198 holds the rocker in normal position in which printing is effective, the rocker being movable to a second position in which the trip arm 194 is moved out of the path of the pin 195 to prevent printing, the rocker being controlled by an operation disk which in turn is under control of the non-print key, the error key, and the sub-total key. These, however, will be taken up more in detail later.

The type sectors have arcuate slots 202, Figures 9 and 52, and normally the bottoms of these slots rest against a stationary bar 203, Figure 9, which alines all of the type sectors in normal position. They are moved to this normal position and held therein by a restoring bar 204, Figs. 7, 9 and 52, which bar 204 is connected between two plates 205 secured to the side arms 196, said side arms being slotted to accommodate the bar 203. It is, of course, obvious that the plates 205 and side arms 196 might be a single integral structure, but it is more convenient to construct them separately. There is one plate 205 at each side of the machine and each is located just outside a plate 196, and a portion of each plate is toothed for engagement with the teeth of corresponding sectors 206 connected by a shaft 207. On one of these sectors is formed an arm 208 to which is pivoted a link 209 connected to an arm 210 of cam followers 211 and 212, which engage cams 213 and 214 respectively secured to the cam shaft 133, Figs. 9 and 52.

After a number has been set up on the keys and the operation bail 70 depressed, the addendor and cam shaft 133 rotate at the same time, both being driven by the cycler shaft, and in order that the rotation of the addendor may position the type segments, the bar 204 must be lowered to permit the sectors to move. For this purpose, the cam 213 is so shaped that as the cam shaft 133 starts, the cam follower 211 is pushed outwardly, resulting in rotation of the sectors 206. These sectors each have at their rear a hook portion 215 which normally engages a radial surface 216 on the upper sector to hold the parts locked in normal position. There is, however, a slight lost motion between the first engaging tooth 217 of the sector 206 and the surface 218 with which it engages, and during the taking up of this lost motion the hooks 215 move out of engagement with the surfaces 216 and immediately thereafter the sector 206 drives its corresponding sector, and the bar 204 is lowered. The cam 213 is so shaped that the bar 204 always keeps ahead of the type sectors themselves. When the type sectors have completed their movement, which may be nine steps in some cases, a locking and alining cam 219, Figure 9, on the right hand plate 196 comes into contact with a locking and alining pawl 220 pivoted adjacent the type carriers, and forces its lower end 221 between the teeth of the type sectors to thereby lock and aline them at printing position. The cam 219 has a radial portion, as indicated in Figure 9, which acts as a dwell so that the plates 196 may move slightly farther after the locking pawl has been moved to locking position and during this additional movement the pin 195, Fig. 6, comes into contact with the trip pawl 194, to cause printing.

As the shaft 133 continues its rotation, the cam 214 becomes effective on the follower 212 to restore the bar 204 to normal position and this picks up and restores all the type sectors to normal.

At the same time restoration of the type hammers is effected by means of a link 222, shown in Figs. 6, 9 and 52, in full lines, and in Fig. 7 in dotted lines, connected to the left hand plate 196 which engages a plate 223 loosely pivoted on the shaft 181. The plate 223 is mounted adjacent the group of type hammers on the left side and on the right side of the group there is a similar plate 225 connected by a type hammer restoring bar 226 which engages the tails 187 of the type hammers and restores them to position to be latched by the latching pawl 191.

*The platen and ribbon feed.*—The platen is supported in a carriage mounted for lateral movement adjacent the printing surfaces of the type carriers and is supported by two plates 230 secured to the side frames of the machine (see Figs. 1, 2 and 29). The platen may be of any well known construction and so may the ribbon mechanism so that no detailed description of either will be necessary. In order, however, to rotate the platen in line spacing and to feed the ribbon, the particular connections which have been found convenient in this machine will be described. Referring to Fig. 29, the platen roller 231 is provided with a star wheel 232 at each end thereof which are adapted to be engaged by pawls 233 each pivotally mounted on a plate 234 pivoted for oscillation about the platen shaft 235. A spring-urged detent 236 is provided, as usual, for detaining the platen in the various positions to which it is rotated by the pawls 233. A bail 237 connects the plates 234, said bail being well shown in Fig. 7, and a portion of said bail being shown in perspective in Fig. 47. Reciprocation of the bail will obviously result in line spacing the platen.

The ribbon is mounted upon spools 238 supported on vertical axes, and connected with a sleeve 239 is a worm wheel 240 with which engages a worm 241 which has connected with it a ratchet 242, Fig. 29, adapted to be engaged by a sector 243 pivoted on a lever 244 forming one arm of a bail 245, said bail being supported at the opposite side of the machine by a similar lever 244 and the sector 243 being spring-urged in engagement with a ratchet to drive the same in one direction only, the ratchet 242 being suitably detented. Both bails 237 and 245 are adapted to be operated by mechanism shown in detail in Figs. 47, 49, 50 and 120, and for this purpose the hammer at the extreme right is utilized to control the vibration of these bails. This hammer, in the particular organization, happens to be connected with a type sector bearing a series of symbols, such as, T, S and N, as indicated in Figure 46, and said hammer is always tripped when the units type hammer or any hammer of higher order is tripped, but it is obvious that the bail controlling type hammer might in some constructions be the units type hammer. Normally, the parts are positioned as shown in Figs. 47 and 120 and an arm 246 to which the hammer driving spring 182 is connected supports a plate 247 loosely mounted on a shaft 181, said plate having a lug 249 which projects laterally over the arm 246 to be supported thereby. Pivoted to the plate 247 at 250 and separated by a washer 251 is a pawl 252 having a shoulder 253 for engagement with the under side of the bail 237, and also an upstanding finger 254 for limiting its movement, the pawl being urged to bail-engaging position by a spring 255 connected to an arm 256 extending below the pivot of the pawl. The pawl 252 is further provided with a guiding slot 257 in which rides a pin 258 fixed to a stationary portion of the machine.

As the cam shaft 133 rotates and the type carriers are positioned, the type sector restoring bar 204 is moved away from the type carriers, as has already been described, and through the link connection 222, Fig. 52, the type hammer restoring bar 226 is moved away from the type hammers to permit them to be driven at the proper time. This permits the plate 247 to move from the position shown in Figure 47 to the position shown in Figure 49, said plate being urged to said position by reason of a finger 260 normally extending under the bail 245 which bail is normally urged downwardly by a spring 261, Fig. 29. This downward movement of the pawl 247 moves the pawl 252 downwardly and its spring 255 urges it rearwardly so that as soon as the shoulder 253 clears the under side of the bail 237 said pawl 252 snaps under the bail to the position shown in Fig. 49. During restoration of the type hammers, by the bar 226, the pawl 247, by reason of its lug 249 engaging the arm 246 of the type hammer, is restored and its finger 260 engaging under the bail 245 operates said bail to thereby operate the ribbon mechanism through the mechanism shown in Fig. 29 and described above. Likewise the pawl 252 operates the bail 237 to feed the paper in line spacing. As the pawl 252 moves upwardly, the lower portion of its slot 257 engages the pin 258 and further movement of the pawl 247 acts to rock the pawl 252 about the pin 258 as a fulcrum to disengage the shoulder 253 from the bail 237 so that the pawl 252 again assumes the position shown in Fig. 47.

The ribbon is supported adjacent the type segments by a ribbon frame comprising levers 262 loosely pivoted on the type segment supporting shaft 178, and connected by a bar 263 to which is secured a spring plate 264, Fig. 6. The ribbon is guided between bar 263 and plate 264. A spring 265, Figure 9, connected with one of the levers 262 normally holds the ribbon below the printing point of the platen so that the number which has been printed is visible and it is therefore necessary to lift the ribbon to printing position at each operation of the machine. The right hand lever 262 has secured to it a lug 266, Figure 9, having an offset 267 projecting towards the left, and this offset is adapted to be engaged by the radial surface 216 of the right hand sector plate when this plate approaches the end of its upward movement, to rock the ribbon frame and thereby position the ribbon at the printing point. The ribbon has a black strand and a red strand, the black strand being at the top, and the position of the lug 267 is such that during ordinary printing of added items, the black strand of the ribbon is positioned at the printing point. However, for other items, such as minus, total and sub-total, provision is made for moving the frame a greater distance to position the red strand of the ribbon at the printing point, as will be later described.

*Disconnecting the type sectors from the driving trains.*—It will be remembered that the addendor, during its rotation, transfers the set-up to the printing sectors through a train of mechanism comprising the plus gears, minus gears, and the type couplers 174. It is undesirable that this train of mechanism remain connected with the type carriers during restoration of the latter to normal position and therefore means are provided to disconnect the type sectors from the driving train at this time and preferably this is brought about by shifting the type couplers 174 laterally out of engagement with the minus gears. This shifting is effected by lateral movement of the shaft 175 supporting the gears 174. Referring to Figure 39, it will be observed that there is a sleeve 175$^a$ pinned to the shaft 175 at the right of the series of gears 174, and likewise a sleeve 175$^b$ pinned to the shaft at the left of this series of gears. The sleeve 175$^a$ has a circular slot or notch 270, Figs. 39 and 55, which notch is connected by a pin carried by one arm of the bell crank lever 271, Figs. 9 and 39. This bell crank is pivoted to the frame plate of the machine and its arm 273, Figs. 7 and 9, is connected to the arm 274 of the cam follower 275 pivoted on a shaft 276, Fig. 7.

Normally, the type couplers 174 are related to the type sector gears 176 as shown in Fig. 39. That is to say, the type couplers engage both the gears 176 and the large gears 157 of the minus gears. When, however, the shaft 175 is shifted from the position indicated in Fig. 39 to the position indicated in Fig. 40, the type couplers 174 still remain in engagement with the teeth 176 of the type sectors but move out of mesh with the large gears 157 of the minus gears and into the plane of the small gears 156, the diameters of the latter being such that there is no co-action of the teeth thereof with the type couplers 174 so that under this condition of adjustment the train of connections between the addendor and the type sectors is broken.

The lateral shifting of the shaft 175 is brought about by two cams 277 and 278 also mounted on the cam shaft 133. The position and shape of these cams is such that the shaft 276 is rocked to move the type coupler shaft to disengage the type couplers from the minus gears at about the time the type hammers are driven to print and at the time that the type sectors are locked and alined by the locking and alining pawl 220, the shaft 276 being rocked first one way to disconnect the type couplers during the restoration of the type carriers to normal position and the other way to re-connect them at the end of this movement.

*Carrying mechanism.*—The totalizer wheels 162 are mounted to rotate loosely on the shaft 163, as already described, said shaft carried by side frames 280 and 281, Fig. 5. The totalizer wheels themselves are embraced between two division plates 282 and 283 and by reason of the fact that this machine is used for multiplication as well as for addition and subtraction, eighteen wheels are provided, although a smaller or larger number may be used. Each totalizer wheel is composed of a gear having twenty teeth. Two of these teeth 284 arranged diametrically opposite each other are short teeth, and two teeth 285 arranged one adjacent each tooth 284 project laterally to the left and constitute carrying teeth, Figures 41, 42 and 45. The teeth 284 function during total and sub-total taking operations, as will be later described. Each totalizer wheel is also provided with a flange having two sets of numerals reading from zero to nine.

Co-operating with the carrying teeth are a set of upper carry levers 287, Figure 8, each carry lever having a bevelled nose whereby it is rocked on its pivot 288 by the carry tooth whether the totalizer wheel is being rotated in one direction or the other. The lower end of each carry lever is provided with a finger 289 engaging in a notch 290 in a lower carry lever 291 loosely pivoted on a shaft 292, Fig. 58, said lever having a forwardly extending arm 293 formed into a cam 294, Figure 57. When any totalizer wheel passes from 9 to zero in an adding direction or from zero to 9 in a subtracting direction, its carrying tooth rocks the upper carry lever 287 which in turn rocks the lower carry lever 291 and moves said lever from the position shown in Fig. 6 to the operated position shown in Fig. 58. A spring detent 295 normally bears against the rear side of a V-shaped point on the lower end of each lever 291 holding said lever in normal position. When, however, any carry lever is tripped, its detent 295 engages the forward face of the V-shaped point thereby detaining the lever in its operated position. Tripping of the lever also results in positioning the cam 294 in the path of one of a series of fingers 296 mounted for individual rocking movement and spirally arranged on a support 297 which may be conveniently designated the carrying spiral (Figs. 6, 36, 54, 59, 62 to 68).

Each finger is held in normal position with its right edge against the wall of a recess in the support 297, by means of a spring 298 which bears against the finger below its pivot. The carrying spiral is rotated once at each operation of the cycler shaft 68 but not until after the addendor has completed its transfer of a number to the totalizer and to the printing mechanism. If any totalizer wheel passes through zero its carry lever 287 is tripped, thereby positioning the cam 294 in the path of a finger. Subsequent rotation of the carrying spiral will then result in the finger being cammed sidewise behind a tooth of the plus gear of next higher order, which thereby turns the totalizer wheel of higher order one step.

Normally the parts are in the positions shown in Figs. 6 and 57. As the carrying spiral starts the finger to be rocked by the cam 294 which is in its path reaches the position shown at Figs. 61 and 62, at which driving of the totalizer wheel of next higher order begins, the finger being in behind a tooth of the plus gear 154. Figs. 63, 64 and 65 show the relative positions of the parts at the middle of the drive while Figs. 66 and 67 show them just at the completion of the drive with the finger ready to drop off of the edge of the cam 294 under the action of its spring. Figs. 68 and 69 show the parts as they appear with the cam at normal, a finger being shown passing under the cam.

Cooperating with the teeth of the large minus gears is a series of pawls 299 loosely mounted on a shaft 300 extending between the central frames of the machine, as shown in Fig. 56. Each pawl is held by a spring actuated detent 301 in active or passive position, which detent engages one side or the other of a V-shaped projection 302 formed on the pawls, see Figs. 58 and 59. Tails 303 are provided by which the pawls are rocked to hold them in engagement with the teeth of the minus wheels to prevent overthrow of the gear trains of which the minus wheels form a part. Normally the pawls are positioned as indicated in Figs. 6, 7 and 58 with their locking noses engaging between the teeth of the minus wheels. During the early part of the rotation of the addendor, its toothed disks come into engagement with the plus gears to transfer the set up to the totalizer and the minus wheels are turned in the direction of the arrow in Fig. 7. The first tooth on the minus wheel at once rocks its associated pawl on its pivot to the position shown in Fig. 59, the detent 301 assuming the position there shown and detaining the pawl in operated position. Movement of pawl is permitted at this time by reason of the fact that a cut-out portion of a locking disk 304 is opposite the tail 303 of each pawl. One of these disks is provided for each pawl, there being nine altogether and each is differently formed.

In Fig. 59 the tens locking disk is shown. A cut out portion extends from the point 305 to 306. Normally the shoulder 305 of each disk is just below the tail 303 of all of the pawls. Just as the addendor finishes its transfer of the set-up the rise 306 encounters the tails of all of the pawls and shifts them to locking position, thus preventing overthrow of the gear trains during running in of the number.

During the carrying the pawls must be again released and for this purpose each disk, except the units, has a second cut out shown at 307, Fig. 59. These cut outs are situated at a different point on each disk, the tens disk having a short locking rise 308 before the cut out is reached, while the rise 308 for the hundreds disks is longer. The cut outs 307 are, however, all of the same shape and size and permit the tail of the pawl to enter to permit the minus wheel to turn during the time carrying is taking place in the higher orders of the totalizer. The position of the cut-out 307 on each disk is such that it releases a locking pawl 299 just as a finger 296 is about to effect a carry to the next higher wheel, and as this higher wheel is turned under the driving action of the carry spiral the pawl 299 is moved into the notch 307 by the turning of the minus wheel to which a carry is made. Just as soon, however, as the carry is completed the rise 309 at the end of the cut-out 307 again rocks the pawl into locking engagement with the minus wheel which has just received a carry, thereby preventing overthrow.

The disks 304 are arranged along the carry drum shaft and these, together with other disks and the gear wheel 66, constitute the carry drum.

The gear 66, as has already been described, is normally in mesh with the gear 67 carried by the cycler shaft 68 so that upon every operation of the bail 70 the cycler shaft is rotated once and the carry drum is rotated once. The carry spiral, however, should not be rotated until after the addendor has driven the totalizer and has been disconnected therefrom. To thus intermittently drive the carry spiral, the carry drum also carries a member 310 (see Figs. 8 and 119) which for convenience of manufacture is composed of two disks each having a toothed portion and a smooth portion and each having a thin tooth 314. In Fig. 8 the thin tooth 314 at the bottom of the figure is in the left hand plane, while the tooth 314 of the other disk is in the right hand plane, the intermediate teeth, however, extending across both disks. Rigid with the carry spiral is a toothed member 312 which is also composed of two parts fastened together, this construction being adapted for convenience in manufacture. Each disk is thinned at a point below the line 313 in said figure, the portions of the tooth below said line, which are shown shaded in said figure being in the right hand plane while the tooth 315 is in the left hand plane and in position to be engaged by the lower tooth 314 of the member 310 after the carry drum has rotated about one-third of a cycle. At this time the lower tooth 314 encounters the tooth 315 and thereafter the succeeding teeth on the member 310 drive the member 312 and cause a complete revolution of the carry spiral.

Since the carry fingers 296 are arranged one behind the other, the carrying action is successive and the locking disks 304 also act successively. After the carrying action is finished, however, the disks again assume the position shown in Fig. 7 in which the large cut out portion is presented to the tails of the pawls.

In order to reset the carrying levers, the lower ones 291 are notched at 316, Figs. 7, 57, 58 and 59, for engagement by a resetting bail 317 secured to a rock shaft 318, which shaft has secured to it a depending arm 319, shown in dotted lines in Fig. 57. A cam 320 mounted on the carry drum shaft is so shaped and so positioned that at the end of the carrying drive said cam encounters the arm 319, thereby rocking the resetting bail 317 and restoring all of the carrying levers to normal position.

Means are also provided to prevent accidental displacement of a carry lever after it has been tripped either during the addendor drive or during a carry operation. For this purpose there are mounted on the carry drum shaft, two carry lever locking disks 321 one on either side of the series of locking disks 304, as shown most clearly in Fig. 57. Each disk is provided with a series of teeth 322 and a second series of teeth 323 separated by a solid portion 324. These teeth are adapted to engage levers 325, one adjacent each disk and loosely mounted on the shaft 318. The upper ends of these levers abut pins 326, each secured to an arm 327 loosely mounted on a shaft 328. The arms 327 are connected by a bar 329 thereby forming a bail which backs up against the detents 295. It results from this construction that when the levers 325 pass the ends of the teeth 322 or the teeth 323 of the carrying lever locking disks, the pawls 325 are prevented from movement so that all of the carrying levers are held in the positions they then occupy; those which have been set, in set position, and those which have not been moved are prevented from movement. This locking, however, is only momentary and the size of the teeth and their spacing is such that the pawls 295 are locked at the proper time and immediately released to permit movement to operative position of any carrying lever in case the totalizer wheel controlling it passes from 0 to 9 or 9 to 0.

Normally, the first tooth 322 of the series is situated above the working end of the levers 325, as shown in dotted lines in Fig. 7. As soon, however, as the addendor begins to drive the plus wheels there is possibility of a carry taking place if any wheel of the totalizer should be standing at 9 at this time. The nose of the upper carrying lever is so shaped that a half-tooth movement of the totalizer wheel is sufficient to fully set the carrying levers and therefore just as the half step movement of the totalizer has been completed under action of the addendor the first locking tooth 322 rocks the levers 325 and consequently locks the lower transfer lever in its set position. The locking tooth, however, passes and releases the levers 325 before the totalizer has moved sufficiently to cause another carrying lever to be tripped.

At the completion of the addendor drive, the solid portion 324 engages the levers and locks all the carrying levers during the interval between the end of the addendor drive and beginning of the carrying drive.

If it be assumed that a number of totalizer wheels stand at 9 and one is added in units order, then transfers would take place throughout all those wheels standing at 9. The positions of the parts under this condition are illustrated in Fig. 58 in which it is assumed that the units wheel has been moved a complete step under driving action of the addendor, said wheel being shaded in the figure and indicated by 162$^u$. The carrying tooth 285$^u$ has moved to the position shown and in so doing has tripped the upper transfer lever 287$^u$. This lever is immediately behind the tens transfer lever and is therefore shown behind a broken away portion thereof and is shaded. The positions of the parts in the figure are those which are assumed after the carry drum has rotated the carry spiral sufficiently to cause a carry finger 296 to move from the position shown in Fig. 61 to the position shown in Fig. 63, said latter position being also that which the carry finger has assumed in Fig. 58. This means that the plus gear in tens order has been driven a half tooth by the carry finger engaged therewith, while movement is transmitted to the totalizer in tens order and said wheel in Fig. 58 is shown as having moved a half step and in so moving has caused its transfer tooth 285$^t$ to trip the tens transfer lever 287$^t$ so that at this time the arm 293 of the lower transfer lever 291$^t$ has moved its cam 294$^t$ to the same position as is shown as being occupied by the cam 294$^u$ in Fig. 58. In this figure the cam 294$^t$ is shown broken away because otherwise its forward end would be in front of the units transfer finger 296. In said figure also the carrying lever locking disk 321 is shown with its first tooth 323 just coming into position to lock its transfer lever. At this time, however, the pawl 299 engaging the units minus wheel is locked by the periphery of the disk 304, but the locking disk for the tens pawl 299 presents its cut-out portion 307, Fig. 59, to the tail of said pawl to permit the tens wheel to turn. The position of the locking disk 304 for the hundreds pawl is shown in Fig. 60 and has not yet released the pawl because the finger 296 has not yet begun to drive the plus wheel in hundreds order, said finger being shown in Fig. 59 as having come under the tooth next adjacent the one which it is to engage and drive. During the time that this finger moves from the position shown in Fig. 59, and until it contacts with the tooth of said figure, the locking disk 304 will have moved to a position to release its locking pawl.

With the mechanism thus far described, any number set up on the keys may be run into the totalizer, either as a plus item or a minus item, and printed. During rotation of the addendor to transfer the number set up thereon, to the totalizer and to the type carriers, the train of connections lead from the addendor disks through the plus gears, the minus gears, and the type couplers, to the type carriers and through the plus gears, the plus-minus shift gears, and the plus-minus fixed gears, to the totalizer for added items; and through the plus gears, the minus gears, the plus-minus shift gears, and the plus-minus fixed gears, to the totalizer for subtracted items. When the addendor has finished driving, the type carriers have been positioned, and printing takes place. The type couplers are shifted, as previously described, so that during return of the type carriers they do not transmit their motion to the minus gears because it is during this time that the carrying takes place, the carrying action being through the plus gears directly to the plus-minus fixed gears, or indirectly to the plus-minus fixed gears through the minus gears, depending upon whether the plus-minus rocker is set for addition or for subtraction.

Figure 20:
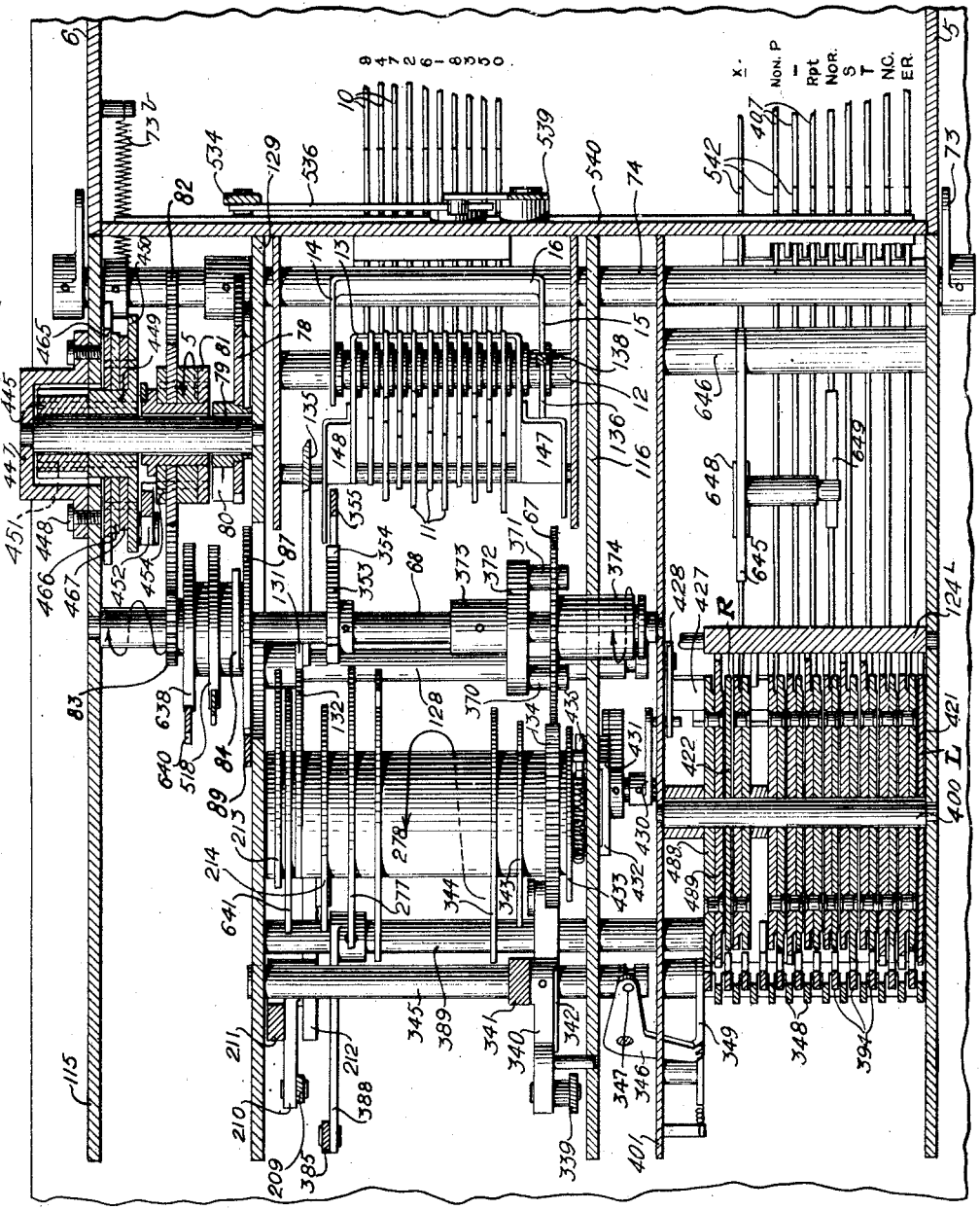
Fig. 20 is a horizontal section on the line 20—20 of Fig. 1.

*Means for taking a total or sub-total.*—In this machine totaling is performed by driving the totalizer wheels to zero by movement in a constant direction whether they have been set for plus operations or minus operations. For this purpose a toothed roller 330, Figs. 6, 7, 36 and 55, is provided, said roller having one of its teeth omitted, as clearly shown in Fig. 7, said roller being mounted on a shaft 331 pivoted between the frame plates 332 and 333, Fig. 36. At its left hand end the shaft 331 carries a pinion 334 with which meshes a gear 335 having rigid with it a pinion 336 mounted on a stud shaft 337 (see Figs. 6, 36, 53 and 55) projecting from the plate 333. Loosely mounted on the type carrier shaft 178 is a sector 338 toothed at one end for engagement with the pinion 336 shown in Fig. 53 and also in dotted lines in Fig. 56, the other end of said sector being connected by a link 339 to an arm 340 of two cam followers 341 and 342 having rollers at their ends for engagement with cams 343 and 344 secured to the cam shaft 133, Figs. 6 and 53. The cam followers are secured to a shaft 345 which, as clearly shown in Fig. 20, is mounted for sliding movement in the central frame and normally the followers stand, as shown in said figure, out of alinement with their respective cams so that rotation of the cam shaft for causing the addendor to be rotated and the number thereon transferred to the totalizer and to the type carriers does not cause any movement of said cam followers. A bellcrank lever 346 has a pin 347 at the end of one of its arms, which pin engages a notch in the shaft 345 with the result that when the bell crank is rocked the shaft is moved to position the cam followers in alinement with the cams.

Figure 28:
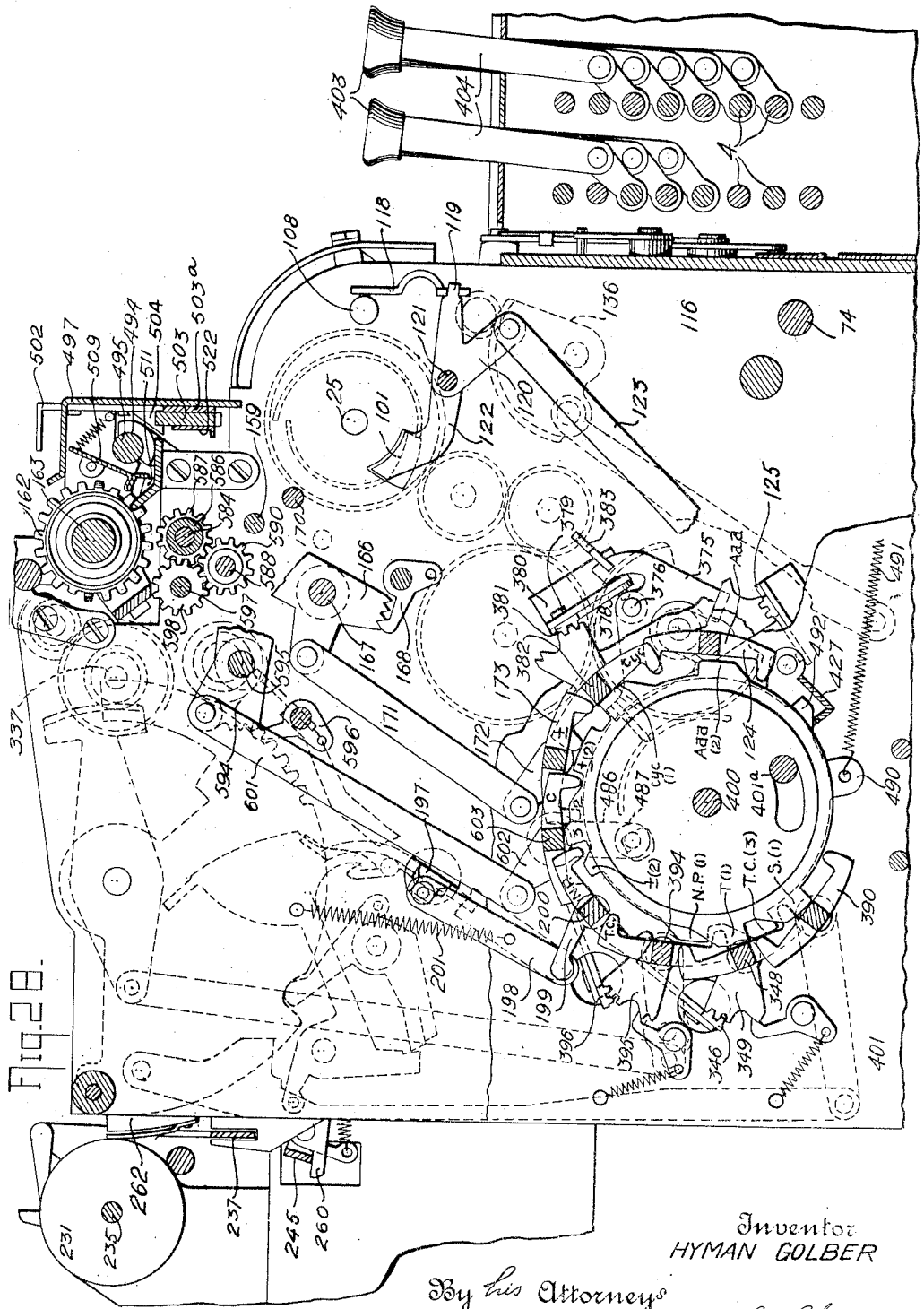
Fig. 28 is a vertical section taken on line 28—28 of Fig. 2.

Movement of the bellcrank is under control of a totaling rocker 348, Figs. 28 and 29, which rocker has an arm 349, Figs. 20, 28 and 29, serrated at its end which engages corresponding serrations in one arm of the bellcrank lever 346. This rocker is similar in construction to the rockers already described and is under control of a number of operation disks among which is the operation disk which is moved when either the total key or the sub-total key is depressed. Connections from the keys to move this operation disk will be described later and for the present it is sufficient only to assume that upon depression of one of these keys the rocker is moved to position the cam followers in alinement with their respective cams. Subsequent rotation of the cam shaft will result in the sector 338 being oscillated to rotate the gear 335 and the number of teeth on this gear and on the pinion 334 is such that the roller 330 is given a complete rotation and returned. Any totalizer wheels which are not at 0 will be turned until the short teeth come opposite the mutilated portion of the roller when the driving action thereof will cease and during return of the sector no driving of the totalizer wheels will ensue.

When the totalizer wheels reach zero position, the carrying teeth which, it will be remembered, are immediately adjacent the short teeth, are positioned against the noses of the carrying levers and if there were nothing to prevent it, the momentum of the wheels might trip these levers. To prevent this a plate 350 pivoted at 351, Fig. 53, is moved forwardly from the position shown in Fig. 7 to engage the rear of all of the carrying levers to prevent any movement thereof. This plate has an upper rounded portion 352, Fig. 53, which normally seats in a notch in a sleeve secured to pinion 336 and at the initial movement of the pinion, the plate is cammed forwardly to back up against the carrying levers.

In order that the type sectors may be moved in the same direction as in printing an ordinary item, the drive from the totalizer is through the plus-minus fixed gears, the plus-minus shift gears, and the minus gears, to the type couplers. Therefore, the plus-minus shift gears must be in their second position shown in Fig. 42, which means that the plus-minus rocker is moved to its second position. This is also accomplished automatically on depression of the total key. Since in the normal operation of the machine the type couplers 174 are shifted laterally to disengage them from the large gears of the minus wheels during return of the type carriers, the total standing on the totalizer wheels, after being transferred to the type carriers and printed, leaves the totalizer wheels at 0.

Under the head of "Carrying mechanism" it has been described how the locking pawls 299 are moved to unlocking position as soon as the minus wheels begin to turn and it has also been described how this movement is permitted in so far as the locking disks 304 are concerned, said disks at this time standing with their long cut-out portion opposite the tails of said pawls. However, when the machine is at normal position the minus gears are nevertheless locked by the pawls 299, and the plus-minus fixed gears are also locked by mechanism which is best shown in Figs. 6 and 9. The cycler shaft 68 carries a cam 353, having a cam projection 354, which in the normal position of the machine as shown in Fig. 9, contacts with the end of a lever 355 loosely pivoted on the shaft 65, the upper end of said lever bearing against the compound lever 357 which has a portion 358 adapted to be engaged by the lever 355. This lever has another projection 359 which extends into the path of a cam 360 mounted on the carry drum shaft. The lever 357 is mounted loosely on a shaft 300 and has an upper arm which is notched to engage a pin 362 carried by an arm 363 pivoted at 364 and carrying a pawl 365 which engages the teeth of all of the plus-minus fixed gears and normally locks and alines them. In addition, the lever 357 carries a projecting lug 366 which engages a wing pawl 367, which pawl backs up against a projection 368, Fig. 6, of the locking pawls 299 and normally holds these pawls into engagement with the teeth of the minus wheels. Just as soon, however, as the cycler shaft starts to rotate, the cam 354 releases the lever 355 to permit any minus wheel to turn as soon as the driving action of the addendor begins. The cam 360 normally stands in the position shown in Fig. 9 and does not function to engage the projection 359 until after the addendor drive has been completed and after the carrying action has been completed. At this time, however, it does engage the projection 359 and locks the pawls 299 until near the end of the operation of the machine, when said cam again releases the lever 357. At this time the projection 354 again becomes active and engages the lever 355 which again locks the pawls 299.

During totaling and sub-totaling no carrying is necessary, and therefore to relieve the driving mechanism of as much load as possible, the carrying drum is disconnected at this time and is not rotated. The cam 360 standing as it does, normally free of the projection 359, permits turning of the minus wheels during totaling operations. In order, however, that the pawls 299 shall be locked after the totalizer has been returned to 0 by the roller 230, a second projection 369 on the cam 353 encounters the lever 355, to lock the plus-minus fixed gears and the minus gears, at the instant the totalizer has been cleared.

This disabling of the drive to the carry drum just referred to is brought about by lateral shift of the gear 67, Figs. 6, 20, 28, 82, 121, 122 and 123. This gear is adapted to slide on two pins 370 and 371 projecting from an arm 372 secured to a collar 373 which is in turn pinned to the cycler shaft 68.

The gear 67 has attached to it a hub 374 slidable on the cycler shaft 68, said hub having a circular groove into which fits a plate 375, Fig. 82. To this plate is secured a short shaft 376, Fig. 56, slidable in the frame plates of the machine and carrying a grooved collar 377 adapted to receive a pin carried by one arm of a bellcrank 378 pivoted at 379 to a bracket 380 secured to the frame plate, as shown in Figs. 29 and 56. The other arm of the bellcrank 381 is connected to a rocker 382 which, for convenience, will be termed the cycler rocker, and said rocker is capable of occupying three positions. In its first position, as shown in Fig. 123, the gear 67 meshes with the gear 66 on the carry drum, but is out of mesh with the gear 134 of the cam shaft. In its second position, as shown in Fig. 121, the gear 67 is in mesh with both the gear 66 and with the gear 134, the latter being the normal position for adding and subtracting purposes. In its third position, as shown in Fig. 122, the gear 67 meshes with the gear 134 only and is out of mesh with the gear 66. The shift plate 375 also carries a locking plate 383 and a second locking plate 384, the plate 383 shown in section in Figs. 51 and 82 adapted to engage the teeth of the idler 64 to prevent any misplacement of this wheel and consequently the carry drum during the time the gear 67 is out of mesh with the gear 66, said locking plate 383 also acting as an alining device. The locking plate 384 performs a similar function with respect to the gear 134.

As shown more clearly in Figure 51 the plates 383 and 384 are slotted to receive the shift plate 375.

During the taking of a total, the cycler rocker 382 is positioned so that the gear 67 is disconnected from the gear 66. The carry drum, therefore, does not revolve, and since the addendor is rotated normally through the gear 66 and the idlers 64 and 62, no rotation of the addendor occurs during total taking.

It will be remembered that the resetting of the addendor laterally to normal position, is brought about by a cam 132 on the cam shaft, Fig. 9, and in order that the addendor shall not be returned during total taking, the addendor rocker is also shifted when either the total key or the sub-total key is depressed, said rocker acting to shift the shaft 128, Fig. 9, to position the roller on the arm 130 out of the path of the cam 132.

Pivoted on the shaft 178 along with the numeral type carriers, and at the extreme right of the set, is a symbol type carrier, having at the top a minus sign followed by the characters T, S and N, Fig. 46. This carrier is normally positioned with a blank at the printing point so that for added items, no symbol is printed, and is differently positioned under control of different keys to bring its appropriate symbol adjacent the printing point. The connections for this purpose comprise a link 385 pivoted to the carrier at 386, Fig. 9, said link at its lower end being pivotally connected at 387 to an arm 388 secured to a shaft 389, connected to a symbol rocker 390, Fig. 29. The link 385 has a cam enlargement 391 near its upper portion, as shown in Fig. 9, the purpose of which is to engage a pin 392 on the lower arm of the bell crank, the upper arm of which carries a roller 393 for engaging under the arm 262 of the ribbon shifting frame. The symbol type carrier normally occupies the position shown in Fig. 46 and when moved therefrom to position its various type at the printing line, the cam enlargement 391, Figure 9, shifts the ribbon to print in red, the cam enlargement having a dwell so that after the initial movement to position the red, no further movement of the ribbon shifting frame occurs.

The locking bail 220 already described in connection with printing is sufficiently broad to engage between a series of teeth formed on the symbol type sector, these teeth being shown in dotted lines in Fig. 9.

The adjustment of the parts for taking a sub-total is somewhat different from those for taking a total because in sub-totaling, the number printed must be again run into the totalizer and therefore the type couplers should not be unmeshed from the minus wheels during the return of the type carriers to normal. It will be remembered that the cams 277 and 278, Figures 46, 48, 80 and 81, normally act to shift the type couplers at the end of the printing operation, but since this is not desired during sub-totaling, the sub-total key operates connections which shift the shaft 276 so that the cam piece 275 is out of alinement with the cams and no shifting of the type couplers occurs.

This shifting of the shaft 276 is under control of a type coupler rocker 394, Fig. 46, said rocker being provided with a serrated arm 395 with which engages corresponding serrations on a bell crank 396 pivoted to the frame of the machine at 397, the other arm of the bell crank having a pin engaging a peripheral slot in the shaft 276. This rocker may occupy three positions. In the first position, the cam member 275 is in the path of the cams 277 and 278, as shown in Fig. 46. In its second position, the member 275 is out of alinement with the cams and it is to this position that the rocker is moved under control of the sub-total key. The rocker may also occupy a third position in which an arm 274, Fig. 9, carried by the hub upon which the followers 275 are mounted, engages a conical cam 399, Figure 80, secured to one of the central frames of the machine and acting to rock the shaft 276 to move the type couplers out of engagement with the minus wheels in the same manner as though the cams themselves had acted to do this.

The connections from the total and sub-total keys to position the various rockers concerned in totaling operations will be described more in detail in connection with the description of the operation disks immediately to follow.

*Operation disks, universal plates and rockers*

In order to avoid the multiplying of parts, the machine of the present invention utilizes a number of rockers which have already been mentioned, these rockers arranged about a series of operation disks, each disk being provided with means for operating the rockers singly or in various combinations to determine how the driving mechanism of the machine shall operate to effect the totalizer and the printing mechanism in order to carry out various functions. These operation disks are located in the lower left hand section of the machine and are loosely mounted on a shaft 400 extending between the outer frame plate and the next adjacent frame plate 401, Fig. 20. The disks are arranged in pairs, each pair of disks being secured together by any suitable means, as by riveting or otherwise. In the present machine, there are nine pairs of operation disks operated by nine special keys, the first pair of disks 402, to the right, Fig. 48, being operated by the error key 403. Figs. 29 and 54. This key has a stem 404. Fig. 29, similar to the stem 2 of the numeral keys, and is similarly connected by means of the rock shafts 4. To the lowest one of these is connected a bell crank 405, having a pin 406 engaging a slot of a link 407, which extends rearwardly in the plane of the error operation disks 402, the right one of which, 402—R shown in Fig. 75, having a depending lug 409 to which said link is pivotally connected. The error key is normally upheld by a spring 410, Fig. 29, engaging in an eye of the link, said link also having a depending lug 411 which abuts a stop 412 to limit the upward movement of the key under tension of its spring. Adjacent the error key, and in the same row, Fig. 54, is the total key 413, the normalizer key 414, the subtraction key 415, and the un-multiply key 416. In the next row above there is provided the non-print key 417, non-calculate key 418, sub-total key 419, and the repeat key 420. Each of these keys is similar in construction and from each runs a link 407, said links being shown in Fig. 20 and appropriately marked to designate the keys which operate them, the link of each of these keys being similarly connected to the right hand member of a pair of operation disks.

Situated outside of the series of operation disks, Fig. 20, is a left universal plate 421—L and a right universal plate 422—R secured together by rods 423, the operation disks having elongated slots through which the rods pass. The universal plates are shown in detail in Fig. 70, the plate 422—R having a depending finger 424, to which is attached a spring 425 (see also Fig. 29), for holding the universal plates in normal position. The rods act to hold some of the operation disks in normal position, but not others, because of the different functions which the different disks perform.

The rockers are all substantially alike and each comprises a central rib with oppositely projecting fingers extending therefrom, as shown clearly in Figs. 30 and 36 wherein the rocker 124 is shown, the fingers on one side of the central rib extending in a different plane from the fingers on the other side for the purpose of cooperating with the two disks of a pair of disks, and also with the the two universal plates.

The universal plates, and also the operation disks, have cams located at different points about their circumference to control the various rockers, the universal plates controlling the rockers to set the machine for addition. The universal plate 422—R, shown in Fig. 70 has upon it two cams, one for the cycler rocker and the other for the counter rocker. The left plate has five cams which control the cycler rocker, the plus-minus rocker, the type coupler rocker, the totaling rocker, and the symbol rocker respectively. In the figures showing the universal plates and the operation disks in detail, each rocker bears its proper legend and the cams are similarly designated. The number in brackets adjacent the legend on each cam indicates the position to which the cam sets or in which maintains the rocker associated therewith, as, for instance, (1) indicates first position, (2) indicates second position, etc.

For addition, the cycler shaft must have its gear 67 connected both to the gear 66 of the carry drum and to the gear 134 of the cam shaft, as both function at this time. Therefore the cycler cam on the plate 422—R is of such height that it moves the cycler rocker 124 to its second position. In order to maintain the rocker against displacement at this time, the left plate 421—L has a cycler cam of the same height as the cam on the right plate, as shown in Fig. 70.

The plus-minus rocker 173 is set to its first position by the plus-minus cam on the left plate 421—L, this being the position of the plus-minus shift gears for addition, and is the position shown in Fig. 29 as well as Fig. 70. The other arm of the plus-minus rocker rests upon the periphery of the universal plate 422—R.

The counter rocker 603 is position by the counter cam in its first or neutral position, since no counting is necessary except for multiplication and division. This rocker controls the actuating mechanism for a counter which is operated to count the digits of a multiplier in multiplication and the quotient in division, and its construction and mode of operation will be described fully under those heads. It is mentioned at this time merely to take account of all of the rockers in the machine.

The type coupler rocker 394 is set at its first position, thereby placing the type couplers under control of the cam shaft to be shifted thereby at the end of the printing operation to disconnect the type couplers from the gear trains.

The totaling rocker 348 is held by the totaling cam on the left universal plate in its first position, thereby rendering the totaling mechanism ineffective.

Likewise the symbol cam holds the symbol rocker in its first position with the blank portion of the symbol type carrier at the printing point so that no characterization of an imprint is made for added items. An oppositely extending arm of each of the type coupler, totaling and symbol rockers rests upon the periphery of the disk 422—R, Fig. 70.

The universal plates do not control the addendor rocker nor the non-print rocker, the latter being held in normal position by its spring 201, Fig. 29, acting on the link 198, and the addendor rocker being held in the position to which it has been set last by a spring urged detent 124¹ Fig. 29. One reason for not having the addendor rocker effected by the universal plates is to enable repeat operations. The non-print rocker is likewise not effected, but is left free to be operated while the universal plates remain at normal to enable an item to be run into the totalizer but not printed.

Under the condition of adjustment of the machine just described, depression of the digit keys corresponding to the digits of the number it is desired to add, followed by operation of the bail 70, results in printing the number set up and running it into the totalizer.

*The subtraction key and connections*

When the subtraction key 415 is depressed, its operation disks, Fig. 71, are rocked in the direction of the arrows and by reason of the fact that the slots in the disk normally seat against the bars 423 of the universal plates, it results that the universal plates are also rocked against the tension of their returning spring until a lug 426 on the subtraction operation disk, Fig. 71, engages behind a latching bar 427 (see also Figs. 29 and 79). Since the connection from the operation disks to the special keys is a positive one, the latching of any operation disk, such as has been just described, results in the locking of the corresponding key connections in depressed position and the universal plates in displaced position, the movement being sufficient to release all of the rockers previously positioned by the plates, which rockers, or any one or more of them are then free to be positioned under the control of cams on the subtraction disks.

The latch 427 is released at each operation of the machine, such release being effected by the cam shaft 133 and the mechanism concerned in its operation is best shown in Fig. 79. Referring to said figure, the latch 427 has a side arm 428 provided with a slot for engagement with a pin 429 carried by an arm 430, the latter arm being mounted on a hub which carries two arms 431 and 432. Rigid with the cam shaft is a disk 433 having a notch 434 in its periphery and into which notch the arm 432 may pass when the disk 433 and the shaft 133 are in normal position and when the key is depressed. The spring 432ª is connected to the arm 432, as shown in Fig. 79, this spring normally tending to hold the arm 432 out of the notch and by reason of the connections from the arm 432 to the latch 427, said spring 432ª tends to move the latch 427 so that it will engage behind the lug 426 of the subtraction operation disk shown in Fig. 71. There is also loosely mounted on the shaft 133 a disk carrying a lug 435 and to the disk is attached a spring 436 which normally tends to hold the lug 435 against a pin 437 carried by the disk 433. Upon depression of the subtraction key with the third position as shown in Fig. 79, the subtraction operation disks are rotated in the direction of the arrow, shown in Fig. 71, and as the cam 426 of the right hand subtraction disk encounters the latch 427, it moves it outwardly as viewed in Fig. 71, and such movement of the latch tends to rock the arm 430 and likewise the arms 431 and 432 in a clock-wise direction as viewed in Fig. 79. At this time, the slot 434 is so positioned that the arm 432 may enter therein, thereby permitting the latch 427 to move outwardly and then subsequently snap behind the shoulder 426 of the subtraction operation disk, (see Fig. 71), upon complete depression of the subtraction key. Just as soon as this happens, the spring 432ª, Fig. 79, again rocks the train of parts controlled thereby, so that they again assume their position shown in Fig. 79. The arm 431 is at this time in the path of the lug 435 so that as the cam shaft begins to rotate in the direction of the arrow, Fig. 79, the lug 435 will encounter the arm 431 near the completion of the movement of the shaft, but in the meantime, the notch 434 has moved from the position shown in Fig. 79 so that the arm 432 cannot enter the notch at this time and the result is that the arm 435 is held from movement while the disk 433 moves to the normal position, the spring 436 being thereby tensioned. As soon, however, as the cam shaft and disk 433 reach normal position, the tensioned spring 436 will immediately rock the arm 431, thereby causing the arm 432 to enter the notch 434 which movement will result in rocking of the latch 427 to such position that the lug 426 on the subtraction disk (see Fig. 71) can escape the latch, thereby permitting the subtraction disk to return to normal position and likewise the subtraction key connected therewith. At the same time, the lug 435 (Fig. 79) escapes past the arm 431 and moves to the position shown in said figure against the pin 437. The spring 432$^a$ then returns the plates to their normal position as shown in Fig. 79. It will be understood, of course, that when spring 436 is tensioned, it is stronger than the spring 432$^a$, so that movements above described may take place.

In Fig. 71 the subtraction operation disks are shown in normal position, and likewise the rockers which are moved by them. Those rockers, however, which remain in the same position to which they have been set by the universal plates are not shown at all, but the cams that position them are shown and the position they retain is also indicated by the number in brackets adjacent the rocker symbol.

The subtraction operation disks, unlike the universal plates, set the addendor rocker to its first position the same as in adding. This rocker may have been positioned for adding at the prior operation, in which event the subtraction operation disk holds it there. The subtraction operation disk also changes the position of the plus-minus rocker moving it to its second position so that the number set up in the addendor is transferred in a minus direction to the totalizer. The symbol rocker is also moved to position the minus sign at the printing point. Thus the symbol cam on the left subtraction disk is shown at only a slight elevation to move the rocker a small amount. The cycler rocker, counter rocker, type coupler rocker and the totaling rocker, are maintained in the same positions in which they were left by the universal plates, the subtraction operation disks having cams for this purpose. The non-print rocker is not affected because it may be desired to subtract an item without printing it. Therefore it is desirable that provision be made whereby the non-print key and the subtraction key may both be depressed at once.

In the detail figures showing the rockers, universal plates and operation disks only that arm of the rocker which is acted upon by the particular operation disk shown, is illustrated, the other arm of the rocker cooperating with the other disk in the figure. It will be noted that the plus-minus cam on the left subtraction operation disk is cut away at its left hand portion. This is useful in connection with certain devices operable during multiplication and will be described in connection with that operation.

Non-calculate key

Depression of this key moves its associate operation disks, said disks being shown in detached detail in Fig. 72. The right disk carries a lug 426 which acts as does a similar lug on the subtraction operation disk to latch the disk in set position and also to hold the universal plates released. Operation of this key positions the plus-minus rocker to its third or neutral position, in which the plus-minus shift gears do not engage either the plus gears or the minus gears, so that the set up is not transferred to the totalizer, but is transferred to the type carriers and printed.

To have the record show that any particular item has not been run into the totalizer, the symbol rocker is positioned by the non-calculate disk to its fifth position to print the proper sign. All of the other rockers shown in Fig. 72 are held by suitable cams, as indicated, in the positions left by the universal plates. The addendor rocker, however, is not affected, because it is desirable at times to use the non-calculate key either to print an item without calculating, in which case the addendor rocker should be in its first position, or to print several repeated items without calculating, in which latter case, the rocker is shifted to its second position by the repeat key.

When the universal plates are returned to normal position upon release of the latch 427 by the cam shaft, those rockers which have been changed by either the subtraction key or the non-calculate key are returned to their normal positions.

Since the non-calculation of a minus item would be meaningless, it is not desirable to have the non-calculate key and the subtraction key depressed together and this operation is made impossible through the means of the operation disks controlled by the two keys and by the plus-minus rocker. The non-print rocker is held to its printing or first position by the cam as indicated on the left non-calculate operation disk shown in Fig. 72 and this prevents the non-print key from being depressed simultaneously with the non-calculate key as such an operation would ordinarily not accomplish any desirable results. However, the two keys might be used to correct a wrong set-up on the addendor but this is taken care of by the error key. Comparing the right subtraction operation disk with the left non-calculating operation disk, it will be noted that the plus-minus cam of the subtraction disk operates on one end of the plus-minus rocker to hold it to its second position, while the non-calculate operation disk operates upon the other arm of the same rocker to move it to its third position. Since operation of these two keys would tend to move the rocker in opposite directions, such rocker acts as a key arrester, thereby preventing the simultaneous operation of these two keys.

Total key

The total key is connected to a pair of operation disks shown in detached detail in Fig. 73, said disks having slots through which the rods of the universal plates pass, so that when the disks are operated upon depression of the total key the universal plates move to release the rockers held thereby to permit the total key operation disks to position certain rockers which are necessary to perform a totaling operation. Other rockers are maintained by these disks in the positions left by the universal plates.

The addendor rocker, which is not affected at all by the universal plates, is moved by the total key operation disks to its second position, thereby preventing any return of the addendor to normal position during operation of the cam shaft. The right operation disk is provided with an addendor cam for this purpose, while the periphery of the left disk holds the rocker in the position set.

The cycler rocker is set by appropriate cams indicated in the figure, to its third position, in which position the cam shaft and the cycler shaft are connected for rotation, but the carry drum is disconnected because no carrying is necessary during total-taking. It will be remembered that the addendor is rotated to transfer the number set up thereon, to the totalizer through idler gears leading from the gear 67 on the carry drum. The position of the cycler rocker, therefore, as controlled by the total key, prevents any driving of the addendor, and this is necessary because when the total wheels are reversely rotated to set up a total on the type carriers the plus wheels are turned in the opposite direction from which they would be turned by the addendor disks.

The plus-minus rocker is moved to its second position to connect the minus gears with the plus-minus shift gears so that the driving action from the totalizer will move the type carriers in the same direction that they are moved in addition.

Since at the time that the total wheels have been moved to 0 and the total printed they should be left in their cleared condition, it is necessary that the type couplers be shifted, and as the cam shaft normally does this, the type coupler rocker is merely locked in its first position as left by the universal plates.

The totaling rocker is moved by the totaling cam to its second position to place the cam followers 341 and 342 in alignment with their operating cams on the cam shaft.

The symbol rocker is moved to its third position to print a T adjacent the total and the symbol type carrier in moving to position shifts the ribbon frame to print the total in red. These various positions to which the rockers are moved by the total key operation disks will be readily understood from the figure in which the operation cams for controlling each rocker is indicated, the small number in parenthesis indicating the position to which the rocker is set or maintained.

The non-print rocker is not affected at all because it may be desirable at times to take a total without printing it, in which case the non-print key is depressed along with the total key, and under such a condition the totalizer is cleared, but no printing is done.

The counter rocker is maintained in the position left by the universal plates.

With release of the operation disks at the end of the operation of the cycler shaft, the universal plates again restore the rockers which they control, to adding position, the addendor rocker, however, being left in its second position. After a total, therefore, in order to continue adding in the totalizer, the normalizer key must be depressed to position the addendor rocker in its first position. This will be better understood in connection with the detailed description of the normalizer key.

Sub-total key

The sub-total key 419 is connected to a pair of operation disks shown in detached detail in Figure 74, which disks have slots similar to the slots in the other disks already described, through which pass the rods connecting the universal plates, with the result that when the sub-total key operation disks are moved to set position, the universal plates are moved to release the rockers controlled thereby. The right operation disk carries a lug 426 similar to that carried by the other operation disks already described, which lug moves behind the latch plate 427 to maintain the operation disks set and also hold the universal plates in released position. Cams similar to those already described are formed on the disks for controlling the various rockers.

The addendor rocker is set to its second position, the reason for this being the same as already described in connection with the total key.

The cycler rocker is set to its third position also for the same reason. The addendor rocker is set to its second position, and the cycler rocker to its third position, the reasons being the same as explained in connection with the total key.

The plus-minus rocker is moved to its second position to transmit movement properly to the type sectors, as already explained.

The type coupler rocker, however, is moved to its second position in which the cam followers 341 and 342 are out of alignment with the cams on the cam shaft, so that the type couplers remain connected with the minus wheels both during the setting of the type carriers under driving action of the totalizer and during the restoration of the type carriers under driving action from the cam shaft. The total, therefore, which originally stood upon the total wheels is again run back into the wheels after printing and additional items may be then added to obtain a grand total, as is customary.

The totaling rocker is moved to its second position while the symbol rocker is moved to its fourth position thereby positioning the symbol sector to print an S adjacent the sub-total, the ribbon frame being shifted to position the red strand at the printing point, as has already been described under "Totalizing mechanism."

As with the total key, so with the sub-total key, it is necessary to depress the normalizer key after a sub-total to again set the addendor rocker to its first position before proceeding with ordinary addition.

A cam is provided for locking the non-print rocker in its normal position, to insure the printing of a sub-total, otherwise a sub-total without printing would be a useless operation. The counter rocker is locked in position left by the universal plates.

Depression of the sub-total key will release the subtraction key, the non-calculate key, or the total key, and each of these keys when depressed will release each other, because the lug 426 associated with the operation disks of all these keys is of such radial height as to move the latch 429 far enough to release the lug of another key.

The total and sub-total keys, however, cannot be simultaneously operated because the symbol cam on the left sub-total key disk tends to move the symbol rocker to its fourth position while the right total operation disk tends to move the opposite end of the same rocker to its third position. The operation of these two disks, therefore, conflict and therefore these cams through the medium of the rocker act as an arresting device.

Error key

In case the wrong number is set up on the keys and indicated on the addendor disks, it is advantageous to be able to clear said disks without running the number into the totalizer and printing the same. In order to do this the nonprint rocker and the plus-minus rocker are both set to position to prevent printing and to prevent calculation. Upon depression of the error key, the operation disks controlled thereby, as shown in Fig. 75, are set and latched and the universal plates moved to release the rockers held thereby, and a left disk has its plus-minus cam of such height that the plus-minus rocker is set to its third position, while the non-print rocker is moved to its second position by a cam on the right disk. The other cams on the disks merely serve to hold the rockers which are released by the universal plates.

When the machine is thus set, the transmission gearing between the addendor and the totalizer is ineffective and even though the type carriers are positioned, the type hammers are not tripped, so that no printing is done. The cam shaft, however, rotates to unlock and reset the addendor disks to normal and to return the addendor laterally.

The addendor rocker is not controlled by the error key operation disk, but is merely left in the position last set.

Since the error key would perform no useful function if operated with the non-calculate key, these two keys are arrested through the medium of the symbol operation cams and the symbol rocker. Similarly, the total, sub-total, repeat and subtraction keys are prevented from being operated at the same time as the error key through the medium of different cams on their respective operation disks. By reason of this additional function of the rockers to act in conjunction with the cams as key arresting devices, operation of keys in useless or detrimental combinations is prevented.

Depression of any one of the keys heretofore described when another key is already depressed will result in releasing the key first depressed by reason of the fact that the lug 426 will cam the latch 427 to releasing position. This, however, is not true of the keys which will now be described.

Non-print key

This key is connected to a pair of operation disks shown in Fig. 76, which are similar to the operation disks already considered, except that the slots are longer, so that the disks may be moved without having any effect upon the universal plates and also the bars 423 of the universal plates which also pass through slots in these disks may be moved by the other keys already considered without having any effect upon the operation disks of the non-print key. This construction permits the non-print key to be depressed simultaneously with other keys or with the machine at normal, the universal plates holding the rockers set for addition. This key is also useful in connection with the clearing of the totalizer without printing a total, and for clearing the counter without printing the total standing thereon.

To permit the total key to be depressed, together with the non-print operation disk key, the lug 426 of the non-print extends a greater distance radially than the corresponding lug on the other operation disks which have been described, so that the setting of any of these operation disks does not release the non-print key. The non-print key, however, if subsequently depressed, will release any other latched key.

The right disk of the pair of operation disks for the non-print key is provided with a single cam which moves the non-print rocker to its second position, thereby preventing the hammers from being tripped, the periphery of the left disk acting merely as a surface against which another arm of the rocker may rest to hold it in position. When the latch 427 is released, on the cam shaft reaching normal position, the non-print operation disk is returned to normal, under action of the spring connected to the non-print key, which spring is similar in construction and acts similarly to the spring connected to the error key, already described.

*Repeat key*

It is often desirable to repeat a number, and for this purpose the addendor rocker should be moved to its second position. The repeat key, therefore, is connected to a pair of operation disks, Fig. 77, similar in construction to the non-print operation disks, except as to the position of the single cam on the right operation disk. This cam operates the addendor rocker to set it to its second position. The lug 426 of this disk is of the same radial height as the lug on the non-print operation disk. The repeat key, therefore, will release the non-print key and will release any other keys which may have been depressed and latched.

Since the repeat key may be operated while the universal plates hold the rockers set for addition, such key may be utilized to repeat any added item, and such item may be either printed or not, depending upon the desire of the operative. If printing is desired, the repeat key is depressed alone and the bail 70 operated. If printing is not desired, both the repeat key and the non-print key are depressed.

The repeat key and the error key cannot be depressed together because they tend to move the addendor rocker in opposite directions and the rocker, therefore, acts as a key-arresting device between these two keys. This is also the case with the subtraction key and the repeat key.

The repeat key may be depressed with the total key and the sub-total key, although this would not ordinarily be done, but no harm results.

The repeat and non-print key may be operated simultaneously, which combination allows repeated items to be run into the totalizer and not printed. This could be used as a means for multiplication, but, as will be described later, separate means are provided to take care of this.

It may be noted at this point that the subtraction key and the repeat key are locked from simultaneous depression through the medium of the addendor cams on the respective disks, and the addendor rocker, but simultaneous operation of these keys is not ordinarily found necessary and it is more important to prevent simultaneous operation thereof. Since a repeat in minus does not often occur, it is more convenient to have the subtraction key set the addendor rocker to perform single subtracting operations rather than to require the operator to depress two keys for this purpose.

However, repeated subtraction may be performed by the use of the unmultiply key in combination with the repeat key, as will be described later.

*Normalizer key*

This key is connected to a pair of operation disks shown in Fig. 78 which are similar in construction to the operation disks connected to the repeat key, except that the single cam on the right disk operates to move the addendor rocker to its first position. This key also operates to release any other special keys, by releasing the operation disks connected thereto and it also releases the muldiv operation disks. The lug 426, moreover, on this key, is made of greater circumferential length so that it does not latch behind the latching bar 427, the key immediately rising upon release of the finger therefrom.

The operation of the unmultiply key 416 will be better understood in connection with multiplication, and consequently it will be described later.

*Multiplication and division*

Multiplication in this machine is performed by repeated addition, and division by repeated subtraction, a number set up on the addendor being repeatedly transferred to the totalizer to obtain a product or quotient, and for this purpose there is provided a muldiv lever 440 Fig. 1, having a handle 441 by which it may be actuated. This lever serves not only to drive the mechanism for rotating the addendor, but also serves to set various parts of the machine to properly carry out the operations of multiplication or division. The muldiv lever is mounted for oscillatory movement on a hub 442 secured to the right side wall of the machine (Fig. 4), a shouldered screw 443 serving to secure the lever to the hub. A toothed sector 444, Fig. 1, forms a part of the lever, and this sector engages a pinion 445, Figs. 20 and 51, loosely mounted on a shaft 79 which shaft has its left bearing in the inner frame plate 129, Fig. 20, while its outer bearing is carried by a bracket 447 secured by screws 448 to the outer frame plate.

A hub 449 is mounted on the shaft 79 adjacent the pinion 445 and secured to or formed integral with the hub is a disk 450 Figs. 20, 21, 84, 94, 101 and 102. The hub and pinion are secured for rotation together by pins, one of which, 451, is shown in Fig.

20. Pivotally mounted at 452 on the disk is a pawl 453, Fig. 21, which is adapted to drive the cycler shaft through connections consisting of a five toothed ratchet 454 secured to the large gear 82, Fig. 25, already described in connection with the operation bail 70, the ratchet 454 being secured to the gear 82 on one side, while the ratchet 81 is secured on the other side, as clearly shown in Fig. 20. When the muldiv handle is raised from the position shown in Fig. 1, it rotates the disk 450 and the pawl 453, which normally occupies the position shown in Fig. 21, clicks over one or more teeth of the ratchet depending upon the height to which the muldiv lever is raised. Upon the depression of the lever the cycler shaft is driven through the gear 82 engaging the gear 83 on the cycler shaft 68, Fig. 20, and this in turn rotates the addendor a plurality of times.

Supported adjacent the right side of the machine is a plate having a scale 455 thereon shown in detail in Fig. 86, and a pointer 456 connected to the muldiv sector moves over this scale to serve as a guide to determine how far the muldiv lever shall be raised to rotate the addendor different amounts on being depressed, depending upon the digit in the multiplier, raising of the muldiv handle to 1, and depressing it resulting in rotating the addendor once, while raising it to 2 and depressing it would result in rotating the addendor twice, and so on. Since rotation of the addendor once is equivalent to addition, such an operation would not ordinarily serve any purpose, and is not contemplated.

The muldiv lever normally does not occupy a position with the pointer at zero, but normally stands at a point about .6 above zero, which is the normal position and which is indicated by the dotted line position of the pointer in Fig. 86. To hold the muldiv lever in this position, a lever 456$^a$ (see Fig. 1) is pivoted at 457, to which is attached one end of a spring 458, the other end engaging over a pin 459 carried by the sector 444. Movement of the lever below normal position, is resisted by the spring 458 by reason of the fact that the lever 456$^a$ abuts a pin 460 secured to the frame, and to prevent the spring from acting on the pin 460 when the handle is above normal position, a lug 460$^a$ secured to the muldiv lever stands in path of the lever 456$^a$.

The muldiv lever is latched in its normal position and for this purpose a detent 461 is provided, said detent is mounted on the machine frame and has a lug 462 projecting laterally therefrom, and which is adapted to be engaged by a projection 463 forming part of the muldiv handle, this handle being pivoted at 464. Before moving the lever upward, therefore, the handle is given an independent rocking movement about its pivot to release the detent. The lever may then be moved upwardly about its pivot 443.

Loosely mounted on the hub 449 is the driving element of a Geneva, said element comprising a gear 465, a one toothed disk 466 and a notched disk 467, all secured together to rotate as one. The gear and disk are shown detached in Figs. 22 and 23 respectively and the notched disk is shown in Fig. 24.

Mounted above and a little to the left of the shaft 79, is a shaft 468, Fig. 21, which supports the driven element of the Geneva and is designated the muldiv cam shaft, said driven element consisting of a mutilated gear 469, Figs. 5, 21, 22 and 24, a disk 470 having two teeth (Fig. 23) and a Geneva lock 471 having two Geneva locking surfaces 472 and 473, Fig. 24.

The shaft 468, for convenience, is designated the muldiv cam shaft, and in addition to the driven element of the Geneva also carries a set of cams shown in Figs. 5, 21, 25 and 51, which cams position a number of parts concerned in the multiplication operation.

In this machine, furthermore, not only does the muldiv handle set and drive the machine for multiplication, but it also sets and drives it for division, the latter setting being effected upon movement of the muldiv handle to its extreme upper position. Division is performed in accordance with the well known principle of subtracting the divisor from the dividend beginning in highest order until the machine over-subtracts, when the last number subtracted is automatically added and the denominational position of the totalizer changed for obtaining the next factor of the quotient, as will be explained in detail later.

The maximum number of steps, each corresponding to a revolution of the addendor, to which the muldiv handle can be raised is 12½. Nine of these steps are necessary for multiplication and the excess are necessary for division and to provide space for movement of the parts in setting for multiplication and for division. Since in division a quotient equal to 9 may occur and if the machine then over-subtracts on the 10th step another step is necessary to correct the over-subtraction, and the remaining 1½ steps allow for the space necessary to prevent the ends of division interfering with the ends of multiplication.

The Geneva driving and driven elements are constructed as described for the purpose of giving to the muldiv cam shaft a movement at the beginning of the up-stroke of the muldiv lever and also at the extreme upper position thereof. It has not been found convenient to make the movement of the muldiv lever directly cause the above operation at the beginning of and near the end of these movements of the muldiv lever or by the gear 465 directly, because these parts would have to be constructed of such size as to be prohibitive. Therefore, the Geneva elements have been introduced.

These elements are shown in normal position in Figs. 21 to 24 and when the muldiv handle is moved to the full line position of the pointer in Fig. 86, the parts are positioned as indicated in Fig. 85, causing a partial rotation of the shaft 468 and the muldiv cams carried thereby. If the muldiv handle is moved to its extreme upper position the gear 465 makes about 2½ complete revolutions, and while the complete setting of the muldiv cams to control multiplication is accomplished by the change in position of the parts from that shown in Fig. 24 to that shown in Fig. 85, the gear 465 continues to move, and the tooth of said gear, which is in alignment with the single tooth on the disk 466, engages the first mutilated tooth of the gear 469 and positions the Geneva locking member 471 so that its surface 472 coincides with the periphery of the disk 467. During the remainder of the rotation of the gear 465 its teeth do not drive the gear 469 because the mutilated portion thereof is at this time adjacent the teeth of the gear 465, but when the single tooth of the disk 466 comes around it engages between the two teeth of the disk 470 and moves the cam shaft a small amount to bring the surface 473 of the disk 471 to coincide with the periphery of disk 467. These movements other than the initial setting do not have any effect on the parts controlled by the muldiv cams, which are provided with dwells to hold the parts in set position. When, however, the single tooth again comes opposite the gear 469 it engages behind the tooth 475 of the disk 470 and its continual rotation causes the tooth of the gear 465 to again engage the teeth of the gear 469 and the cam shaft is given another movement to set the parts for division. The relative positions of the two elements of the Geneva are at this time as shown in Fig. 95.

Mounted on the muldiv cam shaft 468 are a plurality of cams which control various functions of the machine and for convenience, the first of these to be considered will be the muldiv cross cams. These are so designated merely to distinguish them from other cams carried by shaft 468 and because while the cams are situated at the right of the machine, the connections from them reach across to the left portion of the machine and terminate adjacent the universal plates. These cams are shown at 476 and 477, Fig. 51, and also in Figs. 26, 84 and 94. Loosely mounted on a shaft 478 near the central portion of the machine is a lever 479 having arms 480 and 481, the arm 480 adapted to co-operate with the cam 476, and the arm 481 with the cam 477. A rearwardly extending arm of the lever has a pin 482 which engages in a slot in an arm 483 shown clearly in Figs. 48 and 54, said arm being secured to the right end of a shaft 485, which shaft extends through the central frame plates over to the left side of the machine, its left end provided with an arm 486, Fig. 48, having projecting therefrom a member 487 engaging in a slot in a muldiv operation disk 488, which constitutes the right one of a pair of disks, the left disk 489 being situated immediately adjacent thereto, the two disks being secured together by any suitable means. In Fig. 48, which is a view looking toward the front of the machine, the member 487 is shown as engaging the left operation disk as there depicted but this is of course the right operation disk as one looks down on the machine. These muldiv operation disks are mounted on the shaft 400 at the right of the right universal plate, see Fig. 20. Said universal plate has a lug shown in dotted lines in Fig. 70 extending to the right into an arcuate slot in the left muldiv disk 489 as shown in section in Figs. 28, 84 and 94, with the result that movement of the muldiv disks also moves the universal plates to release all of the rockers maintained thereby. The muldiv disk 488 has a depending lug 490, Fig. 28, to which is attached a spring 491 for maintaining said disks in normal position. Said disk also has a latching lug 492 for engagement with the latch plate 427, but this lug is only about one-half the circumferential length of the lugs on all of the other operation disks, except the one connected with the normalizer key, so that a half step movement is sufficient to latch the muldiv disks in set position. This half step movement, however, is sufficient to cause the universal plates to release their rockers. Normally, the muldiv disks are positioned as shown in Fig. 28 and when the muldiv handle is moved from its normal position to set the Geneva elements to the positions shown in Fig. 85, the muldiv cross cams 476 and 477 are moved from the position shown in Fig. 26 to the position shown in Fig. 84, the cam 476 having engaged the arm 480 to rock the shaft 485 to latch the muldiv plates behind the latch plate 427. This results in positioning the rockers to set the machine to perform multiplication, the disks having variously formed cams for this purpose, similar to the cams on the operation disks already described.

The action of these cams on the various rockers will now be set forth.

The addendor cam on the disk 489, Fig. 84, sets the addendor rocker to its second position which, it will be remembered, prevents the restoration of the addendor disks and also prevents the addendor from being reset to normal, so that any number set up therein may be repeatedly run into the totalizer to obtain a product.

The cycler cam sets the cycler rocker to its first position in which the cam shaft is disconnected from the cycler shaft, and since the cam shaft through the type carriers controls the printing hammers, the printing mechanism is rendered ineffective.

The universal plates position the plus-minus rocker at its first or adding position, and the muldiv disks do not change the position of this rocker when they are set for multiplication. The plus-minus cam, however, on the muldiv disk 489 comes under the right arm of the rocker, as indicated in Fig. 84, to prevent the rocker from moving further than to its second position. The plus-minus cam on the muldiv disk 488 is beyond the left end of the rocker and does not function during multiplication. As will be described later in connection with division, this relation of the operation cams to the plus-minus rocker is necessary to properly carry out division.

The counter rocker cam has two rises and its first rise moves under the right arm of the counter rocker to position said rocker to its second position during multiplication. The reason for this will become apparent when the mechanism for actuating the counter is described.

The non-print rocker, the totaling rocker and the symbol rocker are each maintained in the positions left by the universal plates.

The type coupler rocker, however, is moved to its third position to immediately disconnect the type couplers from the minus gears so that no movement of the type carriers takes place during the time the addendor is being repeatedly rotated to obtain a product in the totalizer.

If it is desired to multiply 25 by 25, for instance, the multiplicand is set up on the keys, which causes the left hand addendor disk to be rotated to 2 and the next adjacent disk to 5, the addendor making two steps to the left and thereby positioning the 5 of the addendor disk in alignment with the units wheel of the totalizer which at this time is in the normal position shown in Fig. 2 of the drawing, so that its unit wheel is in alignment with the type carrier of units order. The muldiv handle is now raised, and this acts to release the detent 461, permitting the muldiv lever to be raised until the pointer is opposite 5, multiplication in this machine proceeding from units order to high orders. The muldiv lever is then depressed to the limit of its movement.

During the raising of the muldiv lever from the position shown in dotted lines in Fig. 86 to the full line position in said figure, the muldiv operation disks are positioned, as has been previously described, and no further movement of these disks occurs as the muldiv lever moves on to the point 5 of the scale.

The driving pawl 453 is shown in normal position in Fig. 21 and just as the muldiv handle reaches the position shown in full in Fig. 86, this pawl occupies the position shown in Fig. 84 just behind a tooth of the ratchet 454. When the muldiv handle is at 5 position, the pawl is in the same position as shown in Fig. 84, but the disk carrying it has made one complete rotation, the pawl clicking over the intervening teeth of the ratchet as the lever is raised. Upon depressing the lever, the cycler shaft is rotated five times, causing the addendor to be rotated five times to transfer the number 25, five times to the totalizer, which then indicates 125.

Upon the down stroke the muldiv lever passes below normal, to 0 of the scale, and as it passes normal the muldiv cross cam 476 releases the lever 479 but the muldiv operation disks are still latched by the plate 427.

As the muldiv lever passes from normal to 0 position, and just before reaching 0 position, the totalizer carriage is fed one space to the right to position the tens wheel of the totalizer in alinement with the addendor disk which has been set to 5, and to position the hundreds wheel of the totalizer in alinement with the addendor disk which is set to 2. The muldiv handle is again raised, but this time only to the 2 position, and when depressed causes the addendor to rotate twice, which in effect, adds 250, twice to the totalizer, which then indicates 625, the product of the two factors.

At the end of the multiplication operation, the multiplicand is still set up on the addendor and the multiplier is indicated on the wheels of a counter, which has been referred to but not described in detail, and the totalizer wheels show the product, all of the factors being visible. The muldiv disks still remain latched, and in order to release them, some key, such as the total key or the normalizer key, is depressed. This releases the latch 427 and permits the universal plates to move to position, thereby setting the rockers for addition, the normalizer key also acting to positively move the addendor rocker to its first position, for, it will be remembered, this rocker is not under control of the universal plates, and has been displaced to its second position by the muldiv operation disks.

If it is now desired to print the multiplicand, the non-calculate key is depressed, which results in moving the plus-minus rocker to neutral, and when the bail 70 is then operated the cycler shaft rotates the addendor and the number thereon is set up on the type carriers and printed, the addendor disks being restored to normal as in an ordinary adding operation. The totalizer, however, remains inactive.

To print the next factor, the multiplier, the counter wheels 490, Fig. 5, which are mounted on the same carriage with the totalizer, are manually positioned in alinement with the type carriers and the total key is depressed.

This results in extracting a total from the counter wheels in the same manner as a total is extracted from the totalizer wheels, and the multiplier is printed underneath the multiplicand, the platen having been fed one step.

To print the product, the carriage is again moved to position the totalizer, with its units wheel in alinement with the units type carrier and the total key depressed to obtain a total in the manner described.

The carriage, Fig. 48, within which the totalizer wheels are mounted has been already briefly referred to and comprises in addition to the end plates 280 and 281 and the transverse division plates 282 and 283, another division plate 491 between which and the plate 281 the counter wheels are mounted, said wheels being loose on the shaft 163 which also supports the totalizer wheels. Projecting from the frame plates are supporting lower brackets 492, Figs. 21 and 25, there being four of these secured to the frame plates and also four upper brackets 493 Fig. 2. Each bracket has a concave inner face for supporting and guiding a lower rod 495 and an upper rod 496 which act as tie rods for the frame plates and also as bearings on which the carriage slides. The carriage also includes a front plate 497 Fig. 4, which is bent at right angles and extends over a portion of the top of the transverse plates, as shown at 498 Fig. 2. Passing through slots at the edge of this plate are four tabulator keys 499, 500, 501 and 502.

Mounted in the rear of the front plate and spaced therefrom is a plate 503 Fig. 28 which plate at its top has four notches, Figs. 88 and 89, to receive and guide each a lug 504, Figures 6, 8, 9, 25, 28 and 29, formed by bending over a portion of the metal constituting the tabulator keys.

A stationary plate 505, Figure 5, extends across the machine from side to side and is supported by the frames thereof and has an upwardly bent portion which serves to lock and aline the wheels of the totalizer which are not within the zone of the type carriers and to lock and aline the wheels of the counter except that one which is opposite its actuating master wheel, said plate for this purpose having a long notch opposite the type carriers and a short notch opposite the actuating mechanism for the counter, as shown in dotted lines in Fig. 3. On the underside of this plate near the center of the machine is mounted a short sliding plate 506 Figs. 5 and 6, which is secured to the plate 505 by two studs engaging in a slot in the sliding plate. A finger 507 projects from this plate and into the plane of the lugs 504 on the tabulator keys. Normally the parts are positioned as shown in Fig. 6 with the carriage free to move laterally to any position. Upon the depression of any tabulator key, however, its lug 504 is positioned in the path of the finger 507, Figure 5, to thereby stop the carriage at a definite point. Since the carriage may be moved either from the right or from the left to engage the finger, the slot in the plate 506 is made of a length which is equal to the width of the finger plus the width of a key so that the carriage is positioned at the same point whether moved against the finger from one side or the other. Key 499 will position the carriage with the totalizer just outside and to the left of the zone of the type carriers. Depression of the second key 500, will position the carriage as indicated in Fig. 2 with the right section of the totalizer wheels alining with the type carriers. Key 501 will position the left section of totalizer wheels in alinement with the type carriers. Depression of the key 502 will position the totalizer wheels out of the zone of the type carriers and position the counter wheels 490 in the zone thereof.

When the carriage is positioned as shown in Fig. 2, those wheels opposite the cut-out are released from the locking plate 505. When the totalizer wheels are in the zone of the type carriers, they are also in the zone of the gear trains leading from the addendor.

In addition to the above described locking means there are also provided pivoted locking wings 508 and 509 shown in Fig. 4 in dotted lines and in Figs. 6 and 7 in section, there being one wing provided for the totalizer wheels and a second wing for the counter wheel. These wing plates are pivotally supported in the carriage and move with it. A suitable spring is connected to each plate and to a part of the carriage frame and rotates the plate into engagement with the spaces between the teeth of the wheels of the totalizer and counter respectively. When the carriage is so positioned that the totalizer is in cooperative relation with the type carriers, the totalizer wing is released from locking engagement with the wheels by a lug 510 carried by the plate 505, and, as shown in Fig. 5, this lug being higher than a similar lug 511 for releasing the wing for the counter, the counter wing being also somewhat longer than the totalizer wing so that it may be released by the shorter lug 511 when the counter is in the zone of its actuating mechanism. When the counter, however, is moved into the zone of the type carriers, the long lug 510 also operates to release its locking wing, but when the totalizer is in the zone of the counter actuating mechanism, the short lug 511 will not operate the totalizer wing. Therefore, the totalizer cannot be operated by the counter actuating mechanism.

The plate 503 is notched at its bottom edge, as shown clearly in Fig. 88, and cooperating with these notches is a roller carried by the end of an arm 513 of a lever 514, constituting a totalizer displace lock, said lever pivoted on a shaft 515 Fig. 83, and having a pin 516 engaging a notch in a lever 517 pivoted on the shaft 478, the lower end of the latter lever adapted to engage in a notch of a locking disk 518 secured to the cycler shaft 68. With the carriage positioned with the totalizer wheels in alinement with the type carriers, the roller seats in a notch between the teeth of the carriage plate 503 and the end of the lever 517 occupies the position shown in Fig. 83, permitting the cycler shaft to rotate. If the carriage is improperly positioned so that the roller is depressed, then the lever 517 is rocked to bring its lower end into the notch in the disk 518, thus locking the cycler shaft.

There is a set of teeth on the plate 503 to cooperate with the totalizer displace lock while the totalizer wheels are located in or pass through the zone of the type carriers and plus-minus fixed gears, and there is also a set of teeth which are adapted to co-operate with said zone lock when the counter wheels are in the zone of the type carriers, see Fig. 4, and between these two sets of teeth is a solid portion which locks the cycler shaft against movement while the carriage is moved from the position in which the last wheel of the totalizer passes out of the zone of the type carriers and until the first wheel of the counter comes into said zone.

When the carriage is moved by hand to different positions under control of the tabulating keys, it is undesirable that the roller on the arm 513 should click over the teeth, and to prevent this a bar 503ᵃ is mounted between the plate 503 and the front plate of the carriage, see dotted lines Fig. 4 and full lines in Figs. 9, 21, 28, 29, 87, 97 and 101. This plate is provided with oblique slots and is guided by studs 504ᵃ, Fig. 4, and the tabulating keys are each adapted to engage and depress this bar. The roller extends beyond the plate 503 sufficiently to come into path of the bar 503ᵃ so that the totalizer displace lock is moved to locking position, preventing any operation of the machine while the carriage is being positioned.

Pivoted on the back of the plate 503 is a pawl 519 having a rounded nose and to which is attached a spring 520, the opposite end of which is fastened to a stud 521 projecting from a plate 522, which is mounted just back of and secured to the plate 503. The plate 522 has a shoulder 523 which maintains the pawl in the position shown in Fig. 88, and the purpose of this pawl is to cooperate with a zone lock at certain times during multiplication and division. The zone lock comprises a lever 524, Figs. 25, 27, 87, 88, 97, 98, 99 and 100 and is pivoted on the shaft 515, its lower arm having a pin engaging a slot in a lever 525 loosely mounted on the shaft 478. This lever has an arm 526 for engagement with a zone lock cam 527 mounted on the muldiv cam shaft.

The plate 522 has a ledge 528 at right angles to the vertical plane of the plate, said ledge acting as a means with which the zone lock 524 may cooperate except when the totalizer is in what may be termed the multiplication zone or the division zone, said ledge having a cut-out portion extending from the point 529 to the point 530, Fig. 88, which determines this zone, see dotted line structure in Fig. 4. The normal position of the totalizer carriage is shown in Figs. 2 and 4 in which position the units wheel of the totalizer is in alinement with the units type carrier. During multiplication, the carriage is fed to the right upon each depression of the muldiv handle from normal position to zero position. The mechanism whereby this is accomplished will be described later. Normally, the zone lock cam 527 is in the position shown in Fig. 27, but as the muldiv lever moves from normal position to zero position, said cam assumes the position shown in Fig. 87 throwing the zone lock lever 524 to the position indicated in said figure, it being permitted at this time to move up because the cut-out portion of the latch is so positioned as to permit this. Not only does the muldiv lever rock the zone lock lever to the position shown in Fig. 87 upon its downward movement from normal to zero, but also on its upward movement from normal to one, the latter position being depicted in Fig. 90. If, therefore, after the multiplication operation has been completed and the operative should carelessly continue to move the muldiv lever, thereby feeding the carriage to the right in Fig. 4, it will result that the solid portion of the ledge at 529 will eventually abut the zone lock lever 524 which at this time is in raised position so that when the muldiv lever on being depressed to feed the carriage will cause the carriage to be fed only a half space, bringing the totalizer displace lock into operation to lock the cycler shaft. Release of the lever is brought about by moving the carriage to the left by hand, permitting the muldiv lever to return to normal and the zone lock lever to be withdrawn.

If the carriage is positioned to the left of that shown in Fig. 4, which would mean that the units wheel of the totalizer was not in alinement with the units type carrier, then the zone lock lever would engage the pawl 519 in line with its pivot and said pawl would prevent the lever from moving and therefore lock the muldiv lever. If the carriage were moved another step, the solid portion of the ledge beginning at 530 would come over the zone lock lever 524 and prevent movement of the muldiv lever. Pawl 519 has a particular function to perform in connection with division and its operation in that connection will be described a little later.

A keyboard locking cam 531, Figs. 25 and 51, is also secured to the muldiv cam shaft, said cam having a smooth periphery with the exception of a single notch situated therein with which engages the end of a lever 532 pivoted at 533, its forward end engaging a link 534, Figs. 4 and 25, whose lower end is pivotally connected at 535 to a lever 536, having an upwardly extending notched arm 537 and a pin 538 carried on its lower arm. Within the notch engages a roller carried by a spring detent 539, a spring 540 holding the roller in notch for the purpose of returning the lever 536 to normal position whether moved in one direction or the other. Movement of the muldiv lever either way from normal position rotates the cam 531 sufficiently to vibrate the lever 536. The pin 538 of said lever engages a slot in a key locking plate 540, Fig. 4, having notches through which pass the links 10 of the numeral keys and the links 407 of the special keys. The digit key links are each provided with a shoulder 541, Fig. 7, with which the locking plate engages to lock said keys in normal. The special key links 407 are each provided with a lug 542, Fig. 29, which is engaged on one side or the other by the plate 540 to lock said keys either in depressed or normal position.

Depending from the lever 532 is a finger 543, which normally engages a notch in the disk 78 which is oscillated from the operation bail 70. Just as soon, therefore, as the bail starts driving, the finger is moved out of the notch, resulting in pulling up on the link 534, which has the effect of sliding the locking plate 540 to lock the keys from the bail.

Carriage feeding

Feeding of the carriage step-by-step to the right and to the left, is accomplished under control of the muldiv lever by mechanism constructed as follows:

The carriage containing the totalizer has at its lower rear portion another plate 544 extending across from side to side and into this plate are cut teeth 545, Figs. 21, 25, and 88, which teeth are adapted to be engaged by a carriage feeding dog controlled by the muldiv lever and acting to space the carriage step-by-step towards the right, as the muldiv handle is moved from normal to zero position, and to space the carriage to the left, step-by-step, as the lever is moved to its uppermost position. The dog is shown in Fig. 21 in normal position and in Fig. 87 in actuated position, Figs. 103 and 104 being detached perspective views of the dog and its controlling cams, in normal position.

Actuation of the dog is effected through means of a multiplication feed cam 546 and a division feed cam 547, both mounted on the muldiv cam shaft, Figs. 51 and 94. Cooperating with the multiplication feed cam 546 is an arm 548 of a lever 549, Figs. 87 and 103, said lever forked at its upper end and having a pin 550 extending between the forks. Loosely mounted on the shaft 551 is a multiplication feed disk 552. The shaft extends between frame plates of the machine as shown in Fig. 105 and a spring 553 encircling the shaft presses against the disk and holds it against the right fork of the lever 549 and in the position shown in Fig. 103, the feed disk having a slot engaging the pin 550 upon which it may be guided during the sliding movement of the disk under action of the spring. The disk is also provided with a lifting cam 554, a locking cam 555, and a dog actuating cam 560, which is offset to the right of the plane of the disk as shown in Fig. 103.

Mounted for oscillation on a shaft 561 is the multiplication and division feeding dog, which is really a duplex dog, consisting of an element 562 and an element 563 connected together by a bar 564 so that the compound dog moves as one piece, Figures 103, 104, 105 and 106. The element 562 is formed into a carriage feeding portion 565, see Figure 93, a disk engaging portion 566 and an actuating tail 567. The dog element 563 has a disk engaging portion 566$^a$, Figure 97, corresponding to the portion 566, and an actuating tail 567$^a$, similar to the tail 567. Instead of a portion corresponding to the portion 565, however, the element 563 has a controlling finger 568, adapted to cooperate with a stationary lug 569, Figures 87, 93 and 97, carried by a frame plate of the machine. When the muldiv lever moves from its normal position to its zero position, the lever 549 is rocked backwardly, causing the feed disk 552 to rotate clockwise from the position shown in Figure 103. The actuating cam 560 is normally immediately behind the tail 567 so that the first action of the feed disk is to move the dog to the left. At this time the carriage feeding portion 565 of the dog is below and out of contact with the teeth on the carriage and the finger 568 is below the lug 569, as shown in Fig. 93. The dog is then free to move to the left. As it does so it compresses a spring 570 coiled about the shaft 561, Figure 105, and aligns the carriage feeding portion 565 of the dog between the teeth 545 of the carriage. As the feed disc 562 continues its clockwise oscillation the cam 554 contacts the portion 566 of the dog and moves the portion 565 in between two of the teeth 545. The leftward movement of the dog, brought about by the cam 560, has also caused the finger 568 to be positioned to the left of the lug 569 so that this lug offers no interference to the lifting movement of the dog. During this lifting movement likewise the cam portion 560 of the disc 552 passes out of contact with the tail 567 and a notch in the disc permits the spring 570 to act to move the carriage one space to the right just as soon as the tail 567 aligns with the notch, the spring 570 being sufficiently strong to move the carriage under these conditions. The parts are then in the position shown in Figure 87, the one step movement of the dog, and consequently of the carriage, being limited by spacing collars 571 and 572, Figures 105 and 106. As the carriage completes its shifting movement to the right and while the muldiv lever is still held in its lowest position, the feeding dog in moving to the right drops from the lifting cam 554 onto the locking cam 555, this cam, however, being of sufficient height to still maintain the portion 565 between the teeth of the carriage bar and the dog itself, and is prevented from any lateral movement by reason of the fact that its finger 568 is at this time to the right of the lug 569 and against collar 571, thereby preventing any movement of the carriage to the right or to the left.

As the muldiv lever is permitted to rise to its normal position, thereby permitting the lever 549 to return to normal position under action of its spring 573, Fig. 25, the feed disk is permitted to return to normal position.

During this return the cam 560 engages the tail 567 and in order to permit these two parts to pass each other, the feed disk is permitted a lateral movement by reason of spring 551 interposed between said disk and the frame plate of the machine. When the said disk reaches normal position, the dog drops to normal under action of a spring 570ª connected between an offset 570ᵇ and a frame plate of the machine as shown in Fig. 21 and its element 565 passes out from between the teeth of the carriage.

The various positions of the finger 568 and of the lug 569 are shown in Fig. 91, the first position showing the parts in normal as is also shown in Fig. 93. The second position shows the finger moved from adjacent the right edge of the lug to the position adjacent the left edge and corresponds to the position which the dog occupies after the cam 560 has become effective, but before the lifting cam has acted. The third position shows the parts as they would be situated after the lifting cam has acted, the finger then being above and to the left of the lug. The fourth position shows the parts after the spring 570 has forced the carriage to the right one step. The fifth position shows the dog having dropped to the position shown in Fig. 87.

Feeding for division is somewhat similar to that already described and for this purpose the division feed cam 547, Figs. 25 and 97, cooperates with an arm 574 on the division feed lever 575, Figs. 25 and 97, said lever also having an arm 576 to which is attached a spring 577 for holding the lever against its cam. The lever 575 is forked at its upper end, a pin 578 engaging the forks. The space, however, between the forks of the division lever is less than that between the forks of the corresponding multiplication lever because in the latter case, provision must be made for lateral movement of the feed disk 552. The division feed disk 579, however, does not require any lateral movement. This disk is provided with a locking cam 580, a lifting cam 581, and also a spacing cam 582.

When the muldiv lever is moved to its extreme upper position, the muldiv cam shaft positions the division feed cam 547, as shown in Fig. 97, and the division feed disk 579 is rocked about the shaft 561. Unlike multiplication, the first action of the feed disk is to lift the carriage feeding dog so that the finger 568 is above the lug 569 and thereafter the feeding cam 582 engages the tail 567ª and forces the dog to the left, while the element 565 is in engagement with a tooth on the carriage. This results in forcibly feeding the carriage to the left one space and as this shifts the dog laterally, the element 566ª thereof drops from the lifting cam 581 onto the locking cam 580, the finger 568 at this time being positioned to the left of the lug 569, the spring 570 having been compressed. At this time the carriage is limited in its movement by the sleeve 572 and locked between said sleeve and lug 569. When the muldiv handle is permitted to recede slightly from its uppermost position sufficiently to permit the cam 547 to move away from the arm 574, the spring 570 returns the lever 575 to its normal position, permitting the finger 568 to move down on the left side of the lug, said spring further causing the finger to snap under the lug to normal position.

The position which the parts assume at various stages of this operation is shown diagrammatically in Fig. 92, the first position of which shows the parts as they are in Figs. 21 and 104. The second position shows the finger 568 as having been lifted to the upper surface of the lug 569. The third position shows the finger as having moved to the left side of the lug under force feed of the disk 579. The fourth position shows the dog as having dropped to the locking cam 580 and the fifth position shows the parts just after the handle has permitted the dog to return to normal and just as the finger is about to snap under the lug to again assume the position shown in the first view of the diagram.

During the movement of the muldiv lever from normal position to the nine position of the scale, the muldiv lever may be said to be within the multiplication zone, the muldiv operation disks having been positioned as already described, on the initial movement of the lever from normal position to one position. Setting of the lever to any figure of the scale and moving it downwardly as far as it will go, results in rotating the addendor a number of times corresponding to the height to which the lever is lifted, as has already been described, and as the muldiv handle moves from normal position to zero position, the carriage is fed one step to the right, the feeding taking place at the very end of the movement.

In order to perform division a somewhat different setting of the rockers is necessary, and this is brought about when the muldiv lever is lifted to its extreme position shown in Fig. 96. During this time several teeth on the gear 465 have engaged teeth on the gear 466 and caused said gears to assume the relative positions shown in Fig. 95 with the result that the muldiv cam shaft is further rocked and the muldiv cross cams rock the arm 480 to the position shown in Fig. 94, resulting in rocking the muldiv operation disks a further amount. The only change in the rockers, however, which this operation causes is the placing of the plus-minus rocker in its second position to connect the plus-minus shift gears with the minus gears so that rotation of the addendor will transfer the set up thereon in a minus direction, to the totalizer. The counter rocker is also positioned in its third position by reason of the counter rocker cam being moved from the position shown in Fig. 84 to the position shown in Fig. 94. The reason for this change will be understood when the counter actuating mechanism is described.

When the muldiv lever has been moved to the position shown in Fig. 96, the driving pawl 453 is positioned away from the first driving tooth of the ratchet and as the muldiv handle is permitted to recede from its highest position and before any driving action of the cycler shaft begins, the muldiv cams move back to the position which they formerly occupied and the muldiv operation disks again assume the position shown in Fig. 84. That is to say, while the muldiv operation disks are locked by the latch 427 in the position to which they are set for multiplication, the division setting merely temporarily changes them and they are again moved back under action of their returning springs. At this point it may be well to state that the plus-minus rocker is retained in the position for division by its spring detent 168, as is also the counter rocker.

In carrying out division, the dividend appears on the totalizer and may be initially set thereon by setting up the divide d on the keys and running it into the totalizer in the usual way for an added item or it may have been the result of an accumulation of a number of added items, or it may be the result of a multiplication. In any event, the dividend must be placed upon the totalizer wheels before division can be proceeded with. The divisor is then set up on the addendor and the muldiv lever is moved to its higher position to set the machine for division.

As in multiplication, it is necessary that the addendor rocker be moved to its second position to cause the set up in the addendor to be repeatedly subtracted from the number in the totalizer.

Since it is desired to carry, but since no printing is necessary and also since the addendor must not be returned to normal position during the division process, the cycler rocker is moved to its first position to disconnect the cam shaft from the cycler shaft while maintaining the carry drum connected therewith.

Since in division, the divisor is subtracted from the dividend, the plus-minus rocker should be in its second or subtracting position. The counter rocker will be explained in connection with the counter actuating mechanism. The non-print rocker occupies the same position as in multiplication. The totaling and symbol rockers are maintained in their first positions. As for multiplication, the type coupler rocker is in its third position, since it is not desired that the type carriers move.

*Counter actuating mechanism*

It has been suggested that the counter may be positioned in alinement with the type carriers and a total printed from it. It will also be remembered that the totaling mechanism is designed to return the wheels of the totalizer or the wheels of the counter to normay position by movement in a constant direction. Since in this machine, the counter is used to print the multiplier in multiplication and the quotient in division, it is essential that the wheels of the counter be turned in the same direction for both of these processes during counting, otherwise the total from the counter would not truly represent the factors sought. On the other hand, since this machine is designed to automatically carry out division by the process of repeatedly subtracting the divisor from the dividend, there comes a time in this subtracting process when an oversubtraction occurs, as mentioned on page 84 of this description, and as will be explained more in detail when the operation of division is described. When such over subtraction occurs, the machine is automatically changed to multiplication and at this time the counter must be rotated reversely one step to take out the extra digit of the quotient which has been inserted at the time of the over subtraction. The counter actuating mechanism which will now be described provides for carrying out all of these functions.

The counter wheels 490, Fig. 5, are adapted to be actuated by a master pinion 583 secured to a master shaft 584; see also Figs. 36, 107 and 108, suitably supported in the left side plate of the machine and in the frame plate 116. Just inside of the central plate through which the shaft passes, there is a pinion 585, Figs. 36 and 108, secured to a sleeve 586 at the right of which is a second pinion 587 also secured to the sleeve, the sleeve in turn being secured to the shaft 584. Means are provided to rotate the shaft 584 in one direction or the other, or not to rotate at all, depending upon the adjustment for which the machine is set. For this purpose, a longitudinally movable shaft 588, Figure 107, has its left end supported in the inner plate shown in Figure 36 and its right end extending through the next two adjacent frame plates. The shaft is provided with a sleeve 588$^b$, Figures 36, 107 and 108$^a$, which sleeve carries two pinions 589 and 590. One of these pinions, 589, is on the inside of the frame plate and pinion 590 is on the left end of the sleeve. The shaft 588 has a collar 588$^c$ secured thereto and the sleeve 588$^b$ is mounted on the shaft between this collar and a hub 588$^a$, Figures 108 and 108$^a$, secured to the shaft 588 by a pin 588$^d$. Also secured to the shaft is a side frame piece 591 having an arm 592, Figures 29, 107 and 108, adapted to engage a cam slot 593 in a cam piece 594 pivoted on a shaft 595, Figure 29, said cam piece 594 as shown in Figure 107, having its left end serrated for engagement with a spring actuated pawl 596, Figure 29, to hold the cam piece in any one of the three positions which the shaft may occupy. Mounted adjacent the shaft 588 is another shaft 597 supporting reversing pinions 598 and 599 secured together by a sleeve 600, the sleeve being loose on the shaft 597. Normally, the pinion 590 is to the left of and out of mesh with the pinion 598, this normal position of the parts being shown in Figs. 29, 36 and 107. The arm 592 is then in the upper portion of the slot 593. When the cam piece 594 is rocked to its second position, the pinion 590 is shifted into mesh with the pinion 598 so that rotation of the shaft 588 is transmitted through the pinion 590 to the pinion 598, the pinion 599 driving in the same direction and transmitting its movement in the reverse direction to the wheel 587 which is constantly in mesh therewith, resulting in rotation of the master shaft 584. When the shaft 588 is shifted to its third position, the wheel 590 meshes directly with the pinion 587 and moves to a position to the right of the pinion 598 but to the left of 599. Reverse rotation of the shaft 588 will then result in driving the master shaft 584 in the same direction as before. This reversing mechanism between the shaft 588 and the master shaft is necessary because the shaft 588 is driven through the plus-minus shift gears and therefore is rotated in a different direction during division from what it is during multiplication.

The cam piece 594 has connected to it, to the left of its pivot, a link 601, Fig. 29, which in turn is connected to an arm 602 of the counter rocker 603. The position of the rocker, therefore, determines whether the master wheel 583 shall remain stationary, or be driven. The shaft 588 is driven in one direction or the other by means of a gear 589 which is in mesh with a pinion 604, Fig. 107, secured to the left side of the plus-minus shift gear 158, Figs. 36 and 107, said pinion 604 being sufficiently wide to maintain meshing relation with the gear 589 in any of the positions which the shaft 588 may occupy, which width is also sufficient to take care of movement of the plus-minus shift gears. In Fig. 107, the plus-minus shift gear is shown at 158 and also the minus gear 157 and the plus gear 154. This plus gear is adapted to be engaged by a tooth 605 on the carry spiral 297 so that at every rotation of the carry spiral, the plus gear is driven one step and depending upon the position of the plus-minus shift gears the shaft 588 is rotated in one direction or the other. This train of gearing is adjacent the highest order gear train and is for the special purpose of driving the counter and therefore does not connect with a type carrier or totalizer.

When the muldiv lever is moved to set the machine for multiplication, the muldiv operation disks position the counter rocker to its second position leaving the plus-minus rocker at plus position. The plus-minus shift gears 158 engage directly with the plus gears 154. The carry spiral 297 is always rotated clockwise, as indicated in Figure 6. The plus gear 154, Figure 107, is therefore rotated anti-clockwise driving the gear 158 and pinion 604 in a clockwise direction. The gear 589 enmeshed with 604 is driven anti-clockwise and hence the sleeve 588$^b$ and wheel 590. With the shaft 588 in its second position laterally the wheel 590 is enmeshed with the pinion 598 so that this pinion and also the pinion 599 are driven clockwise but 587 always enmeshed with 599 is driven anti-clockwise and with it the shaft 584 and counter operating master wheel 583 which will therefore then rotate in a direction to cause the counter wheels to rotate in the same direction as the totalizer wheels. A spring detent 583$^a$, Figure 5, engages between the teeth of the counter master wheel to maintain it in alignment with the counter wheels.

Because of the manner in which the type carriers are positioned from the counter wheels it is necessary to turn them in the same direction during division as during multiplication, i. e. clockwise. Therefore, the master wheel 583 must be driven anti-clockwise both during division and multiplication, hence the need of the mechanism shown in Figures 107 and 108. When the muldiv handle moves to division the counter rocker is moved to its third position but at the same time the plus-minus rocker moves the plus-minus gears shift so that the clockwise movement of the carry spiral tooth 605, Figure 107, is transmitted to the pinion 604 in an anti-clockwise direction instead of in a clockwise direction as for multiplication. The pinion 589 is turned clockwise, as is likewise the gear 590, but the shaft 588 is in its third or right hand position as viewed in Figures 36 and 137 so that 590, which directly engages 587, drives it anti-clockwise together with the shaft 484 and the master wheel 583. The counter wheels, therefore, through the medium of the counter rocker, are set to rotate in a like direction to the totalizer wheels for multiplication, and in an unlike direction during division, and at other times, as for ordinary addition, subtraction and for totaling, the master shaft does not rotate at all. When the shaft 588 is at neutral, the hub 588$^a$ which is secured to the left end of the shaft 588 as shown in Figures 108 and 108$^a$ is positioned with its teeth in mesh with the pinion 585 to hold it against any accidental displacement. This double reversing mechanism from the driving tooth 605 on the carry spiral to the counter master wheel is provided because the counter wheels are used to position the type carriers for total printing, and since they are returned to zero for this purpose by movement in a constant direction, as explained in connection with the totaling mechanism, they must be rotated from zero in the same direction when counting the multiplier in multiplication and for counting the quotient in division. This construction is also necessary to take care of the proper turning of the counter wheels in case of over subtraction, as will be better understood when the over subtraction mechanism is gone into in detail.

*Operation of the machine for division*

In order to better understand the manner in which the machine functions during division, it will be assumed that the number 625 is standing on the total wheels and it is desired to divide this by 25. To carry out the division, the number 25 is set up on the digit keys which in turn cause the addendor disks to be positioned at 25. The totalizer is then positioned so that the 5 of the divisor is in alinement with the 6 of the totalizer. The muldiv handle is then moved to its uppermost position shown in Fig. 96 and during the last portion of this movement the carriage feed cam operates to feed the carriage one step to the left, thereby positioning the 5 of the divisor in alinement with the 2 of the dividend. The muldiv handle is then moved downwardly and when it reaches a position corresponding to 12 on the scale Fig. 96, the pawl 543 begins to drive and the addendor is rotated, thereby subtracting 25 from the totalizer. When the addendor has been rotated twice and 25 has been therefore twice subtracted from 62, the number 12 stands on the totalizer wheels and since this is less than the divisor a third subtraction will result in turning all of the wheels of the totalizer in higher orders from zero to nine position by reason of the carrying mechanism acting through the train of totalizer wheels.

In this machine, means are provided whereby, when the highest wheel passes from zero to nine during division, a change is made in the setting of some of the parts so that the over subtracted number is again added to the totalizer and the muldiv lever locked. The mechanism for this purpose is constructed as follows:

Referring to Figs. 109 and 111, the lower carry lever 291 in highest order is similar in shape to the other lower carry levers, except that at its lower end it carries a laterally projecting pin 606. Whenever this lever is tripped by the highest wheel of the totalizer, passing through zero during subtracting, the pin moves rearwardly and makes contact with the edge of an arm 607 rigidly secured to a sleeve 608 loosely mounted on a shaft 609, see also Fig. 9. Shaft 609 is a prolongation of the plus-minus rocker shaft, the plus-minus rocker 173 being shown in Fig. 109. The sleeve has secured to it a second arm 610 having a bent-over lip 611 at its forward end which normally occupies the position shown in Fig. 9, but which when the sleeve is rocked by tripping of the highest carrying lever, positions the lip in the path of a cam 612 on the carry drum. Pivoted to the upper end of the arm 610 is a pawl 613 held downwardly by a spring 614 connected between the pawl and the arm. The pawl has a laterally extending finger 615 which normally rests upon a curved surface of a projection 617 on an arm 618, which arm is rigid with the plus-minus rocker shaft 609. The finger 615 also extends in front of a locking lever 619 loosely mounted on the plus-minus rocker shaft, said locking lever having a hook 620 and an upper notched portion in which engages a spring urged detent 621 to hold the locking lever in either one of its two positions, the normal position being shown in Fig. 109.

When the muldiv lever is moved to division position, the plus-minus rocker is set to subtracting position as shown in Fig. 94, through the medium of the muldiv operation disks. Just as soon, however, as the handle recedes from its extreme position, the muldiv disks return to multiplication position, leaving the plus-minus rocker, however set, in its second position, but being held there by its spring detent 168 Fig. 29. The plus-minus rocker is therefore left free to be moved back again to its second position. The significance of this will immediately appear.

When the addendor is driven the third time to subtract 25 from 12 and carrying takes place throughout the train of totalizer wheels, resulting in tripping the special lower carrying lever shown in Fig. 109, its pin 606 rocks the arm 607 and the sleeve 608 connected thereto to move the lever 610 to the position shown in Fig. 110 with the finger 615 resting against the shoulder 622 on the arm 618. Said shoulder is normally removed from the pawl in the position shown in Fig. 109 and is moved about half way towards the finger when the plus-minus rocker is set in its second position. The rocking of the lever 610, however, which is brought about by the tripping of the carrying lever, does not of itself cause any change in the position of the plus-minus rocker, the cam 612 serving this purpose. Said cam normally occupies the position shown in Fig. 9 and since the over carrying may occur either during the addendor drive or during the carry drive, said cam may have rotated so far as to have reached the position shown in Fig. 110 before the carrying lever of highest order has been tripped. Since, however, the carrying drive is completed by the time the cam is in the position shown in Fig. 110, the lower carry lever is then in its tripped position if an oversubtraction has taken place. Further rotation of the carry drum carrying the cam 612 will therefore result in said cam coming under the lip 611 and forcibly rocking the arm 618 to the rear, which in turn will cause the plus-minus rocker to be set to addition, the plus-minus gears being shifted thereby. At this time the muldiv lever has reached the 11 position shown in Fig. 96.

Not only is the arm 618 rocked by the finger 615 but the lever 619 is moved from the position shown in Fig. 110 to the position shown in Fig. 114, positioning its hook in the path of a locking arm 622$^a$ pivoted loosely on the carry drum shaft, Figs. 110 to 115. The cam 612 does not begin to lift the lever 611 until the arm 622$^a$ has passed the end of the hook so that the hook and arm do not engage during the rotation of the cycler shaft which changes the parts from subtraction to addition. Fig. 112 shows the position of the parts with the cycler shaft and carry drum at normal and with the parts positioned for addition.

As the muldiv handle continues to move downwardly from the 11 position to 10 position, the addendor, by reason of the change in the position of the plus-minus fixed gears, acts to add the oversubtracted 25 back into the totalizer which then stands at 125 and as the carry drum reaches the position shown in Fig. 114, the hook on the lever 620 engages the arm 622$^a$, thereby preventing further movement of said arm. A pin 622$^b$, Fig. 114, which is rigid with a disk 622$^d$ secured to the carry drum, continues to move, however, to the position shown in Fig. 115. A second pin 622$^e$ also secured to the carry drum and to which one end of a spring 622$^c$ is attached, the other end being connected to the arm 622$^a$, is moved to the position shown in Figure 115, thereby putting tension on the spring 622$^c$. The pin 622$^b$ serves as a stop for the arm 622$^a$ when said arm is released from the hook 620. As the carry drum comes again to normal position, a second pin 623 abuts the rear face of the arm and locks the carry drum and hence the cycler against any further downward movement. This occurs when the pointer is at about the 10 position on the scale. It may be stated at this time, however, that the scale is of no particular importance in division because the muldiv lever is moved upwardly as far as it will go and is brought down until it becomes locked, this locking indicating that the first step in the division operation has been completed.

The muldiv handle is again raised to its extreme position which causes the carriage to feed one space to the right to position the 5 of the addendor disk in alinement with the 5 of the totalizer. The raising of the muldiv handle also again sets the plus-minus rocker back to minus position and in so doing positively rotates the plus-minus rocker shaft 609 Fig. 109 and the arm 618 rigid therewith, in a clockwise direction, and a pin 624 extending rightwardly from said arm engages behind the lever 619 and rocks it back to normal position, thereby withdrawing the hook from the arm which immediately snaps to its normal position shown in Fig. 113 under action of its spring. The muldiv handle is again moved forward until it again becomes locked, this occurring after six rotations of the addendor, and is again raised to its extreme position resulting in feeding the carriage another space to the left, which operation brings into play additional mechanism for releasing the muldiv drive pawl 453 from its ratchet.

This additional mechanism is controlled from the carriage and will be understood by reference to Figs. 88, 98 and 100. It will be remembered in connection with multiplication that if the carriage is positioned one step to the left of units order, the pawl 519 Fig. 88 will be positioned above the zone lock lever 524 and prevent the muldiv lever from rising. In division, however, while the muldiv lever is above its normal position, the zone lock is raised and enters between the edges 529 and 530 of the ledge shown in Fig. 88 and when the totalizer is in units order and is moved one step to the left thereof by the muldiv lever, the pawl 519 is rocked on its pivot as shown in Figs. 98 and 99 by the zone lock lever until the cut-out face of said lever encounters the end 530 of the ledge, as shown in Fig. 100. During this step of movement, however, a lug 625 also carried by the plate 522 engages the end 626 of a lever 627 pivoted at 551 and having a pin engaging a slot in another lever 629 pivoted at 478, said lever extending forwardly and having a cam 631 adapted to engage a projection on a lever 632 pivoted at 633, said projection abutting an arm 634 of the muldiv driving pawl 453 to disengage said pawl from the teeth of the driving ratchet. The lever 632 is maintained in a position to which it is moved by the cam 631, by a notched detent 635 Fig. 101. The muldiv driving pawl is therefore disconnected from the ratchet, and permits the muldiv lever to drop.

To reconnect the muldiv driving pawl with its ratchet, the muldiv lever is fully depressed and a reconnect cam 636 mounted on the muldiv cam shaft 468 acts on a tail 637 of the lever 632 just as the muldiv lever nears the end of its down stroke, and re-positions the lever 632 at normal, thereby permitting the muldiv pawl to assume the position shown in Fig. 102 under tension of its spring.

As the muldiv lever passes normal position, the zone lock lever 524 is withdrawn from raised position, by its spring, but as the muldiv lever passes on below normal the pawl 519 snaps over the top of the zone lock. The muldiv handle therefore cannot be depressed sufficiently to feed the carriage to the right because the zone lock cannot be fully raised. This locking of the muldiv lever against any further depression indicates that the division operation has been completely carried out and if the muldiv lever is then released it will be returned to normal by its return spring.

The muldiv operation disks, however, still remain set and in order to release them the normalizer key may be depressed, or, if it is desired to at this time print the quotient, the total key may be depressed after having first positioned the counter wheels in alinement with the proper type carriers. The total key is depressed to clear the counter and print the quotient. In order to print the devisor, the non-calculate key is depressed which causes the addendor to be cleared and the number thereon printed while the totalizer wheels remain as they were.

In the example chosen for illustrative purposes, the divisor was contained in the dividend an exact number of times. In case of a remainder, however, this would appear on the totalizer wheels and may be printed in the usual way by depressing the total key.

It will be remembered that when the muldiv lever is set to subtraction, a cam on one of the muldiv operation disks positions the counter rocker in its third position to cause the counter master wheel 583, Fig. 108, to rotate in the opposite direction from the wheels of the totalizer. When over-subtraction took place, however, and the plus-minus rocker was shifted from minus position to plus position by the mechanism shown in Figs. 109 to 112, no shifting of the counter rocker occurred, said rocker still remaining in its third position. Therefore, during the next rotation of the addendor and consequent addition of the number contained therein to the totalizer, the master wheel 583 rotated one step in the opposite direction from which it had been previously rotating, thereby subtracting the number from the counter wheel with which it engaged.

It will now be understood why the cam on the muldiv operation disk controlling the plus-minus rocker is of a height such as to permit said rocker to move between its (1) position and its (2) position without positively locking in either.

Means are provided for locking the cycler shaft at the end of the multiplication stroke of the muldiv handle, said means comprising a locking disk 638 secured to the cycler shaft and having a notch 639 into which a projecting finger 640 of the multiplication feed lever 549, Fig. 93, is adapted to enter just as the muldiv lever completes its stroke and reaches 0 position, this latter position being shown in Fig. 87.

It may sometimes happen during subtraction that the capacity of the totalizer is exceeded and therefore the highest wheel of the totalizer is overthrown, thereby causing the lock lever 620 to be positioned in the path of the arm 622ᵃ. This would result in locking the machine at a time when no locking should occur, and to prevent this, a cam 641 is provided on the cam shaft, Figure 109 said cam having a portion 642 adapted to co-act with a finger 643 on the lever 619 to move the hook out of locking position. The cam 641 is so situated on the cam shaft that the lever 619 is rocked just at the end of the addendor drive. The machine, therefore, is not locked when the cam shaft is rotating and the shaft is always rotated during ordinary addition and subtraction and during totaling operations.

If the capacity of the machine is exceeded in addition, the hook 620 is not raised high enough to come into contact with the lug 622ᵃ because at this time the cam surface 617 is so positioned that the finger 615 engages above the shoulder 644 of the lever 619 instead of below said shoulder as it does when the plus-minus rocker is in its second position.

*The unmultiply key*

This key is used whenever the operative finds in multiplication that he has raised the muldiv handle too high and has therefore multiplied by a digit greater than he desires. He might wish to correct that figure without doing all of the work over again. Thus, if the muldiv handle had been raised to 7 instead of to 5, it is possible by the unmultiply key to unmultiply by 2. This means that the multiplication should be reversed to subtraction, but it also means that the counter rocker should remain in position to rotate the counter wheels in the same direction as the totalizer. The unmultiply key is, therefore, provided, and its link 407 is connected to a pair of operation disks shown in Figs. 37 and 38, said disks being secured together as are the other operation disks described, and being mounted on the shaft 400. Said disks have slots through which pass the rods 423 connecting the universal plates. At the time that the unmultiply key is depressed, however, the muldiv operation disks are set and latched so that the unmultiply operation disks do not then act to move the universal plates because they have already been moved to release the rockers held thereby by the muldiv disks. The unmultiply disk shown in Fig. 38 has a single cam which is of the same height as the corresponding cam on the muldiv disk and holds the rocker from movement beyond its second position. The unmultiply operation disk shown in Fig. 37 has a cam which engages the other end of the plus-minus rocker and moves it from its one position, which it occupies in multiplication, to its second position for subtraction, said cam passing the end of the rocker finger and out of contact therewith so that if there should occur an over-subtraction during the unmultiply operation, the plus-minus rocker could be moved to plus position.

If, therefore, the operative multiplied by 7 when he should have multiplied by 5, the unmultiply key is depressed while the muldiv handle is at normal. This must be done because at this time the keyboard locking cam is then in position to unlock the keys. The muldiv lever is then raised to (2) position on the scale, and depressed, which results in subtracting the number set up on the addendor twice from the totalizer. Since the counter rocker still remains set as for multiplication, it moves in the same direction as the totalizer and therefore the counter wheel engaged by the counter master wheel is rotated two steps to subtract out the wrongly entered multiplier digit.

Since the muldiv lever on reaching its lowest position operates to feed the carriage one step to the right, the carriage has to be repositioned before multiplication can be proceeded with.

The unmultiply operation disks are not provided with any lug co-operating with the latch 427 as are the other disks, but are provided with a special lock shown in Fig. 29, this lock consisting of a lever 645 pivoted at 646, and urged by a spring 647 in contact with a lug 648 projecting from the link 407 connected to the unmultiply key. As the key is depressed, therefore, and its link 407 moves rearward, the lug 648 seats beyond the end of the lever 645 thus latching the key in operative position. Release of the key is effected by the cam 649 carried by the link 407 connected to the normalizer key.

In describing the subtraction key operation disks, reference was made to the fact that the cam for the plus-minus rocker was cut away and it will be observed on comparing Figs. 37 and 71, that said cam is similar to the cam on the unmultiply key operation disk and acts in the same manner as has just been described.

Having thus described my invention, what I claim and desire to secure by Letters Patent is:

1. In a calculating machine, the combination with digit keys, of digit pieces, one for each key and connected to be moved thereby, a series of setting up disks, a universal bail set by a digit piece during its forward stroke for determining how far a setting up disk shall be moved, an escapement mechanism for causing step by step movement of said series of setting up disks, a bail for said escapement mechanism adapted to be engaged and moved by any digit piece near the end of its forward stroke, said universal bail restoring said escapement bail to normal position.

2. In a calculating machine, the combination with digit keys, of digit pieces, one for each key and connected to be moved thereby, a series of setting up disks, a universal bail set by a digit piece during its forward stroke for determining how far a setting up disk shall be moved, an escapement mechanism for causing step by step movement of said series of setting up disks, a bail for said escapement mechanism adapted to be engaged and moved by any digit piece near the end of its forward stroke, said universal bail restoring both said escapement bail and said digit pieces to normal position.

3. In a calculating machine, the combination with a series of setting up disks, of a master wheel adapted to turn said disks, but normally disengaged therefrom, a series of digit keys, means including an escapement mechanism for moving said setting up disks relatively to said master wheel under control of said keys, said escapement mechanism acting to move a setting up disk into engagement with the master wheel at the end of the down stroke of a digit key and after the wheel has completed the amount of turning under control of said key, said escapement acting to again move said disk out of engagement with the master wheel as the key reaches normal position.

4. In a calculating machine, the combination with a series of setting up disks, of a master wheel therefor normally disengaged from any disk, a series of digit keys, means controlled by any key on its down stroke for first rotatively positioning the master wheel, and then causing a setting up disk to move laterally into engagement with the master wheel, said key controlled means on the return stroke of the key causing the master wheel to return enmeshed with the setting up disk engaged therewith and also causing said setting up disk to make an additional movement sufficiently to disengage the master wheel therefrom after the same has completed its turning by the master wheel.

5. In a calculating machine, the combination with a series of setting up disks, of a master wheel therefor normally disengaged from any disk, a series of digit keys, escapement mechanism including pivoted dogs for causing step by step relative movement between said setting up disks and master wheel, a series of keys, means controlled on the down stroke of any key for rotatively positioning said master wheel, and for vibrating said dogs, means for engaging and holding one of said dogs in vibrated position until the operated key finishes its return stroke, and means brought into operation as the key completes its return stroke for returning said dog to normal position.

6. In a calculating machine, the combination with a series of setting up disks, of a master wheel therefor normally disengaged from any disk, a series of digit keys, escapement mechanism including pivoted dogs for causing step by step relative movement between the said setting up disk and master wheel, a series of keys, means controlled by any key on the down stroke thereof for rotatively positioning said master wheel, an escapement bail operated by a key near the end of the down stroke thereof, connections from said escapement bail to one of said dogs, a detent for holding said dog and bail in actuated position, and a universal bail actuated by any key during its down stroke, said universal bail acting to reset said escapement bail on the return stroke of any key.

7. In a calculating machine, the combination with a series of setting up disks, of a master wheel therefor normally disengaged from any disk, a series of digit keys, an escapement mechanism including pivoted dogs for causing step by step relative movement between said setting up disk and master wheel, means controlled by any key on the down stroke thereof for rotatively positioning said master wheel, an escapement bail operated by any key near the end of the down stroke thereof, connections from said escapement bail to one of said dogs a detent for holding said dog and bail in operated position, a universal bail moved by each key during its down stroke, and connections from said universal bail for resetting said escapement bail, said keys and said master wheel.

8. In a calculating machine, the combination with a series of wheels to be driven, of a master sector, a power bail, means for connecting said sector to drive any one of said wheels by said bail, and a key for determining how far said sector shall drive a wheel.

9. In a calculating machine, the combination with a series of wheels to be driven, of a master sector for driving any wheel of the series, a key for determining how far said wheel shall be driven, and means for locking the wheel to be turned during a substantial portion of the down stroke of the key, means for releasing the wheel to be turned at the end of the down stroke, and means for turning said wheel during the upstroke and for again locking said wheel as the key finishes its return stroke.

10. In a calculating machine, the combination with a series of wheels to be turned, of a master sector for turning any wheel, a series of digit pieces, a bail, means on each digit piece for positioning said sector and storing power in said bail, and means on said bail for operating said sector under power stored therein to turn any one of said wheels an amount determined by the digital value of the digit piece operated.

11. In a calculating machine, the combination with a series of wheels to be turned, of a master sector for turning any one of said wheels, said master sector comprising a pivotally mounted rocking frame having two cross bars, digit pieces engaging one of said crossbars to position said master sector, and a universal bail engaging the other of said crossbars to operate said sector.

12. In a calculating machine, the combination with a series of wheels to be turned, of a master sector for turning any one of said wheels, said master sector comprising a pivotally mounted rocking frame having two crossbars, digit pieces engaging one of said crossbars to position said sector, a universal bail engaged and moved in constant distance by each digit piece and means associated with said universal bail for engaging the other crossbar to operate said master sector.

13. In a calculating machine, the combination with a series of wheels to be turned, of a master sector for turning any one of said wheels, said master sector comprising a pivotally mounted rocking frame having two crossbars, a series of digit pieces, each digit piece except zero, having a surface to engage one of said crossbars to position said master sector; each digit piece, including the zero, having a second surface adapted to be contacted by said second crossbar when said digit piece is moved to position said master sector.

14. In a calculating machine, the combination with a series of wheels to be turned, of a master sector for turning any one of said wheels, said master sector comprising a pivotally mounted rocking frame having two crossbars, a series of digit pieces, each digit piece except zero, having a surface to engage one of said crossbars to position said master sector; each digit piece, including the zero, having a second surface adapted to be contacted by said second crossbar when said digit piece is moved to position said master sector, and a universal bail for engaging said second crossbar to operate said sector to rotate a wheel.

15. In a calculating machine, the combination with a series of wheels to be turned, of a master sector for turning any one of said wheels, said master sector comprising a pivotally mounted rocking frame having two crossbars, digit pieces, means on each digit piece for engaging one of said crossbars to position said master sector, a universal bail engaging all of said digit pieces when in normal position, a spring for holding said bail in such position, said bail having means for engaging said second crossbar for operating said master sector to turn a wheel.

16. In a calculating machine, the combination with digit keys, of an addendor including a series of setting up disks, means for holding all of the disks locked at normal position, means for releasing and rotating any disk an amount depending on the digital value of an operated key and for again locking said disk, and means for giving the addendor as a whole a complete rotation and for unlocking and positioning all of the displaced disks at normal during such rotation.

17. In a calculating machine, the combination with an addendor including a support and a series of setting up disks rotatably displaceable on said support to set up digits, of means for rotating the addendor as a whole in the same direction as the setting up movement, and means acting during such rotation to position any displaced disks at normal.

18. In a calculating machine, the combination with an addendor including a support and a series of setting up disks rotatably displaceable on said support to set up digits, of means for locking all said addendor disks at normal position, means for rotating the addendor as a whole in the same direction as the setting up movement, and means acting during such rotation to unlock said disks and to position any displaced disks at normal.

19. In a calculating machine, the combination with an addendor including a support and a series of setting up disks rotatably displaceable on said support to set up digits, of means for locking all said addendor disks, means for rotating the addendor as a whole in the same direction as the setting up movement, means acting during such rotation to unlock said disks and means for gathering up and aligning the loose disks to thereby position any displaced disks at normal.

20. In a calculating machine, the combination with an addendor including a support and a series of toothed setting up disks rotatably displaceable on said support to set up digits, of means for locking all said addendor disks, means for rotating the addendor as a whole in the same direction as the setting up movement, means acting during such rotation to move said locking means to unlocking position, a member for gathering up and aligning the loose disks to thereby position any displaced disks at normal, and means for positioning said member in the path of the approaching tooth on each of said disks during such rotation of the addendor.

21. In a calculating machine, the combination with an addendor including a support and a series of toothed setting up disks rotatably displaceable on said support to set up digits, of means for locking all said addendor disks, means for rotating the addendor as a whole in the same direction as the setting up movement, means acting during such rotation to move said locking means to unlocking position, a member for gathering up and aligning the loose disks to thereby position any displaced disks at normal, means for positioning said member in the path of the approaching tooth on each of said disks during such rotation, and means for maintaining said locking means effective and for concomitantly rendering said member ineffective to gather up said disks, during such rotation of said addendor.

22. In a calculating machine, the combination with an addendor including a support and a series of toothed setting up disks rotatably displaceable on said support to set up digits, of means for locking all said addendor disks, means for rotating the addendor as a whole in the same direction as the setting up movement, means acting during such rotation to move said locking means to unlocking position, a mutilated toothed roller for gathering up and aligning the loose disks, said roller normally occupying a position with its mutilated portion adjacent said disks so that they may be freely displaceable, means for partially rotating said roller to position one of its teeth in the path of the approaching tooth of each of said disks during such rotation of the addendor, with provisions for completing the rotation of said roller with the teeth of the addendor and roller intermeshing.

23. In a calculating machine, the combination with an addendor including a support and a series of toothed setting up disks rotatably displaceable on said support to set up digits, of means for locking all said addendor disks, means for rotating the addendor as a whole in the same direction as the setting up movement, means acting during such rotation to move said locking means to unlocking position, a member for gathering up and aligning the loose disks to thereby position any displaced disks at normal, means for positioning said member in the path of the approaching tooth on each of said disks during such rotation of the addendor, and a repeat key for maintaining said locking means effective and for concomitantly rendering said member ineffective to gather up said disks, during such rotation of the addendor.

24. In a calculating machine, the combination with an addendor including a support and a series of toothed setting up disks rotatably displaceable on said support to set up digits, of means for locking all said addendor disks, means for rotating the addendor as a whole in the same direction as the setting up movement, means acting during such rotation to move said locking means to unlocking position, a mutilated toothed roller for gathering up and aligning the loose disks, said roller normally occupying a position with its mutilated portion adjacent said disks so that they may be freely displaceable, means for partially rotating said roller to position one of its teeth in the path of the approaching tooth of each of said disks during such rotation of the addendor, with provisions for completing the rotation of said roller with the teeth of the addendor and roller intermeshing and means for rendering said roller rotating means ineffective at will.

25. In a calculating machine, the combination with an addendor including a support and a plurality of internally toothed setting up disks rotatably displaceable on said support to set up digits, of a locking bar for engaging between the internal teeth of said disks, means for rotating said addendor, and means for moving said bar from locking to unlocking position during said rotation.

26. In a calculating machine, the combination with an addendor including a support and a plurality of internally toothed setting up disks rotatably displaceable on said support to set up digits, of a locking bar for engaging between the internal teeth of said disks, means for rotating said addendor, means for moving said bar from locking to unlocking position during said rotation and a repeat key for rendering ineffective the means for moving said bar to unlocking position.

27. In a calculating machine, the combination with an addendor including a support and a plurality of exterially and internally toothed setting up disks rotatably displaceable on said support to set up digits, of a locking bar for engaging between the internal teeth of said disks, means for rotating said addendor, and means for moving said bar from locking to unlocking position during such rotation, a mutilated toothed roller for gathering up and aligning the loose disks, said roller normally occupying a position with its mutilated portion adjacent said disks so that they may be freely displaceable, means for partially rotating said roller to position one of its teeth in the path of the approaching external tooth of each of said disks when said bar has moved to unlocking position, with provisions for completing the rotation of said roller with the teeth of the addendor and roller intermeshing.

28. In a calculating machine, the combination with an addendor including a support and a plurality of internally toothed setting up disks rotatably displaceable on said support to set up digits, of a locking bar for engaging between the internal teeth of said disks, means for rotating said addendor, and means for moving said bar from locking to unlocking position and again to locking position during said rotation.

29. In a calculating machine, the combination with an addendor including a support and a plurality of internally toothed setting up disks rotatably displaceable on said support to set up digits, of a locking bar for engaging between the internal teeth of said disks, means for rotating said addendor, means for moving said bar from locking to unlocking position during such rotation, and means for rendering said moving means ineffective to move said bar to unlocking position, whereby said disks are held locked during successive rotations of said addendor.

30. In a calculating machine, the combination with an addendor including a support and a plurality of internally toothed setting up disks rotatably displaceable on said support to set up digits, of a locking bar for engaging between the internal teeth of said disks, means for rotating said addendor, a cam track, means connected to said bar for engaging said cam track, a switch for normally moving said means from the inside to the outside of said track to thereby unlock said disks, and means for moving said switch to cause said track-engaging means to follow the inside of said track during a complete rotation of said addendor.

31. In a calculating machine, the combination with an addendor including a support and a plurality of internally toothed setting up disks rotatably displaceable on said support to set up digits, of a locking bar for engaging between the internal teeth of said disks, means for rotating said addendor, a cam track, means operatively related to said bar for engaging said cam track, a switch for normally moving said means from the inside to the outside of said track to thereby unlock said disks and a repeat key for moving said switch to cause said track engaging means to follow the inside of said track during rotation of said addendor.

32. In a calculating machine, the combination with an addendor including a support and a plurality of internally toothed setting up disks rotatably displaceable on said support to set up digits, of a locking bar for engaging between the internal teeth of said disks, means for rotating said addendor, a cam track, means operatively related to said bar for engaging said cam track, a switch for normally moving said means from the inside to the outside of said track to thereby unlock said disks, a mutilated toothed roller for gathering up and aligning the loose disks, said roller normally occupying a position with its mutilated portion adjacent said disks so that they may be freely displaced, means for partially rotating said roller to position one of its teeth in the path of the approaching tooth of each of said disks when said switch has moved said bar from the inside to the outside of said track, and means for moving said switch to cause said track engaging means to follow the inside of said track during rotation of said addendor and for concomitantly rendering said roller rotating means ineffective.

33. In a calculating machine, the combination with digit keys, of an addendor including a series of toothed setting up disks, a series of toothed members, means for rotating any disk an amount depending upon the digital value of an operated key and for bringing the teeth of said disks and members into alignment, means for giving the addendor as a whole a complete rotation and for disaligning the teeth of the disks and members after the set-up is transferred to the toothed members but prior to completion of rotation of the addendor.

34. In a calculating machine, the combination with digit keys, of an addendor including a series of toothed setting up disks, a series of toothed members, means for rotating any disk in an amount depending upon the digital value of an operated key and for bringing the teeth of said disks and members into alignment, means for giving the addendor as a whole a complete rotation and for disaligning the teeth of the disks and members, after the set-up is transferred to the toothed members, and means for positioning any displaced disks at normal after the transfer and during the completion of rotation of the addendor.

35. In a calculating machine, the combination with an addendor including a series of disks having fixed teeth thereon and upon which disks a number may be set up, of a totalizer, and means for giving the addendor a complete rotation in one direction and transferring the number set up thereon to the totalizer through the medium of said teeth during said rotation.

36. In a calculating machine, the combination with an addendor including a series of disks, each disk having teeth on a portion only of its circumference, a series of toothed members with which said disk teeth may engage, the distance apart of the toothed members being greater than the thickness of the toothed portion of any disk, means for individually displacing any disk and positioning the addendor so that teeth of the disks and members align, means for giving to the addendor a complete rotation in the same direction as the displacing movement to thereby engage the teeth on each displaced disk with the teeth of said members, and means for effecting relative movement between the addendor disks and toothed members so that the teeth on said disks move in the spaces between the toothed members when each disk has moved a member with which it is engaged a number of teeth equal to the number of teeth the disk has been displaced.

37. In a calculating machine, the combination with a support, of an addendor movable on said support, said addendor including a sleeve and disks fixed to each end thereof and a plurality of toothed disks on said sleeve and located between said fixed disks and rotatably displaceable to set up digits, means for rotating said addendor as a whole, and means for engaging one of said disks for laterally moving said addendor on its support a distance less than that between the teeth of adjacent disks during such rotation.

38. In a calculating machine, the combination with an addendor including a series of toothed disks independently displaceable to set up a number, of a totalizer, gearing from said totalizer, means for aligning the teeth of the disks and gearing, with provisions for giving to the addendor a complete rotation to transfer the number set up thereon to the totalizer and for disaligning said teeth during such rotation and immediately after the number has been transferred.

39. In a calculating machine, the combination with an addendor including a series of toothed disks independently displaceable to set up a number, of a totalizer, gearing from said totalizer, means for aligning the teeth of the disks and gearing with provisions for giving to the addendor a complete rotation to transfer the number set up thereon to the totalizer, and for shifting the addendor laterally to an extent to disalign said teeth during such rotation and immediately after the number has been transferred.

40. In a calculating machine, the combination with an addendor including a series of disks, each disk having teeth on a portion only of its circumference, a series of toothed members, means for individually displacing any disk and positioning the addendor so that the teeth of the disks and members align, means for giving to the addendor a complete rotation in the same direction as the displacing movement to thereby engage the teeth on each displaced disk with the teeth of said members, and means for disaligning the teeth of said disks and members when each disk has moved a member with which it is engaged a number of teeth equal to the number of teeth the disk has been displaced.

41. In a calculating machine, the combination with a support, of an addendor movable on said support, said addendor including a sleeve and disks fixed to each end thereof, one of said disks having a cam formed in its periphery, said addendor also including a plurality of toothed disks on said sleeve between said fixed disk and rotatably displaceable to set up digits, means for displacing any disk an amount corresponding to the digit of a number set up and for laterally moving said addendor step by step, said moving means including a forked piece embracing said cam disk, means for rotating said addendor as a whole while said cam disk is in engagement with said forked piece whereby said addendor is laterally moved on its support by said cam.

42. In a calculating machine, the combination with a support, of an addendor movable on said support, said addendor including a sleeve and disks fixed to each end thereof, one of said disks having a cam formed in its periphery, said addendor also including a plurality of toothed disks on said sleeve between said fixed disks and rotatably displaced to set up digits, a series of toothed members, means for displacing any disk an amount corresponding to the digit of a number set up and for laterally moving said addendor step by step, the teeth of the disks and members aligning at each position of the addendor, said moving means including a forked piece embracing the periphery of said cam disk, means for rotating said addendor as a whole to transfer the number set up thereon to said members through the medium of said teeth while said cam disk is in engagement with said forked piece whereby said addendor is laterally shifted on its support by said cam to disalign said teeth, said cam on said disk being so located that lateral shifting takes place after the number has been transferred to said toothed members and prior to completion of rotation of the addendor.

43. In a calculating machine, the combination with digit keys, of an addendor including a series of toothed setting up disks, means for holding all of the disks locked at normal position, means for releasing and rotating any disk an amount depending on the digital value of an operated key and for again locking said disk, means for rotating the addendor as a whole to transfer to the latter through the medium of said teeth the set-up on the disks and for unlocking and positioning all of the displaced disks at normal during such rotation.

44. In a calculating machine, the combination with digit keys, of an addendor including a series of toothed setting up disks, means for holding all of the disks locked at normal position, means for releasing and rotating any disk an amount depending on the digital value of an operated key and for again locking said disks, a series of toothed members and means for giving to said addendor as a whole a complete rotation to transfer to the latter through the medium of said teeth the set-up on the disks during said rotation and while said disks remain locked.

45. In a calculating machine, the combination with digit keys, of an addendor including a series of toothed setting up disks, means for holding all of the disks locked at normal position, means for releasing and rotating any disk an amount depending on the digital value of an operated key and for again locking said disks, a series of toothed members, means for giving said addendor as a whole a complete rotation to transfer to the latter through the medium of said teeth and set-up on the disks during said rotation and while said disks remain locked, and means for unlocking and positioning all of the displaced disks at normal during such rotation.

46. In a calculating machine, the combination with digit keys, of an addendor including a series of toothed setting up disks, means for holding all of the disks locked at normal position, means for releasing and rotating any disk an amount depending on the digital value of an operated key and for again locking said disks with provisions for giving the addendor as a whole a complete rotation and transferring to the toothed members through the medium of said teeth the set-up on the disks without unlocking said disks or for so transferring the set-up on said disks to said toothed members while said disks remain locked and for subsequently unlocking and positioning all of the displaced disks at normal during such rotation.

47. In a calculating machine, the combination with an addendor including a support and a series of toothed setting up disks rotatably displaceable on said support to set up digits, of a series of toothed members, and means for rotating the addendor as a whole in the same direction as the setting up movement to transfer to the toothed members through the medium of said teeth the set-up on the disks.

48. In a calculating machine, the combination with an addendor including a support and a series of externally toothed setting up disks rotatably displaceable on said support to set up digits, of a series of toothed members, means for rotating the addendor as a whole in the same direction as the setting up movement to transfer to the toothed members through the medium of said teeth the set-up on the disks, and means acting during such rotation to position any displaced disks at normal.

49. In a calculating machine, the combination with an addendor including a support and a series of toothed setting up disks rotatably displaceable on said support to set up digits, of means for locking all said addendor disks after the set-up is completed, a series of toothed members, means for rotating the addendor as a whole in the same direction as the setting up movement and transferring to said toothed members through the medium of said teeth the set-up on said disks during such rotation and while said disks remain locked, and means acting during such rotation to unlock said disks and to position any displaced disks at normal.

50. In a calculating machine, the combination with an addendor including a series of toothed disks rotatably displaceable to set up a number and a series of toothed members to which the number set up is transferred; of means for locking the disks with the number set up and means for rotating said addendor with the teeth of said disks and members aligned to transfer the set up to said members with provisions for slipping the addendor sideways to disalign said teeth after the number has been transferred and for thereafter unlocking and positioning at normal the displaced disks.

51. In a calculating machine, the combination with an addendor including a series of toothed disks rotatably displaceable to set up a number and a series of toothed members to which the number set up is transferred; of means for locking the disks with the number set up and means for giving to the addendor a complete rotation in the same direction as the displacing movement of the disks to transfer the set-up to said members with provisions for slipping the addendor sidewise to disalign said teeth after the number has been transferred and thereafter unlocking and positioning at normal the displaced disks during such rotation.

52. In a calculating machine, the combination with totalizer wheels, of a series of setting up disks each having a portion of its periphery provided with teeth, a master sector for engaging said teeth to set a disk according to the digit of a number, and means engaged by the same teeth to transfer the said digital value to a totalizer wheel.

53. In a calculating machine, the combination with a series of setting-up disks rotatably displaceable from normal position to set up a number, of means for rotating said disks as an entity in the same direction as the displacing movement, a series of printing members, a totalizer, and means for positioning said printing members in accordance with the set-up and for transferring the set-up to the totalizer in a plus direction or in a minus direction, during such rotation.

54. In a calculating machine, the combination with an addendor, including a series of setting up disks rotatably displaceable from normal position to set up a number, printing mechanism, a totalizer, and carrying mechanism therefor; of trains of mechanism from said addendor to said totalizer and to said printing mechanism to transfer the set up to both, said carrying mechanism acting through one of said trains to carry to higher orders in the totalizer and after said addendor has completed a transfer of the set-up to said totalizer, and means for disconnecting said printing mechanism from its train during the operation of the carrying mechanism.

55. In a calculating machine, the combination with an addendor, including a series of setting up disks rotatably displaceable from normal position to set up a number, printing mechanism, a totalizer, and carrying mechanism therefor, of a set of gears adapted to be turned by said addendor disks, trains of mechanism leading from said set of gears to said totalizer and to said printing mechanism, carrying mechanism acting through said set of gears to said totalizer, and means situated in the train of mechanism leading to said printing mechanism to uncouple the same during the operation of the carrying mechanism.

56. In a calculating machine, the combination with an addendor, including a series of setting up disks rotatably displaceable from normal position to set up a number, a totalizer and printing mechanism, of trains of mechanism leading to said totalizer and to said printing mechanism, means for rotating the addendor to transfer the set up to said totalizer and printing mechanism, means for resetting said printing mechanism and means situated in the train of mechanism leading to said printing mechanism to uncouple the same during said resetting operation.

57. In a calculating machine, the combination with an addendor, including a series of setting up disks rotatably displaceable from normal position to set up a number, a totalizer and printing mechanism including type members, of a set of gears adapted to be turned by said addendor disks, trains of mechanism leading from said set of gears to said totalizer and to said printing mechanism, means for rotating the addendor to transfer the set-up to said totalizer and to the printing mechanism, carrying mechanism acting through said set of gears to said totalizer, means for resetting said type members, and means situated in the train of mechanism leading to said printing mechanism to uncouple the same during said resetting and carrying operations.

58. In a calculating machine, the combination with the addendor, including a series of setting up disks rotatably displaceable to set up a number, a totalizer and carrying mechanism therefor; of means for rotating the addendor as a whole in the same direction as the displacing movement of the disks to transfer the set-up to the totalizer and for disconnecting the addendor and totalizer, and means for operating the carrying mechanism during such rotation and after the transfer of the set up.

59. In a calculating machine, the combination with an addendor, mechanism including a series of setting up disks rotatably displaceable to set up a number, printing mechanism, a totalizer mechanism and carrying mechanism therefor; of trains of gears from said addendor to said totalizer and to said printing and carrying mechanism, and including a set of gears common to the four sets of mechanisms, means for rotating the addendor to transfer the set-up to the totalizer and to the printing mechanism through said common set of gears, and means for disconnecting the addendor and printing mechanism from said common set of gears and operating said carrying mechanism during such rotation of the addendor and after the transfer of the set-up.

60. In a calculating machine, the combination with a totalizer, printing mechanism including type segments and an addendor upon which numbers may be set up; of trains of gearing from said addendor to said totalizer and from said addendor to said printing mechanism including a set of shift gears in the latter train, an operating shaft, and means normally controlled therefrom to rotate said addendor to transfer the set up to said totalizer and printing mechanism, means also controlled from said shaft to reset said type segments and for operating said shift gears to disconnect them from said train during resetting of the type segments.

61. In a calculating machine, the combination with totalizer members, printing mechanism including type segments and an addendor upon which numbers may be set up; of a train of gearing from said addendor to said totalizer and a train from said addendor to said printing mechanism including a set of gears common to both trains, a set of shift gears in the printing mechanism train, an operating shaft, means normally controlled therefrom to rotate said addendor to transfer the set up to said totalizer members and printing mechanism, and to reset said type segments and for operating said shift gears to disconnect them from said train during resetting of the segments, a sub-total key and means set thereby and operated by said shaft for rotating said totalizer members to zero, thereby to set up the total on said type segments and to render ineffective the means controlled by said shaft for operating said shift gears.

62. In a calculating machine, the combination with totalizer members and printing segments entrained therewith, of means effective for driving said totalizer members in one direction only to set up a sub-total on said printing segments, means for printing the sub-total thus set up, and means for driving said segments to thereby re-position said totalizer members.

63. In a calculating machine, the combination with totalizer wheels and driving means therefor, of printing mechanism including reciprocatory type carriers, connections from said driving means to said totalizer wheels and to said type carriers, said latter connections including a shiftable element to couple or uncouple the type carriers from the driving means, resetting means for the type carriers and means for uncoupling them from the driving means during the resetting operation.

64. In a calculating machine, the combination with totalizer wheels and driving means therefor, of printing mechanism including reciprocatory type carriers, connections from said driving means to said totalizer wheels and to said type carriers, said latter connections including a shiftable element to couple or uncouple the type carriers from the driving means, carrying mechanism acting through a portion of said connections to transfer to higher orders in said totalizer wheels, resetting means for the type carriers, and means to uncouple them from the driving means during the carrying operation and during the resetting operation.

65. In a calculating machine, the combination with totalizer wheels, of means for driving said wheels in one direction for addition and in the opposite direction for subtraction, printing mechanism, means for rotating said totalizer wheels in the same direction, to zero, from the positions to which they have been moved either in addition or in subtraction, and connections to thereby set said printing mechanism in accordance with the total on said wheels.

66. In a calculating machine, the combination with totalizer wheels and printing mechanism, of driving means, connections from said driving means to said totalizer wheels and to said printing mechanism normally positioned to turn said wheels in one direction to set up a number on said printing mechanism, and means for changing said connections to reversely drive said totalizer wheels while maintaining the drive to the printing mechanism in the same direction.

67. In a calculating machine, the combination with totalizer wheels and printing mechanism, of driving means, connections from said driving means to said totalizer wheels and to said printing mechanism, said connections settable to drive said totalizer wheels in either direction and the printing mechanism in a constant direction to thereby set up plus or minus items on said totalizer wheel and to set up either class of items on said printing mechanism, and means to set said connections for minus accumulations and to rotate said totalizer wheels, to zero, by movement in a constant direction whether positioned for plus or minus items to thereby set said printing mechanism in accordance with the total standing on said wheels.

68. In a calculating machine, the combination with totalizer wheels and printing mechanism, of driving means, connections from said driving means to said totalizer wheels and to said printing mechanism, said connections settable to drive said totalizer wheels in either direction and the printing mechanism in a constant direction to thereby set up plans or minus items on said totalizer wheel and to set up either class of items on said printing mechanism, a total key and means controlled thereby to set said connections for minus accumulations, and means to rotate said wheels, to zero, by movement in a constant direction whether positioned for plus or minus items to thereby set said printing mechanism in accordance with the total standing on said wheels.

69. In a calculating machine, the combination with totalizer wheels and printing mechanism, of driving means, connections from said driving means to said totalizer wheels, said connections including shiftable means settable to drive the totalizer wheels in either direction to thereby set up plus or minus items, a rocker connected to said shiftable means and an operation disk for positioning said rocker.

70. In a calculating machine, the combination with totalizer wheels and printing mechanism of driving means, connections from said driving means to said totalizer wheels, said connections including shiftable means settable to three positions, to drive said totalizer wheels in a plus direction, in a minus direction, or not to drive them at all, a rocker connected to said shiftable means and a plurality of operation disks each acting to position said rocker in any one of its three positions.

71. In a calculating machine, the combination with totalizer wheels and printing mechanism of driving means, connections from said driving means to said totalizer wheels, said connections including shiftable means settable to three positions, to drive said totalizer wheels in a plus direction, in a minus direction, or not to drive them at all, means normally positioning said shiftable means for plus accumulations, a non-calculate key, and means controlled thereby for positioning said settable means in neutral or non-driving position.

72. In a calculating machine, the combination with totalizer wheels and printing mechanism of driving means, connections from said driving means to said totalizer wheels, said connections including shiftable means settable to three positions, to drive said totalizer wheels in a plus direction, in a minus direction, or not to drive them at all, means normally positioning said shiftable means for plus accumulations, a non-calculate key, and means controlled thereby for positioning said settable means in neutral or non-driving position, a subtraction key, and means controlled thereby for positioning said shiftable means for minus accumulations.

73. In a calculating machine, the combination with totalized wheels and printing mechanism of driving means, connections from said driving means to said totalizer wheels, said connections including shiftable means settable to three positions, to drive said totalizer wheels in a plus direction, in a minus direction, or not to drive them at all, a rocker connected to said shiftable means, a non-calculate key for moving said rocker to neutral position, and a subtraction key for moving said rocker to minus position.

74. In a calculating machine, the combination with totalizer wheels and printing mechanism of driving means, connections from said driving means to said totalizer wheels, said connections including shiftable means settable to three positions, to drive said totalizer wheels in a plus direction, in a minus direction, or not to drive them at all, a rocker connected to said shiftable means, a non-calculate key, a subtraction key and a total key, an operation disk moved by each key, and means controlled by each disk for moving said rocker.

75. In a calculating machine, the combination with totalizer wheels and printing mechanism of driving means, connections from said driving means to said totalizer wheels, said connections including shiftable means settable to drive the totalizer wheels in either direction to thereby set up plus or minus items, a rocker connected to said shiftable means, and a subtraction key for controlling said rocker to position it for minus accumulations.

76. In a calculating machine, the combination with totalizer wheels and printing mechanism of driving means, connections from said driving means to said totalizer wheels, said connections including shiftable means settable to drive the totalizer wheels in either direction to thereby set up plus or minus items, a rocker connected to said shiftable means, means normally positioning said rocker for plus accumulations, and a subtraction key for positioning said rocker for minus accumulations.

77. In a calculating machine, the combination with totalizer wheels and printing mechanism of driving means, connections from said driving means to said totalizer wheels, said connections including shiftable means settable to drive the totalizer wheels in either direction to thereby set up plus or minus items, a rocker connected to said shiftable means, a universal plate normally positioning said rocker for plus accumulations, and a subtraction key for moving said universal plate to ineffective position and positioning said rocker for minus accumulations.

78. In a calculating machine, the combination with totalizer wheels and printing mechanism of driving means, connections from said driving means to said totalizer wheels and to said printing mechanism, said connections including shiftable means settable to drive said totalizer wheels in either direction to thereby set up plus or minus items on said totalizer wheels and to set up either class of items on said printing mechanism, a rocker connected to said shiftable means, a total key for positioning said rocker for minus accumulations, and means to rotate said wheels, to zero, by movement in a constant direction to thereby set said printing mechanism in accordance with the total standing on said wheels.

79. In a calculating machine, the combination with totalizer wheels and printing mechanism of driving means, connections from said driving means to said totalizer wheels and to said printing mechanism, said connections including shiftable means settable to drive said totalizer wheels in either direction to thereby set up plus or minus items on said totalizer wheels and to set up either class of items on said printing mechanism, a rocker connected to said shiftable means, a total key for positioning said rocker for minus accumulations, and means to rotate said wheels to zero by movement in a constant direction to thereby set said printing mechanism in accordance with the total standing on said wheels, a subtraction key and means controlled thereby for also positioning said rocker for minus accumulations and releasing said total key.

80. In a calculating machine, the combination with totalizer wheels and printing mechanism of driving means, connections from said driving means to said totalizer wheels and to said printing mechanism, said connections including shiftable means settable to drive said totalizer wheels in either direction to thereby set up plus or minus items on said totalizer wheels and to set up either class of items on said printing mechanism, a rocker connected to said shiftable means, means normally positioning said rocker for plus accumulations, a total key for positioning said rocker for minus accumulations, and means to rotate said wheels, to zero, by movement in a constant direction to thereby set said printing mechanism in accordance with the total standing on said wheels.

81. In a calculating machine, the combination with totalizer wheels and printing mechanism of driving means, connections from said driving means to said totalizer wheels and to said printing mechanism, said connections including shiftable means settable to drive said totalizer wheels in either direction to thereby set up plus or minus items on said totalizer wheels and to set up either class of items on said printing mechanism, a rocker connected to said shiftable means, a universal plate normally positioning said rocker for plus accumulations, a total key for moving said universal plate to ineffective position and for positioning said rocker for minus accumulations, and means to rotate said wheels to zero by movement in a constant direction to thereby set said printing mechanism in accordance with the total standing on said wheels.

82. In a calculating machine, the combination with totalizer wheels and printing mechanism of driving means, connections from said driving means to said totalizer wheels and to said printing mechanism, said connections including shiftable means settable to drive said totalizer wheels in either direction to thereby set up plus or minus items on said totalizer wheels and to set up either class of items on said printing mechanism, a rocker connected to said shiftable means, a universal plate normally positioning said rocker for plus accumulations, a total key for moving said universal plate to ineffective position and for positioning said rocker for minus accumulations, and means to rotate said wheels to zero by movement in a constant direction to thereby set said printing mechanism in accordance with the total standing on said wheels, a subtraction key, and means controlled thereby for also moving said universal plate to ineffective position for releasing said total key and for maintaining said rocker in position for minus accumulations.

83. In a calculating machine, the combination with a totalizer having toothed wheels arranged adjacent each other and provided with indexed flanges, the flange of each wheel being substantially twice the width of the toothed portion thereof, of means for setting up numbers, and means for transferring the set up to said totalizer to rotate the wheels thereof in one direction or the other, or not to rotate them at all, said transferring means including a series of plus-minus shift gears and co-operating gearing so constructed and arranged that the change in drive is made by shifting said gears as an entity from one plane to another adjacent plane, said gears shiftable to a third adjacent plane to break the chain of drive between the setting up means and the totalizer wheels, the three said planes being included within the space from the toothed portion of one totalizer wheel to that of the next adjacent wheel.

84. In a calculating machine, the combination with a totalizer having toothed wheels arranged adjacent each other and provided with indexed flanges, the flange of each wheel being substantially twice the width of the toothed portion thereof, of means for setting up numbers and means for transferring the set up to said totalizer, including a series of plus-minus shift gears, and gears with which said plus-minus shift gears may engage for turning the totalizer wheels in one direction, other gears with which said plus-minus shift gears may engage to turn the totalizer wheels in the opposite direction, said sets of gears and the plus-minus shift gears so constructed and arranged that the change in drive is made by shifting said plus-minus shift gears from one plane to an adjacent plane, said gears shiftable to a third adjacent plane to break the chain of connection between said setting up means and the totalizer wheels, the three said planes being included within the space from the toothed portion of one totalizer wheel to that of the next adjacent wheel.

85. In a calculating machine, the combination with totalizer wheels, of an addendor including disks upon which a number may be set up, means for moving said addendor in one direction, means cooperating with the addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, and printing mechanism including gearing meshing with said minus gears.

86. In a calculating machine, the combination with totalizer wheels, of an addendor including disks upon which a number may be set up, of means for moving said addendor in one direction, means cooperating with the addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, and carrying mechanism connected to drive said totalizer wheels through said plus gears.

87. In a calculating machine, the combination with totalizer wheels, of an addendor including disks upon which a number may be set up, means for moving said addendor in one direction, means cooperating with said addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels to determine the direction of rotation thereof, printing mechanism including gearing meshing with said minus gears, and carrying mechanism connected to drive said totalizer through said plus gears.

88. In a calculating machine, the combination with totalizer wheels, of an addendor including disks upon which a number may be set up, means for moving said addendor in one direction, means cooperating with said addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, printing mechanism including gearing meshing with said minus gears, carrying mechanism connected to drive said totalizer through said plus gears, and means to disconnect the printing mechanism from the minus gears during the carrying drive.

89. In a calculating machine, the combination with totalizer wheels, of an addendor including disks upon which a number may be set up, means for moving said addendor in one direction, means cooperating with said addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, printing mechanism including gearing meshing with said minus gears, means to engage said plus-minus shift gears with said minus gears, and means for turning said totalizer wheels to zero to thereby position said printing mechanism in accordance with the total on said totalizer wheels.

90. In a calculating machine, the combination with totalizer wheels, of an addendor including disks upon which a number may be set up, means for moving said addendor in one direction, means cooperating with said addendor disks when so moved to transfer the number set up, to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, printing mechanism including gearing meshing with said minus gears, a total key and a sub-total key, means controlled by each of said keys to engage said plus-minus shift gears with said minus gears, and means for turning said totalizer wheels to zero to thereby position said printing mechanism in accordance with the total on said wheels.

91. In a calculating machine, the combination with totalizer wheels, of an addendor including disks upon which a number may be set up, means for moving said addendor in one direction, means cooperating with said addendor disks when so moved to transfer the number set up to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determine the direction of rotation thereof, printing mechanism including gearing meshing with said minus gears, a total key, an operaton disk controlled thereby, a rocker operatively related to said plus-minus shift gears, and means on said disk to shift said rocker to cause said plus-minus shift gears to engage said minus gears, and means for turning said totalizer wheels to zero and thereby through said minus gears to position the printing mechansm in accordance with the total standing on said wheels.

92. In a calculating machine, the combination with totalizer wheels, of an addendor including disks upon which a number may be set up, means for moving said addendor in one direction, means cooperating with said addendor disks when so moved to transfer the number set up to the totalizer, said transferring means including a set of plus gears for engagement with the addendor disks, a set of minus gears constantly in mesh with the plus gears, a set of plus-minus shift gears for engagement with either the plus gears or the minus gears and operatively related to the totalizer wheels, to determne the direction of rotation thereof, printing mechanism including gearing meshing with said minus gears, a total key and a sub-total key, an operation disk controlled by each key, a rocker operatively related to said plus-minus shift gears, means on each of said disks for moving said rocker to cause said plus-minus shift gears to engage said minus gears, and means for turning said totalizer wheels to zero and thereby through said minus gears to position the printing mechanism in accordance with the total standing on said wheels.

93. In a calculating machine, the combination with a totalizer and printing mechanism, and driving means therefor, of a set of rockers, and means for selectively operating said rockers to determine how said driving means shall affect said totalizer and separately affect said printing mechanism.

94. In a calculating machine, the combination with a totalizer and driving means therefor, of a set of rockers, a series of operation discs, means on each disc for operating said rockers singly or in various combinations to determine how said driving means shall affect said totalizer.

95. In a calculating machine, the combination with a totalizer and driving means therefor, of a set of rockers, each having arms extending in opposite directions from its pivotal support, adjacent pivotally extending arms being offset, a pair of operation discs, one disk of each pair situated in the plane of one rocker arm and the other disc in the plane of an oppositely extending arm, and cams on the discs to cooperate with said rocker arms to set said rockers to determine how said driving means shall affect said totalizer.

96. In a calculating machine, the combination with a totalizer and driving means therefor, of a set of rockers, each having a series of arms extending in opposite directions from its pivotal support, adjacent oppositely extending arms being offset, a pair of operation discs, one disc of each pair situated in the plane of one rocker arm and the other disc in the plane of an oppositely extending arm, the said rockers arranged about the periphery of said discs, and cams on the discs to cooperate with a plurality of rockers concomitantly to set them singly or in various combinations to determine how said driving means shall affect said totalizer.

97. In a calculating machine, the combination with a totalizer and driving means therefor, of a set of rockers, each having a series of arms extending in opposite directions from its pivotal support, adjacent oppositely extending arms being offset, a plurality of pairs of operation discs, one disc of each pair situated in the plane of one rocker arm and the other disc in the plane of an oppositely extending arm, the said rockers arranged about the periphery of said discs, cams on the discs to cooperate with a plurality of rockers concomitantly to set them singly or in various combinations to determine how said driving means shall affect said totalizer, and a plurality of special keys each connected to move a pair of operation discs.

98. In a calculating machine, the combination with a totalizer, of an addendor including a series of disks relatively displaceable to set up a number, means for locking the disks in set-up positions, means for giving the addendor as a whole a complete rotation to transfer the number set up, to the totalizer, means for moving said locking means to unlock the addendor disks and for positioning any displaced disk at normal during such rotation, and a repeat key for rendering ineffective said moving and positioning means to thereby transfer the number a plurality of times to said totalizer.

99. In a calculating machine, the combination with a totalizer, of an addendor including a series of disks relatively displaceable to set up a number, means for locking the disks in set-up positions, means for giving the addendor as a whole a complete rotation to transfer the number set up, to the totalizer, means for moving said locking means to unlocking position to release the addendor disks, means for positioning any displaced disk at normal during such rotation, a rocker controlling both said moving means and said positioning means and when in one position rendering both means effective and when in a second position rendering both means ineffective, and a repeat key for moving said rocker to the second said position.

100. In a calculating machine, the combination with a totalizer, of an addendor including a series of disks relatively displaceable to set up a number, means for locking the disks in set-up positions, means for giving the addendor as a whole a complete rotation to transfer the number set up to the totalizer, means for moving said locking means to unlocking position to release the addendor disks, means for positioning any displaced disk at normal during such rotation, a rocker controlling both said moving means and said positioning means and when in one position rendering both means effective and when in a second position rendering both means ineffective, a normalizer key for moving said rocker to said first position, and a repeat key for moving it to said second position.

101. In a calculating machine, the combination with a totalizer, of an addendor including a series of disks relatively displaceable to set up a number, means for locking the disks in set-up positions, means for giving the addendor as a whole a complete rotation to transfer the numbers set up to the totalizer, means for moving said locking means to unlocking position to release the addendor disks, means for positioning any displaced disk at normal during such rotation, a rocker controlling both said moving means and said positioning means and when in one position rendering both means effective and when in a second position rendering both means ineffective, a subtraction key for moving said rocker to said first position, and a repeat key for moving it to said second position.

102. In a caluculating machine, the combination with a totalizer, of an addendor including a series of disks relatively displaceable to set up a number, means for locking the disks in set-up positions, means for giving the addendor as a whole a complete rotation to transfer the numbers set up to the totalizer, means for moving said locking means to unlocking position to release the addendor disks, means for positioning any displaced disk at normal during such rotation, a rocker controlling both said moving means and said positioning means and when in one position rendering both means effective and when in a second position rendering both means ineffective, an error key for moving said rocker to said first position and a repeat key for moving it to said second position.

103. In a calculating machine, the combination with digit keys, of an addendor including a series of setting up disks, means for successively bringing a disk under control of a key by a lateral stepping movement of the addendor, a totalizer, means for locking the disks in set-up positions, means for giving the addendor as a whole a rotation to transfer the set-up to the totalizer, means for moving said locking means to unlock the totalizer disks after the transfer, means for positioning any displaced disk at normal during such rotation, means for returning the addendor laterally to normal position, a rocker controlling all three of the last mentioned means and when in one position rendering all effective and when in a second position rendering all ineffective, and means for moving said rocker to either of its two positions.

104. In a calculating machine, the combination with digit keys, of an addendor, including a series of setting up discs, means for successively bringing a disc under control of a key by a lateral stepping movement of the addendor, a totalizer and printing mechanism, means for locking the discs in set-up positions, means for giving the addendor as a whole a rotation to transfer the set-up to the totalizer and to said printing mechanism, means for moving said locking means to unlock the totalizer discs after the transfer, means for positioning any displaced disc at normal during such rotation, means for returning the addendor laterally to normal position, and a total key and a sub-total key for controlling said totalizer for printing a total, and means also controlled by either key for rendering said addendor return means ineffective.

105. In a calculating machine, the combination with totalizer wheels and printing mechanism including type carriers, of means for driving said wheels and positioning said type carriers to accumulate and print items, means for rotating said wheels to zero to thereby set up a total on the type carriers; said rotating means including a gear sector, a follower and a cam; a rocker for positioning said follower in operative or inoperative relation to said cam, total and sub-total keys, and connections whereby each key may cause said rocker to be actuated.

106. In a calculating machine, the combination with setting up disks, of a totalizer and printing mechanism, means acting in normal position of the machine to transfer the number set up on said disks to the totalizer, to actuate the printing mechanism to print the number, and to return said disks to normal, and an error key for rendering said transferring and printing means ineffective.

107. In a calculating machine, the combination with setting-up disks, of a totalizer and printing mechanism, means for transferring the set-up on the disks to said totalizer, said transferring means including a connection shiftable to connect or disconnect said totalizer and the disks, type carriers also positioned from said setting-up disks, means for printing from said type carriers, and an error key for moving said shiftable connection to ineffective position and for preventing printing.

108. In a calculating machine, the combination with a totalizer, of mechanism upon which a multiplicand may be set, means for repeatedly transferring the multiplicand to the totalizer to obtain a product, a counter automatically operated during such transfer to indicate the multiplier, printing mechanism common to the totalizer and counter, means for bringing either into cooperative relation therewith to print the total therefrom.

109. In a calculating machine, the combination with printing mechanism of a carriage movable in relation thereto and supporting a totalizer and a counter, means for running numbers repeatedly into the totalizer and automatically actuating the counter to indicate the number of times a number has been run into the totalizer, means for positioning the carriage to bring the totalizer or the counter into cooperation with the printing mechanism and means for extracting a total from either when so positioned.

110. In a calculating machine, the combination with devices upon which the multiplicand may be set, of a totalizer to which the multiplicand may be repeatedly transferred to obtain a product, a counter automatically actuated during such transfer to indicate the multiplier, printing mechanism including a single set of type carriers and means for printing the multiplicand, the multiplier and the product from said type carriers.

111. In a calculating machine, the combination with a totalizer of means for setting up numbers, means for repeatedly transferring the numbers set up to the totalizer in one direction for multiplication and in the reverse direction for division, a counter for indicating the number of times the number is so transferred, and means for actuating the counter in a constant direction whether the totalizer is being actuated for multiplication or for division.

112. In a calculating machine, the combination with a totalizer, of means for setting up numbers, means for repeatedly transferring the numbers set up to the totalizer in one direction for multiplication and in the reverse direction for division, a counter for indicating the number of times the number is so transferred, means for actuating the counter in a constant direction whether the totalizer is being actuated for multiplication or for division printing mechanism including type carriers, means for moving said type carriers in a constant direction to set up a number, and means for controlling the amount of movement of said type carriers from the counter to print the multiplier in multiplication and the quotient in division.

113. In a calculating machine, the combination with a totalizer, of means for setting up numbers, means for repeatedly transferring a number set up to the totalizer in one direction for multiplication and in the reverse direction for division, a counter for indicating the number of times the number is so transferred, means for actuating the counter in a constant direction whether the totalizer is being actuated for multiplication or for division, printing mechanism including type carriers, means for bringing the counter into cooperative relation with the type carriers and for resetting the wheels of the counter to thereby position the type carriers to print the total standing on the counter, said total representing a multiplier in multiplication and a quotient in division.

114. In a calculating machine, the combination with a totalizer, of means for setting up a number, means for driving the totalizer to repeatedly add the set-up to the totalizer to perform multiplication and means controlled from the driving means to set the machine for multiplication.

115. In a calculating machine, the combination with a totalizer upon which a dividend may be set, means for setting up a divisor, means for driving the totalizer to repeatedly subtract the set-up from the totalizer to perform division and means controlled from the driving means to set the machine for division.

116. In a calculating machine, the combination with a totalizer upon which numbers may be set, of devices for setting up numbers, means for driving the totalizer to repeatedly add the number set up or to repeatedly subtract the same from the totalizer to perform multiplication or division and means controlled from the driving means to set the machine for either multiplication or for division.

117. In a calculating machine, the combination with a totalizer and printing mechanism, devices upon which different numbers may be set to be added to the totalizer and printed by the printing mechanism, of a muldiv lever, and means controlled thereby to disable the printing mechanism and to cause a single number to be repeatedly added to or subtracted from the totalizer to perform multiplication or division.

118. In a calculating machine, the combination with a totalizer, means for setting up a number, means for driving the totalizer to repeatedly add the set-up thereto to perform multiplication, said driving means including a reciprocatory muldiv lever movable from normal position to a plurality of different positions to determine how far said totalizer shall be driven at each reciprocation, means controlled by said lever at its initial movement from normal to set the machine for multiplication.

119. In a calculating machine, the combination with a totalizer, means for setting up a number, means for driving the totalizer to repeatedly add the set-up thereto to perform multiplication, said driving means including a reciprocatory muldiv lever, a scale graduated from zero to nine to indicate the different positions to which said lever is to be moved for driving the totalizer different amounts for the digits of the multiplier, said lever driving the totalizer on its down stroke and means controlled by said lever in its initial movement from normal to set the machine for multiplication.

120. In a calculating machine, the combination with a totalizer on which a dividend may be set, of means for setting up a number, means for driving the totalizer to repeatedly subtract the number set up from the totalizer to perform division, said driving means including a reciprocatory muldiv lever movable from normal position to an extreme position to set the machine for division and movable to various positions between extreme positions and normal to drive the totalizer.

121. In a calculating machine, the combination with a totalizer, of means for setting up a number, means for driving the totalizer to repeatedly add the number to or subtract it from the totalizer to perform multiplication or division, said driving means including a reciprocatory muldiv lever, a scale graduated from zero to nine to indicate different positions of said lever for driving the totalizer different amounts for the digits of the multiplier in multiplication, said lever setting the machine for multiplication by initial movement from normal and for division by movement beyond the nine position of said scale, said lever driving the totalizer on movement toward normal.

122. In a calculating machine, the combination with a totalizer, of devices upon which a number may be set, means for normally actuating the machine to add the number set up, to the totalizer, multiplying mechanism, including a muldiv lever, means controlled thereby on movement from normal position to set the machine for multiplication, means actuated thereby on return to normal position to repeatedly add the set up to the totalizer to obtain a product, and means actuated on movement of said lever beyond normal position to change the denominational relation of the totalizer and setting up devices.

123. In a calculating machine, the combination with devices upon which a number may be set, of a totalizer movable step by step to change its denominational relation with respect to said setting up devices, means for performing multiplication or division including a muldiv lever, said lever acting to repeatedly add the number set up or to repeatedly subtract it from the totalizer, and means controlled by said lever for feeding the totalizer to the right in multiplication and to the left in division.

124. In a calculating machine, the combination with a totalizer upon which a dividend may be set, of devices upon which a divisor may be set, a muldiv lever, driving connections from said lever to said setting up devices, and means controlled by said lever on repeated reciprocations thereof to repeatedly subtract the divisor from the dividend, and means for automatically breaking the drive to said setting up devices at the completion of the division operation.

125. In a calculating machine, the combination with a totalizer, of a muldiv lever, means to set the machine for either multiplication or division by moving said lever to different positions from normal, driving means for said totalizer, connections from said lever to said driving means to actuate the totalizer for multiplication or for division, means to disconnect said lever and driving connections automatically at the completion of a division operation, and means for automatically re-connecting said driving lever and mechanism on movement of said lever beyond normal.

126. In a calculating machine, the combination with devices upon which a divisor may be set, of a totalizer upon which a dividend may be set, said totalizer movable step by step to change its denominational relation with respect to said setting up devices, a muldiv lever, means to set the machine for division by said lever, driving means for said setting up devices to repeatedly subtract the divisor from the dividend standing on the totalizer, connections from said muldiv lever to said driving means, means controlled by said lever to feed the totalizer step by step to align different denominations thereof with the different orders of the setting up devices and means controlled by said totalizer in moving the next step from where its units wheel is aligned with the units order of said setting up devices, for disconnecting said lever from said driving means.

127. In a calculating machine, the combination with a totalizer upon which a dividend may be set, means to perform division by repeatedly subtracting a divisor from said dividend including a muldiv lever, driving connections from said lever to said totalizer, and means for breaking said connections on completion of a division operation.

128. In a calculating machine, the combination with a carriage, of a totalizer mounted therein and movable to different denominational positions, means to set the machine for multiplication, and means operated thereby to limit the movement of the carriage to a definite zone.

129. In a calculating machine, the combination with a carriage, of a totalizer mounted therein and movable step by step to different denominational positions, devices upon which a number may be set to represent a multiplicand, a muldiv lever, means controlled thereby to set the machine for multiplication, means actuated by said lever to repeatedly add the multiplicand to the totalizer and to feed the carriage step by step, a zone lock for limiting movement of the carriage, and means for rendering said lock effective by said lever.

130. In a calculating machine, the combination with a carriage and a totalizer therein upon which a dividend may be set, of means for driving said totalizer to repeatedly subtract therefrom a number representing the divisor, mechanism for carrying from order to order in the totalizer, and means independent of the carriage movement brought into action when the highest wheel passes from 0 to 9 to change the machine from subtraction to addition and to arrest the driving means, and means to render said arresting means ineffective on again setting the machine for subtraction.

131. In a calculating machine, the combination with a totalizer upon which a dividend may be set, said totalizer movable step by step to change its denominational position, devices upon which a divisor may be set, a muldiv lever, connections therefrom to set the machine for division and to operate said devices to repeatedly subtract the divisor from the dividend beginning at the highest order thereof, mechanism for carrying from order to order in the totalizer, means for changing the machine from subtraction to addition when the highest wheel of the totalizer passes from 0 to 9 and for arresting the muldiv lever, and means controlled from said lever on movement from arrested positions for feeding the carriage, and re-setting the machine to subtraction.

132. In a calculating machine, the combination with a totalizer upon which a dividend may be set, said totalizer movable step by step to change its denominational position, devices upon which a divisor may be set, driving means for repeatedly subtracting the divisor from the dividend beginning in the highest order thereof, mechanism for carrying from order to order in the totalizer, means set under control of the highest numeral wheel on passing from 0 to 9 and operated by power from said muldiv lever for changing the machine from subtraction to addition and for arresting the muldiv lever, and means for feeding the carriage on movement of said lever backwardly from arrested position.

133. In a calculating machine, the combination with a totalizer upon which numbers may be repeatedly added to or subtracted from to perform multiplication or division, a muldiv lever movable from normal position to an extreme position, means to set the machine for multiplication by an initial movement of said lever from normal position, and for division on movement to its extreme position.

134. In a calculating machine, the combination with a totalizer upon which numbers may be repeatedly added to or subtracted from to perform multiplication or division, a muldiv lever movable from normal position to an extreme position, means to set the machine for multiplication by an initial movement of said lever from normal position, and for division on movement to its extreme position, and means actuated by said lever during return from its extreme position to drive said totalizer for either multiplication or for division.

135. In a calculating machine, the combination with a laterally movable carriage, a totalizer and a counter carried thereby, of separate actuating mechanisms for the totalizer and for the counter, and means for preventing the totalizer from being actuated with the carriage positioned to bring the totalizer in the zone of the counter actuating mechanism.

136. In a calculating machine, the combination with a laterally movable carriage, a totalizer and a counter carried thereby, of separate actuating mechanisms for the totalizer and for the counter, a locking bail engaging the wheels of the totalizer, a locking bail engaging the wheels of the counter, means to release both bails with the carriage positioned to bring the totalizer and counter in the zone of their respective actuating mechanisms, the releasing means for the counter bail being so constructed as to be ineffective to release the totalizer bail.

137. In a calculating machine, the combination with a laterally movable carriage, a totalizer and a counter carried thereby, printing mechanism into co-operation with which either the counter or the totalizer may be brought by lateral movement of the carriage to enable a total to be extracted from either, actuating mechanism for the counter, means for locking the wheels of the counter and of the totalizer, means for releasing the totalizer locking means when the totalizer is coordinated with the printing mechanism, means for releasing the counter locking means when the counter is in the zone of its actuating mechanism, said totalizer releasing means effective to also release the counter wheel lock when the counter is coordinated with the printing mechanism.

138. In a calculating machine, the combination with a laterally movable carriage, a totalizer and a counter carried thereby, printing mechanism into co-operation with which either the counter or the totalizer may be brought by lateral movement of the carriage to enable a total to be extracted from either, actuating mechanism for the counter, means for locking the wheels of the counter and of the totalizer, means for releasing the totalizer locking means when the totalizer is coordinated with the printing mechanism, means for releasing the counter locking means when the counter is in the zone of its actuating mechanism, said totalizer releasing means effective to also release the counter wheel lock when the counter is coordinated with the printing mechanism, said counter releasing means being ineffective to release the totalizer locking means with the carriage positioned to bring the totalizer into the zone of the counter actuating mechanism.

139. In a calculating machine, the combination with a totalizer and carrying mechanism therefor, of driving means for operating the carrying mechanism, type carriers entrained with said totalizer, means controlled from said driving means for operating the totalizer to set up a total on said type carriers, and means for rendering the carrying mechanism ineffective during such total taking operations.

140. In a calculating machine, the combination with a totalizer and carrying mechanism therefor, of driving means including a cycler shaft for operating the carrying mechanism, type carriers entrained with said totalizer to set a total on said type carriers, and means for rendering ineffective the connection from the cycler shaft to the carrying mechanism during total taking operations.

141. In a calculating machine, in combination, a totalizer and type carriers, of means to drive the totalizer to transfer a total standing thereon, to the type carriers, means to set the driving means including a rocker and cam followers connected thereto, a cam shaft, cams thereon for operating said followers, said rocker when in one position rendering said cams effective on said followers and when in another position rendering them ineffective, a total key and means controlled thereby for moving said rocker to render the cams effective.

142. In a calculating machine, the combination with a totalizer and type carriers, of an addendor including a plurality of disks displaceable to set up numbers, said addendor laterally movable step by step during the setup, a cycler shaft, a carry drum and a cam shaft which may be driven thereby, carrying mechanism, connections from the carry drum to the carrying mechanism and to the addendor, and connections from the cam shaft for returning the addendor laterally to normal position, a shiftable connection from the cycler shaft to the carry drum and cam shaft, said connection capable of occupying the three positions (1) to connect the cycler shaft and carry drum only (2) to connect the carry drum with both the carry drum and cam shaft, and (3) to connect the cycler shaft and cam shaft only, a cycler rocker controlling said connection to position it as aforesaid, means normally maintaining said rocker at (2) position, a totalizing mechanism, and means controlled thereby for moving said rocker to (3) position whereby the carry mechanism is rendered ineffective during total-taking operations.

143. In a machine according to claim 142, in combination, universal plates normally maintaining said cycler rocker at (2) position, a total key and a sub-total key, and means controlled thereby for moving said universal plates to release the rocker and for setting it at (3) position when so released.

144. In a machine according to claim 142, in combination, a muldiv lever and means controlled thereby to set said rocker to (1) position to thereby silence the cam shaft during multiplication.

145. In a machine according to claim 142, in combination, universal plates normally maintaining said cycler rocker at its (2) position a muldiv lever, and means controlled thereby for moving said universal plates to release said rocker and to set it in (1) position to thereby silence the cam shaft during multiplication.

146. In a calculating machine, the combination with devices upon which a multiplicand may be set and visibly indicated, a totalizer to which the number set up may be repeatedly transferred to obtain and indicate a product, a counter for visibly indicating the multiplier, all of said factors being visible at the end of the multiplying operation, printing mechanism and means for operating said mechanism to print each factor.

147. In a calculating machine, the combination with devices upon which a multiplicand may be set and visibly indicated, a totalizer to which the number set up may be repeatedly transferred to obtain and indicate a product, a counter for visibly indicating the multiplier, all of said factors being visible at the end of the multiplying operation, printing mechanism with provisions for coordinating the setting-up devices, the totalizer and the counter with said printing mechanism to print the factors.

148. In a calculating machine, the combination with devices upon which a divisor may be set and visibly indicated, a totalizer upon which the dividend may be set, with provisions for repeatedly subtracting the divisor from the dividend to obtain a remainder, a counter for visibly indicating the quotient, said divisor, quotient and remainder, if any, being visible at the completion of the division operation.

149. In a calculating machine, the combination with devices upon which a divisor may be set and visibly indicated, a totalizer upon which the dividend may be set, with provisions for repeatedly subtracting the divisor from the dividend, a counter for visibly indicating the quotient, said divisor, quotient and remainder, if any, being visible at the completion of the division operation, printing mechanism, and means for operating said mechanism to print said factors.

150. In a calculating machine, the combination with devices upon which a divisor may be set and visibly indicated, a totalizer upon which the dividend may be set, with provisions for repeatedly subtracting the divisor from the dividend, a counter for visibly indicating the quotient; said divisor, quotient and remainder, if any, being visible at the completion of the division operation, printing mechanism with provisions for co-ordinating the setting-up devices, the totalizer and the counter with said printing mechanism to print said factors.

151. In a calculating machine, the combination with a totalizer and type carriers and driving means therefor, of a plurality of rockers, connections therefrom to control the various operations of the machine, universal plates normally setting said rockers for addition, a series of special keys and means controlled thereby for moving the universal plates to release the rockers set thereby and for setting appropriate rockers to perform different functions, depending upon the special key operated.

152. In a calculating machine, the combination with a totalizer and printing mechanism, of a set of rockers to determine how said totalizer and printing mechanism shall function, a set of special keys, means controlled thereby for variously positioning the rockers to thereby determine the various functions to be performed, said keys operable singly and in varying combinations, and means co-operating with said rockers for preventing detrimental or useless combinations of keys.

153. In a calculating machine, the combination with a totalizer and printing mechanism, of a set of rockers to determine how said totalizer and printing mechanism shall function, a set of special keys, a pair of operation disks moved by each key, cams on the disks for variously positioning certain rockers to set them to determine the desired function, the cams on some of said disks operable to move the same rocker in opposite directions to thereby prevent simultaneous operation of one or more keys, to thereby prevent detrimental or useless combinations of keys.

154. In a calculating machine, the combination with a totalizer and printing mechanism and carrying mechanism for the totalizer, of means for controlling the totalizer to set up the total on the printing mechanism and to operate the carrying mechanism, and a total key to render operation of the carrying mechanism from said means ineffective.

155. In a calculating machine, the combination with a totalizer upon which a dividend may be set, of devices upon which a divisor may be set, means for repeatedly transferring the divisor to the totalizer in a subtracting direction to obtain a remainder, a counter actuated during such transferring operations to indicate a quotient, a single set of type carriers, and means controlling the positioning of said carriers from the totalizer or said counter.

156. In a calculating machine, the combination with a totalizer upon which a dividend may be set, of devices upon which a divisor may be set, means for repeatedly transferring the divisor to the totalizer in a subtracting direction to obtain a remainder, a counter, means for actuating the counter in adding direction during such transferring operations, a set of type carriers movable in a constant direction to set up a number to be printed, and means controlling the positioning of said carriers from said counter.

157. In a calculating machine, the combination with a totalizer upon which a dividend may be set, of devices upon which a divisor may be set, means for repeatedly transferring the divisor to the totalizer in a subtracting direction to obtain a remainder, a counter, means for actuating the counter in adding direction during such transferring operations, a set of type carriers movable in a constant direction to set up a number to be printed, and means for controlling the positioning of such type carriers from the totalizer or said counter.

158. In a calculating machine, the combination with a totalizer upon which a dividend may be set, of devices upon which a divisor may be set, means for repeatedly transferring the divisor to the totalizer in a subtracting direction to obtain a remainder, a counter actuated during such transferring operations to indicate the quotient, a single set of type carriers, means controlling the positioning of said type carriers by the counter to print the quotient and by the divisor setting up means to print the divisor.

159. In a calculating machine, the combination with a totalizer upon which a dividend may be set, of devices upon which a divisor may be set, means for repeatedly transferring the divisor to the totalizer in a subtracting direction to obtain a remainder, a counter actuated in an adding direction during such transferring operations for indicating a quotient, a single set of type carriers, means for moving said type carriers in a constant direction to set up a number, and means controlling the positioning of said type carriers by the counter to print the quotient or by the divisor setting up means to print the divisor.

160. In a calculating machine, the combination with a totalizer upon which a dividend may be set, means for repeatedly transferring the divisor to the totalizer in a subtracting direction to obtain a remainder, a counter actuated in an adding direction during such transferring operations for indicating a quotient, a single set of type carriers, means for moving said type carriers in a constant direction to set up a number, and means for controlling the positioning of said type carriers by the counter to print the quotient, by the divisor to print the divisor and by the totalizer to print the remainder.

161. In a calculating machine, the combination with a totalizer, of devices upon which a number may be set, said devices normally transferring the number to the totalizer and restoring the setting up devices during such transfer, multiplying mechanism including a muldiv lever, means set thereby to prevent restoration of said setting up devices and means actuated thereby for causing the set up to be transferred repeatedly to the totalizer to obtain a product.

162. In a calculating machine, the combination with a totalizer, of devices upon which a number may be set, multiplying mechanism including a muldiv lever, means controlled thereby on movement from normal position to set the machine for multiplication, and means actuated thereby on return to normal position to repeatedly add the set up to the totalizer to obtain a product.

163. In a calculating machine, the combination with a totalizer, of means for setting up numbers means for repeatedly transferring the numbers set up to the totalizer, in one direction for multiplication and in the reverse direction for division, a counter for indicating the number of times the number is so transferred, means for actuating the counter in a constant direction whether the totalizer is being actuated for multiplication or for division, printing mechanism common to the totalizer and counter and means for bringing either the counter or the totalizer into cooperative relation with said printing mechanism and automatically obtaining a set up on the printing mechanism of the amount standing on either the counter or the totalizer.

164. In a calculating machine, the combination with a carriage, a totalizer therein, upon which a dividend may be set, means for driving the totalizer to repeatedly subtract therefrom a number representing the divisor, mechanism for carrying from order to order in the totalizer, and means independent of the carriage movement brought into action when the highest wheel passes from zero to nine in an overdraft, to change the machine from subtraction to addition, add in the overdraft and arrest the driving means; and means to render the arresting means ineffective on again resetting the machine for subtraction.

165. In a calculating machine, the combination with a carriage, a totalizer therein upon which a dividend may be set, means for driving the totalizer, settable means for determining the direction of drive, means for carrying from order to order in the totalizer, means independent of the carriage brought into action when the highest wheel passes from zero to nine in an overdraft to change the settable means from subtraction to addition, add in the overdraft and arrest the driving means, and means to render the arresting means ineffective and to again move the settable means to subtracting position.

166. In a calculating machine the combination with a carriage and a totalizer therein upon which a dividend may be set, of means for driving the totalizer to repeatedly subtract therefrom a number representing the divisor, mechanism for carrying from order to order in the totalizer, and means independent of the carriage movement brought into action when the highest wheel passes from zero to nine in an over-draft, to arrest the driving means, and means for releasing the arresting means by the driving means.

167. In a calculating machine the combination with a carriage and a totalizer therein upon which a dividend may be set, of means for driving the totalizer to repeatedly subtract therefrom a number representing the divisor, mechanism for carrying from order to order in the totalizer, means independent of the carriage movement brought into action when the highest wheel passes from zero to nine in an over-draft, to arrest the driving means, and means for releasing the arresting means by a reverse movement of the driving means.

168. In a calculating machine, the combination with a carriage and a totalizer therein upon which a dividend may be set, of means for driving the totalizer to repeatedly subtract therefrom a number representing the divisor, carrying mechanism for the totalizer, and means independent of the carriage movement brought into action when the highest wheel passes from zero to nine to change the machine from subtraction to addition and to arrest the driving means.

169. In a calculating machine the combination with a carriage and a totalizer therein upon which a dividend may be set, said carriage movable step by step to change the denominational position of the totalizer, devices upon which a divisor may be set, driving means for repeatedly subtracting the divisor from the dividend beginning in the highest order thereof, mechanism for carrying from order to order in the totalizer, means independent of the carriage movement for changing the machine from subtraction to addition when the highest wheel of the totalizer passes from zero to nine and for arresting the driving means, and means for concomitantly feeding the carriage one step and setting the machine for subtraction.

170. In a calculating machine, the combination with a carriage and a totalizer therein upon which a dividend may be set said carriage movable step by step to change the denominational position of the totalizer, devices upon which a divisor may be set, means for repeatedly subtracting the divisor from the dividend beginning in the highest order thereof, mechanism for carrying from order to order in the totalizer, and means independent of the carriage movement and set under control of the highest numeral wheel on passing from zero to nine and operated by power from the driving means for changing the machine from subtraction to addition.

171. In a calculating machine, the combination with a totalizer upon which a dividend may be set and division performed by subtracting from and adding to the amount on the totalizer a number corresponding to the divisor; of driving means for the totalizer, shiftable connections for determining the direction of drive of the totalizer, means for setting said connections for subtraction and means controlled by a totalizer wheel in passing from zero to nine and operated by the driving means to set said connections for addition.

172. In a calculating machine, the combination with a totalizer upon which a dividend may be set and division performed by subtracting from and adding to the amount on the totalizer a number corresponding to the divisor; of driving means for the totalizer, shiftable connections for determining the direction of drive of the totalizer, means for setting said connections for subtraction and means controlled by a totalizer wheel in passing from zero to nine and operated by the driving means to set said connections for addition, and arrest the driving means.

173. In a calculating machine, the combination with a totalizer, of driving means therefor, an operative means and connections therefrom for controlling said driving means for adding separate items into said totalizer, and separate operative means and connections therefrom to said driving means with provisions whereby said driving means may be repeatedly operated on a single operation of said separate operative means.

174. In a calculating machine, the combination with a setting up disk, of a power bail for operating said disk to set up a digit, a key for storing power in said bail during the down stroke of said key and concomitantly determining how far said disk shall be turned by said power bail, the latter acting to turn said disk during the return stroke of said key.

175. In a calculating machine, the combination with a totalizer and type carriers; of devices upon which a number may be set, means for operating said devices to normally transfer the set up to said totalizer and to said type carriers and to restore said devices to normal position during such transfer, means for preventing restoration of said setting up devices and for preventing transfer of the number to the totalizer, but permitting the transfer of the set up to the type carriers and to retain the same in the setting up devices.

176. In a calculating machine, the combination with a totalizer and type carriers and means for printing therefrom; of devices upon which a number may be set, means for operating said devices to normally transfer the set up to said totalizer and to said type carriers, to restore said devices to normal position during such transfer and to effect printing from said type carriers; means for preventing restoration of said setting up devices and the transfer of the number to the totalizer, but permitting transfer of the set up to the type carriers and printing of the same, and means for actuating said transferring means to repeatedly transfer the retained set up to the totalizer, and to prevent printing during such repeated transfer.

177. In a calculating machine, the combination with a totalizer and type carriers and means for printing therefrom; of devices upon which a number may be set, means for operating said devices to normally transfer the set up to the totalizer and to the type carriers and to restore said devices to normal position during the transfer and effect printing of the number, means for preventing restoration of said setting up devices and the transfer of the number to the totalizer, but permitting the transfer of the set up to the type carriers and the printing of the same, means for actuating said transferring means to repeatedly transfer the retained set up to the totalizer to obtain a product, means to prevent printing during such repeated transfer, a counter automatically actuated during repeated transfer of the number to the totalizer, and means for coordinating said counter and type carriers to position the latter by the former.

178. In a calculating machine, the combination with a totalizer and type carriers and means for printing therefrom; of devices upon which a number may be set, means for operating said devices to normally transfer the number to the totalizer and to the type carriers and to restore said devices to normal position during said transfer and effect printing from the type carriers, multiplying mechanism including a muldiv lever, means set thereby to prevent printing and to prevent restoration of said setting up devices, and means actuated thereby for causing the set up to be repeatedly transferred to said totalizer to obtain a product.

179. In a multiplying machine, the combination with a totalizer, of printing mechanism for setting up a multiplicand and repeatedly entering it in the totalizer to obtain a product and disabling the printing mechanism, and means to re-enable said printing mechanism and control the latter to print the multiplicand after the completion of the multiplication operation.

Signed at Chicago, Illinois, this 13th day of August, 1923.

HYMAN GOLBER.

CERTIFICATE OF CORRECTION.

Patent No. 1,774,367.  Granted August 26, 1930, to

HYMAN GOLBER.

It is hereby certified that error appears in the printed specification of the above numbered patent requiring correction as follows: Page 3, lines 65 and 66, for "perspective" read perspectives; page 5, line 105, for "11" read 11a; page 10, line 66, for "came" read cam; page 11, line 102, for "plus-" read plus-minus; page 24, line 122, strike out the words "operation disk" and insert the same to follow after the compound word "non-print" in line 123; page 33, lines 97 and 98, for "normay" read normal; page 36, line 101, after the word "spring" and before the period insert the words "into contact with pin 622b"; page 46, line 74, claim 73, for "totalized" read totalizer; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.